(12) United States Patent  
Yoshida et al.

(10) Patent No.: US 8,881,184 B2  
(45) Date of Patent: Nov. 4, 2014

(54) DISC DEVICE

(71) Applicant: Panasonic Corporation, Osaka (JP)

(72) Inventors: Norikatsu Yoshida, Hyogo (JP); Hitoshi Higaki, Osaka (JP); Tatsuro Nishi, Osaka (JP); Yuji Ariyoshi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/300,513

(22) Filed: Jun. 10, 2014

(65) Prior Publication Data

US 2014/0289750 A1  Sep. 25, 2014

Related U.S. Application Data

(63) Continuation of application No. 13/719,642, filed on Dec. 19, 2012, now Pat. No. 8,782,677.

(30) Foreign Application Priority Data

Mar. 28, 2012  (JP) ................................. 2012-073444

(51) Int. Cl.
*G11B 17/22* (2006.01)
*G11B 17/04* (2006.01)

(52) U.S. Cl.
CPC .............. *G11B 17/226* (2013.01); *G11B 17/04* (2013.01)
USPC ........................................................ 720/612

(58) Field of Classification Search
USPC .............. 720/612, 615; 360/97.11; 369/30.45, 369/30.68, 30.75
See application file for complete search history.

(56) References Cited

U.S. PATENT DOCUMENTS

| 4,730,291 | A | * | 3/1988 | Ikedo et al. | ................ | 369/30.83 |
| 4,788,673 | A | * | 11/1988 | Ikedo et al. | ................ | 369/30.83 |
| 5,099,466 | A | * | 3/1992 | Kimura et al. | ............ | 369/30.81 |
| 5,107,474 | A | * | 4/1992 | Ishibashi et al. | ........... | 369/30.63 |
| 5,136,563 | A | * | 8/1992 | Takemasa et al. | ......... | 369/30.84 |
| 5,208,791 | A | * | 5/1993 | Onishi et al. | ................ | 369/30.28 |
| 5,402,283 | A |   | 3/1995 | Yamakawa et al. | | |
| 5,481,512 | A | * | 1/1996 | Morioka et al. | ........... | 369/30.82 |
| 5,502,697 | A |   | 3/1996 | Taki | | |
| 5,903,538 | A |   | 5/1999 | Fujita et al. | | |
| 5,982,734 | A |   | 11/1999 | Yamashita et al. | | |

(Continued)

FOREIGN PATENT DOCUMENTS

JP  2-27559  1/1990
JP  4-132648  12/1992

(Continued)

*Primary Examiner* — Angel Castro
(74) *Attorney, Agent, or Firm* — Wenderoth, Lind & Ponack, LLP.

(57) ABSTRACT

A disc device which takes out a disc stored in a magazine and conveys the disc to any disc drive, in which the magazine comprises a tray which stores a plurality of discs, and a case which has a substantially rectangular parallelepiped shape and which stores the tray. The case has an opening at front face into which the tray can be inserted into or taken out therefrom. The tray has an outer shape being substantially rectangular in planar view. The tray is provided with cut portions formed at corner portions positioned on the back side of the case being cut off. The disc device further comprises a picker which holds the tray and draws out the tray from the case. The picker rotates the tray when the cut portion passes through the opening.

7 Claims, 59 Drawing Sheets

(56) References Cited

U.S. PATENT DOCUMENTS

| | | |
|---|---|---|
| 6,262,952 B1 * | 7/2001 | Takai .................. 369/30.77 |
| 6,298,017 B1 | 10/2001 | Kulakowski et al. |
| 6,351,825 B1 | 2/2002 | Kaneda et al. |
| 7,383,560 B2 * | 6/2008 | Edwards .................. 720/725 |
| 7,480,118 B2 | 1/2009 | Ojima et al. |
| 7,777,986 B2 | 8/2010 | Barkley et al. |
| 8,782,677 B2 * | 7/2014 | Yoshida et al. ............. 720/615 |
| 2003/0179661 A1 * | 9/2003 | Sato et al. .................. 369/30.68 |
| 2005/0007898 A1 | 1/2005 | Maeda |
| 2005/0091675 A1 | 4/2005 | Maruyama |
| 2008/0282275 A1 | 11/2008 | Zaczek et al. |
| 2008/0282281 A1 | 11/2008 | White |

FOREIGN PATENT DOCUMENTS

| | | |
|---|---|---|
| JP | 10-106125 | 4/1998 |
| JP | 11-296953 | 10/1999 |
| JP | 2000-21072 | 1/2000 |
| JP | 2005-31930 | 2/2005 |
| JP | 2005-149697 | 6/2005 |
| JP | 2011-204311 | 10/2011 |

* cited by examiner

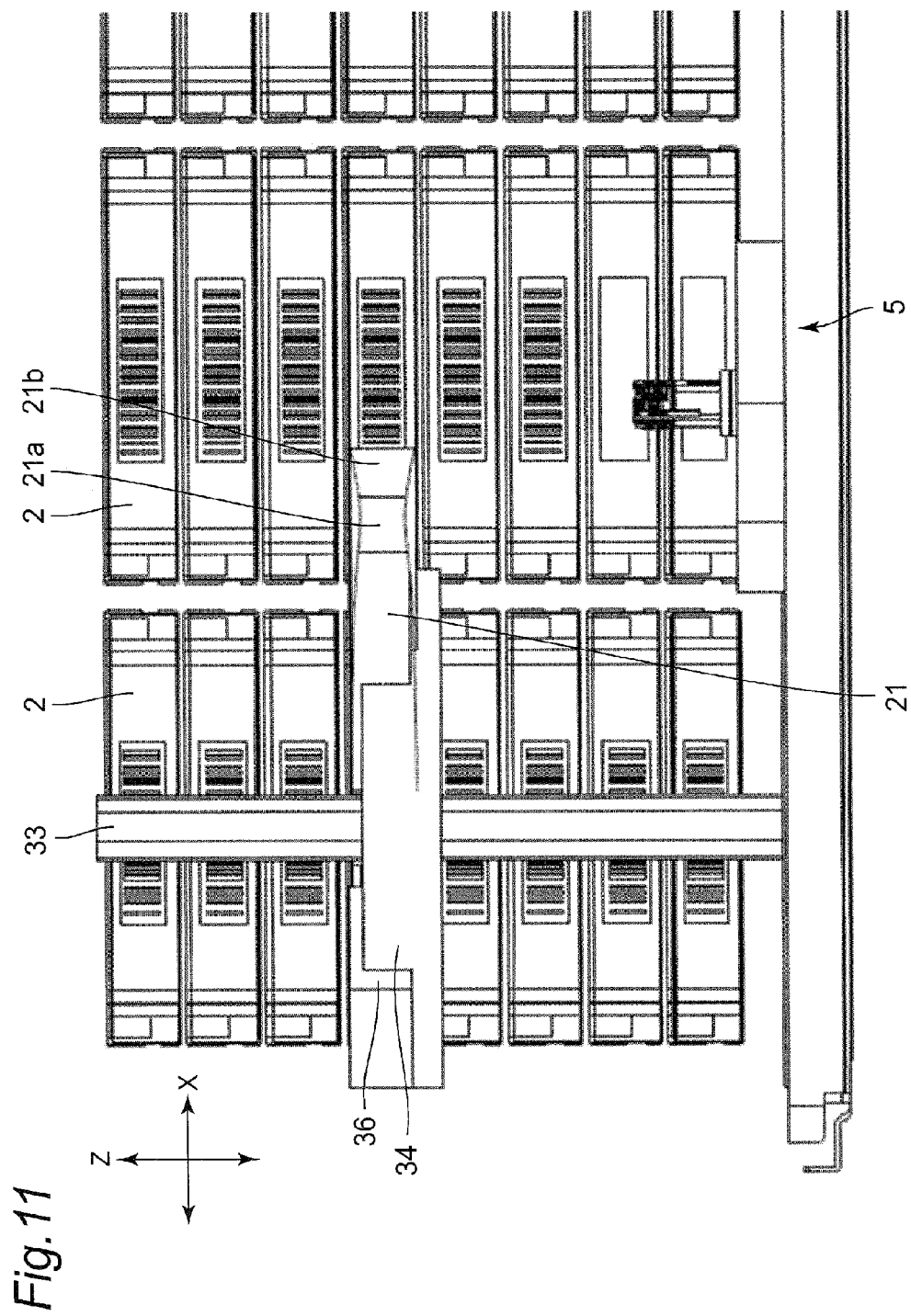

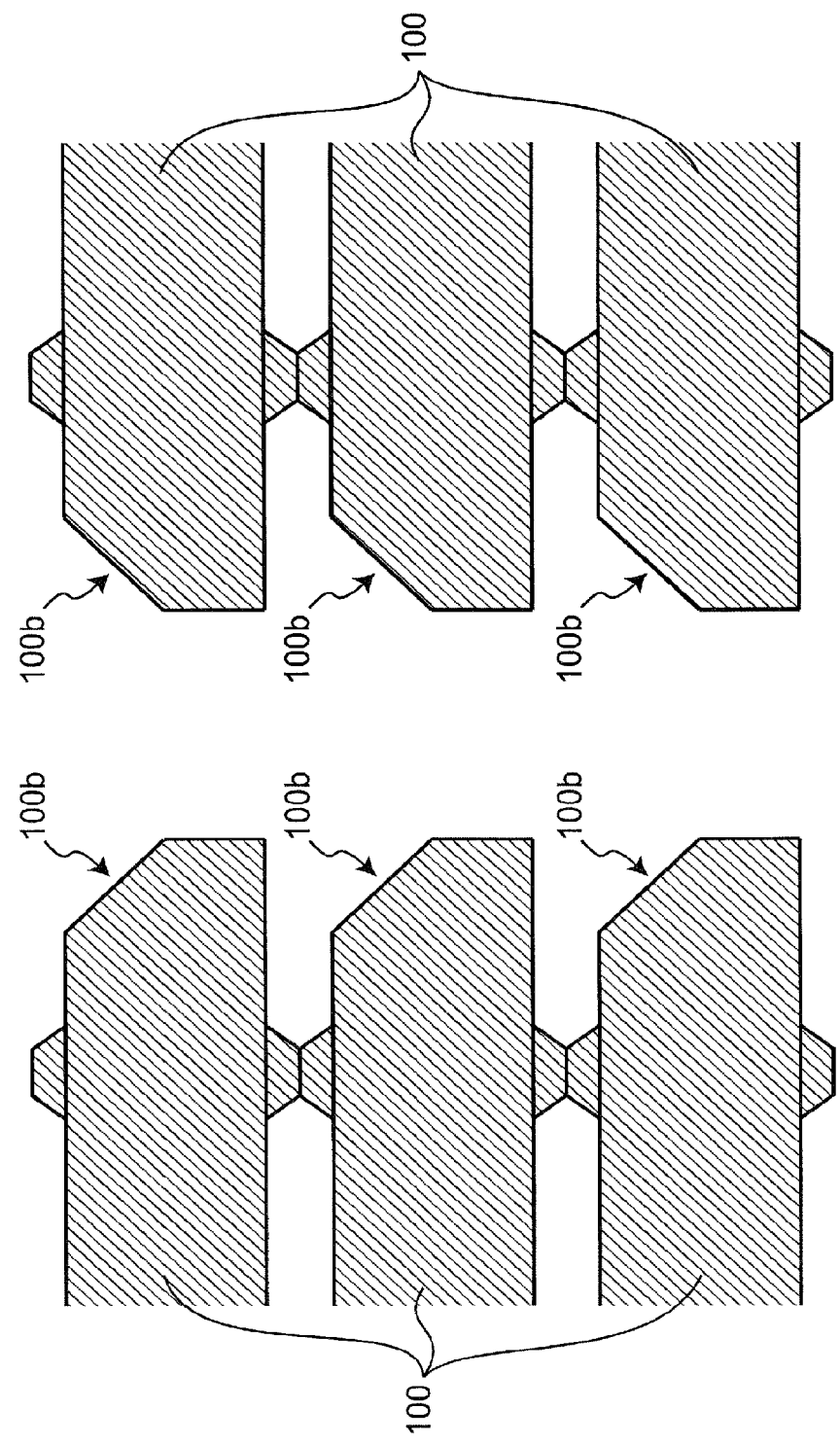

DISC DEVICE

BACKGROUND OF THE INVENTION

The present invention relates to a disc device that takes out a disc (a disc-like information recording medium such as a CD or a DVD) stored in a magazine and conveys the disc to an arbitrary disc drive.

Conventionally, as a disc device of this type, a device disclosed in Japanese Unexamined Patent Publication No. 2011-204311 is known, for example. The disc device disclosed in Japanese Unexamined Patent Publication No. 2011-204311 includes a magazine that stores a plurality of trays that stores one disc, and a plurality of disc drives. The disc device disclosed in Japanese Unexamined Patent Publication No. 2011-204311 is structured such that: an arbitrary tray is drawn out from the magazine; one disc stored in the drawn out tray is suctioned and held by a suction pad; and the disc is placed on the tray of an arbitrary disc drive.

SUMMARY OF THE INVENTION

In recent years, in accordance with evolution of cloud computing, a further increase in data capacity of the disc device is demanded. In order to increase the data capacity, it may be effective to increase the number pieces of magazines and the number of pieces of stored discs.

However, an increase in the number of pieces of magazines inevitably increases the distance between the disc drive and a magazine that is placed at the farthest position from the disc drive. This invites an increase in the disc conveying time. Further, there is a demand for the disc device of this type to suppress an increase in size of the device as much as possible.

Accordingly, an object of the present invention is to improve the issues stated above, and to provide a disc device that can suppress an increase in both the size of the device and the disc conveying time.

In order to achieve the above object, the present invention has the following constitutions.

According to the present invention, there is provided a disc device which takes out a disc stored in a magazine and which conveys the disc to a disc drive, the magazine comprising:

a tray which stores a plurality of the discs; and a case which has a substantially rectangular parallelepiped shape, the case storing the tray, wherein the case has an opening at front face of the case, a tray is inserted into and is taken out from the case through the opening, the tray has an outer shape being substantially rectangular in planar view, the tray being provided with a cut portion formed at a corner portion positioned on a back side of the case in a state where the tray is stored in the case, the disc device further comprises a picker which holds the tray to draw out from the case, and the picker rotates the tray when the cut portion passes through the opening.

In connection with the present invention, the tray has its corner portions cut off. When the cut portions pass through the opening, the tray is rotated. That is, by providing the cut portions at the corner portions of the tray, contact between the corner portions of the tray and the case is avoided, and the tray is rotated and shifted to a prescribed position before the tray is fully drawn out from the case. Thus, the disc conveying time can be reduced than in the case where the tray is shifted to the prescribed position after the tray is shifted from the case to the front of the magazine. Further, since the distance of drawing out the tray to the front of the magazine can be reduced, the width dimension of the space in front of the magazine for the picker to draw out the tray can be reduced. Thus, an increase in size of the apparatus can be suppressed.

BRIEF DESCRIPTION OF THE DRAWINGS

FIG. 11 is a side view showing the state where the picker has drawn out the tray from the magazine.

FIG. 49A is a cross-sectional view showing a first variation of the shape of a recess portion provided at the inner circumferential portion of each disc.

DETAILED DESCRIPTION OF THE EMBODIMENT

Figure 1:
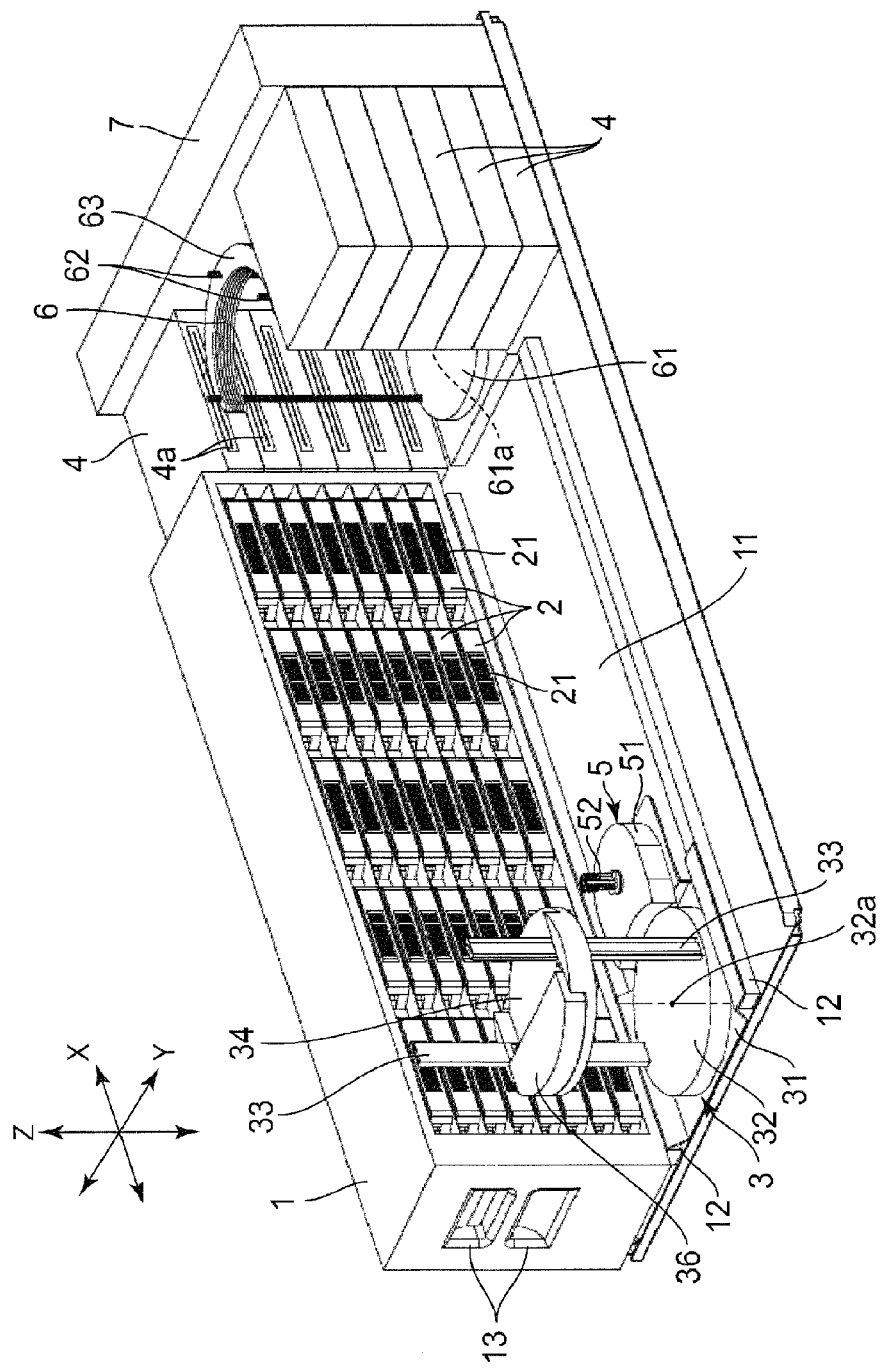
FIG. 1 is a perspective view showing the schematic structure of a disc device according to an embodiment of the present invention.

According to a first aspect of the present invention, there is provided a disc device which takes out a disc stored in a magazine and which conveys the disc to a disc drive, the magazine comprising:

a tray which stores a plurality of the discs; and a case which has a substantially rectangular parallelepiped shape, the case storing the tray, wherein the case has an opening at front face of the case, a tray is inserted into and is taken out from the case through the opening, the tray has an outer shape being substantially rectangular in planar view, the tray being provided with a cut portion formed at a corner portion positioned on a back side of the case in a state where the tray is stored in the case, the disc device further comprises a picker which holds the tray to draw out from the case, and the picker rotates the tray when the cut portion passes through the opening.

According to a second aspect of the present invention, there is provided the disc device according to the first aspect, wherein the cut portion is formed in one of a linear manner and an arc-like manner in planar view.

According to a third aspect of the present invention, there is provided the disc device according to the first aspect, wherein the tray has a side face positioned on the back side of the case, the entire side face being formed to be arc-like in planar view.

According to a fourth aspect of the present invention, there is provided the disc device according to the third aspect, wherein the tray has the side face formed to be arc-like substantially about a rotation axis when the tray is rotated by the picker.

According to a fifth aspect of the present invention, there is provided the disc device according to any one of the first to fourth aspects, wherein when the picker inserts the tray into the case through the opening, the picker rotates the tray and inserts the tray into the case from the cut portion, and the cut portion is tapered such that a width in a thickness direction of a tip portion firstly inserted into the case is smaller than a width of the case in the thickness direction.

According to a sixth aspect of the present invention, there is provided the disc device according to any one of the first to fifth aspects, wherein a bottom plate and opposing side plates of the case are provided so as to position on an inner side of the tray than the opening, and a top plate of the case is provided with a collar portion which guides shifting of the tray.

According to a seventh aspect of the present invention, there is provided the disc device according to any one of the sixth aspects, wherein the tray is provided with a cutout portion at a corner portion positioned on a front side of the case in the state where the tray is stored in the case, the cutout portion being provided with an engaging recess portion on an inner side in a width direction of the tray, and the picker has a hook which engages with the engaging recess portion to shift the tray.

In the following, with reference to the drawings, a description will be given of an embodiment of the present invention.

Embodiment

Figure 2:
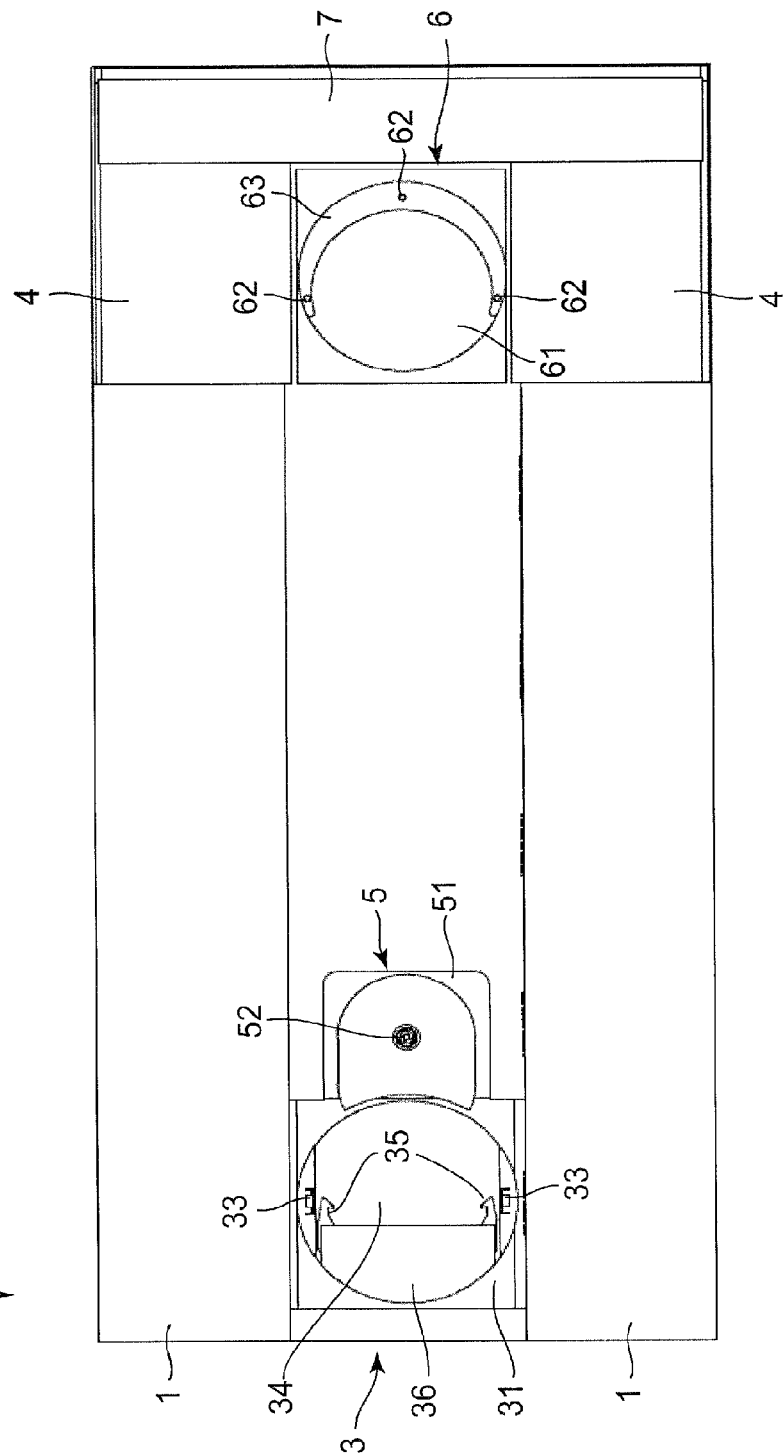
FIG. 2 is a plan view of the disc device shown in FIG. 1.

FIG. 1 is a perspective view showing the schematic structure of a disc device according to an embodiment of the present invention. FIG. 2 is a plan view of the disc device shown in FIG. 1. It is to be noted that, in the present embodiment, the left side in FIG. 2 is referred to as the "device-front side", and the right side in FIG. 2 is referred to as the "device-rear side".

First, with reference to FIGS. 1 and 2, a description will be given of the overall structure of the disc device.

The disc device includes two magazine stockers 1, 1. The two magazine stockers 1, 1 are provided on a bottom chassis 11 so as to oppose to each other in a device width direction Y. It is to be noted that, in FIG. 1, one of the magazine stockers 1 (on the near side) is not shown.

Each magazine stocker 1 stores a plurality of magazines 2. Each magazine 2 stores a tray 21 that stores a plurality of discs. Between the two magazine stockers 1, 1, a picker 3 that draws out the tray 21 from one magazine 2 selected from a plurality of magazines 2 and that holds the tray 21 is provided.

The picker 3 is structured to convey the held tray 21 to a position near a plurality of disc drives 4 arranged at the device-rear side. The picker 3 is integrally provided with a separator 5 that separates the plurality of discs stored in the tray 21 so as not to be brought into contact with one another.

The disc drives 4 are each an apparatus that performs recording or reproducing of information on or from a disc. Further, the disc drives 4 are each a slot-in type disc drive that loads a disc without through the use of tray. The plurality of disc drives 4 are stacked in a device height direction Z, and are arranged so as to be adjacent to the magazine stockers 1, 1, respectively. Between the plurality of disc drives 4 arranged as being stacked so as to be adjacent to one magazine stocker 1 and the plurality of disc drives 4 arranged as being stacked so as to be adjacent to the other magazine stocker 1, a carrier 6 is provided.

The carrier 6 is structured to receive a plurality of discs as being separated by the separator 5 from the separator 5 in that separated state, and to insert the discs into the plurality of disc drives 4. It is to be noted that, in the present embodiment, the separator 5 and the carrier 6 structure a disc separating and conveying device. The disc separating and conveying device is a device that holds a plurality of discs stored in the tray 21, that separates at least one disc from the held plurality of discs, and that conveys the separated disc to the disc drive 4.

On the further device-rear side than the carrier 6 and the plurality of disc drives 4, an electric circuit and a power supply 7 are provided. The electric circuit and the power supply 7 are provided with a control unit that controls operations of devices such as the picker 3, the disc drives 4, the carrier 6 and the like.

Next, a description will be given of the structure of the aforementioned devices and components in more detail.

The magazine stockers 1 are provided along guide rails 12 that slidably guide the picker 3. The guide rails 12 are provided so as to extend in a device depth direction X (in the longitudinal direction of the magazine stockers 1). A grip 13 is provided at the side face on the device-front side of each magazine stocker 1. The magazine stocker 1 can be shifted toward the device-front side by the grip 13 being pulled. Each magazine stocker 1 is provided with a partition plate (not shown) formed to be grid-like as seen from the device width direction Y. In each of the space surrounded by the partition plate, the magazine 2 is stored.

Figure 3:
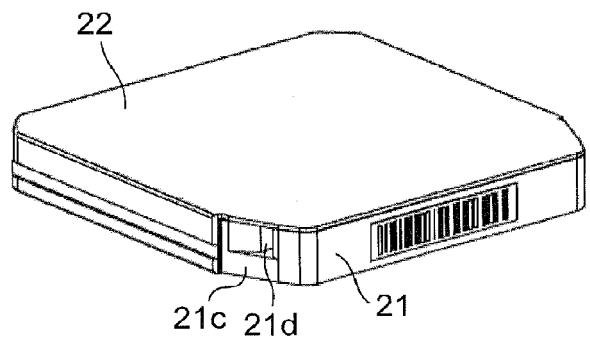
FIG. 3 is a perspective view of a magazine included in the disc device shown in FIG. 1.
Figure 4:
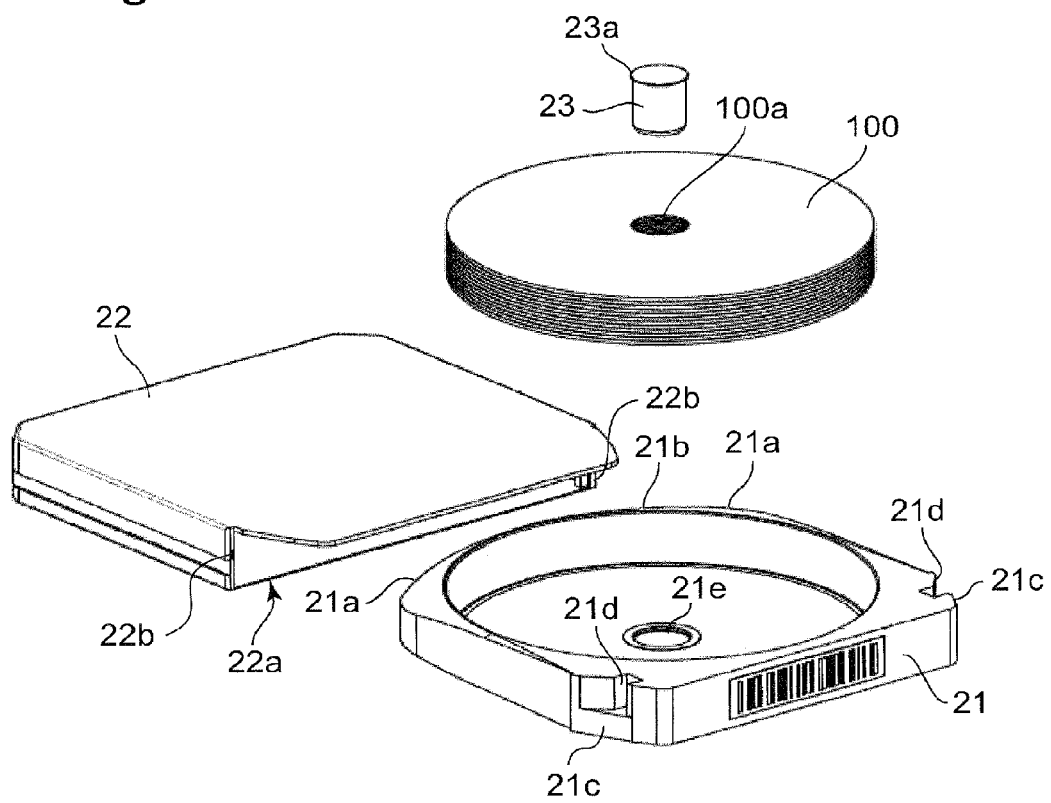
FIG. 4 is an exploded perspective view of the magazine shown in FIG. 3.

As shown in FIG. 3, the magazine 2 includes the tray 21, and a case 22 that has a substantially rectangular parallelepiped shape and that stores the tray 21. As shown in FIG. 4, at the front face (one side face) of the case 22, an opening 22a into which the tray 21 can be inserted and taken out is provided.

Figure 5:
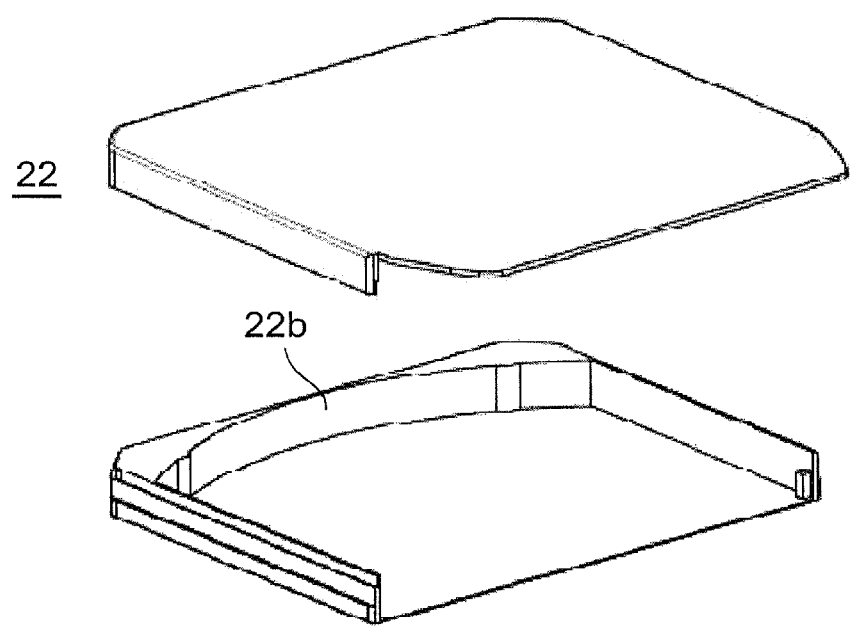
FIG. 5 is an exploded perspective view of a case included in the magazine shown in FIG. 3.

The tray 21 is formed to have an outer shape being substantially rectangular in planar view. The tray 21 stores a plurality of discs 100 as being stacked in close contact with one another. At the opposing corner portions that position on the back side of the case 22 in a state where the tray 21 is stored in the case 22, cut portions 21a, 21a are formed. Further, a side face 21b that positions on the back side of the case 22 in the state where the tray 21 is stored in the case 22 is formed to be arc-like as a whole including the cut portions 21a, 21a. Further, as shown in FIG. 5, an inner side face 22b of the case 22 that opposes to the side face 21b in the state where the tray 21 is stored in the case 22 is formed to be substantially arc-like so as to conform to the shape of the side face 21b.

Into a center hole 100a provided at each of the plurality of discs 100 stored in the tray 21, a core rod 23 is inserted. Thus, the shifting of the discs 100 in the plane direction is restricted, and any possible damage that may otherwise be done to the discs 100 by such shifting is prevented.

At the opposing corner portions that position on the front face side of the case 22 in the state where the tray 21 is stored in the case 22, cutout portions 21c, 21c are formed. On the inner side of the cutout portions 21c, 21c in the width direction of the tray 21, engaging recess portions 21d, 21d with which a pair of hooks 35, 35, whose description will follow, engage are formed.

As shown in FIG. 1, the picker 3 includes a run base 31 that runs in the device depth direction X. At the top face of the run base 31, a rotary table 32 is rotatably provided substantially about a rotation axis 32a that extends in the device height direction Z. The rotary table 32 is provided with a pair of up-and-down rails 33, 33 extending along the device height direction Z and opposing to each other. Between the pair of up-and-down rails 33, 33, an up-and-down table 34 is provided. The up-and-down table 34 is provided so as to be capable of rising and lowering in the device height direction Z along the pair of up-and-down rails 33.

The up-and-down table 34 includes a pair of hooks 35, 35 that can engage with the engaging recess portions 21d of the tray 21, and a chuck 36 that has the mechanism of opening and closing the pair of hooks 35, 35 and shifting the pair of hooks 35, 35 forward and backward. The chuck 36 is structured so as to be capable of advancing and receding in the direction perpendicular to the line connecting the pair of up-and-down rails 33, 33. Further, the chuck 36 is structured so as to be capable of adjusting the interval of the pair of hooks 35, 35. By the chuck 36 reducing the interval between the pair of hooks 35, 35, the pair of hooks 35, 35 can engage with the engaging recess portions 21d, 21d of the tray 21. On the other hand, by the chuck 36 increasing the interval of the pair of hooks 35, 35, the engaged state between the pair of hooks 35, 35 and the engaging recess portions 21d, 21d of the tray 21 can be released.

Figure 6:
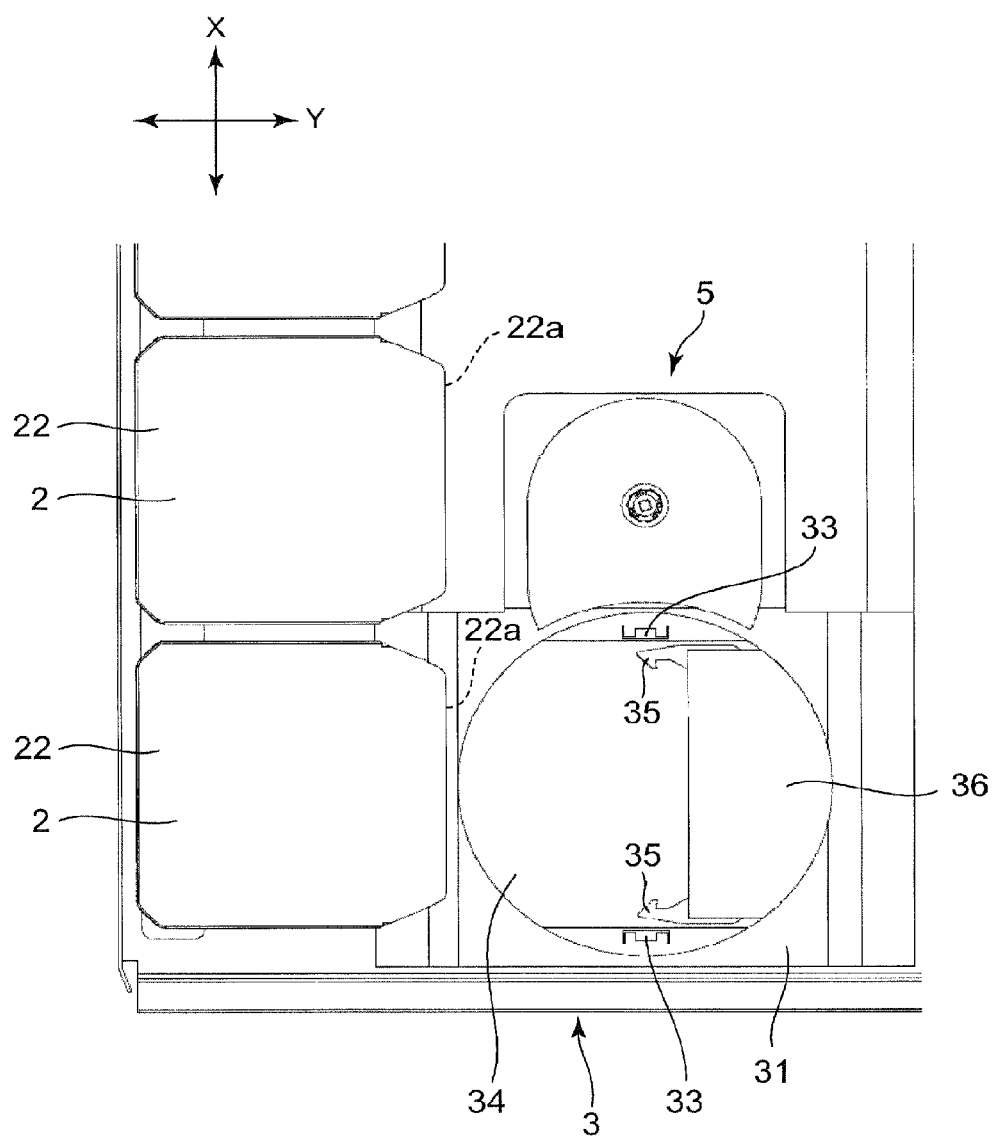
FIG. 6 is a plan view showing the state where a picker included in the disc device shown in FIG. 1 has shifted to the front of a magazine selected from a plurality of magazines.

FIGS. 6 to 11 show the manner of the picker 3 drawing out the tray 21 from the case 22. As shown in FIG. 6, by the run base 31 running in the device depth direction X and the up-and-down table 34 rising and lowering in the device height direction Z along the pair of up-and-down rails 33, the pair of hooks 35 is shifted in front of one magazine 2 selected from the plurality of magazines 2.

Figure 7:
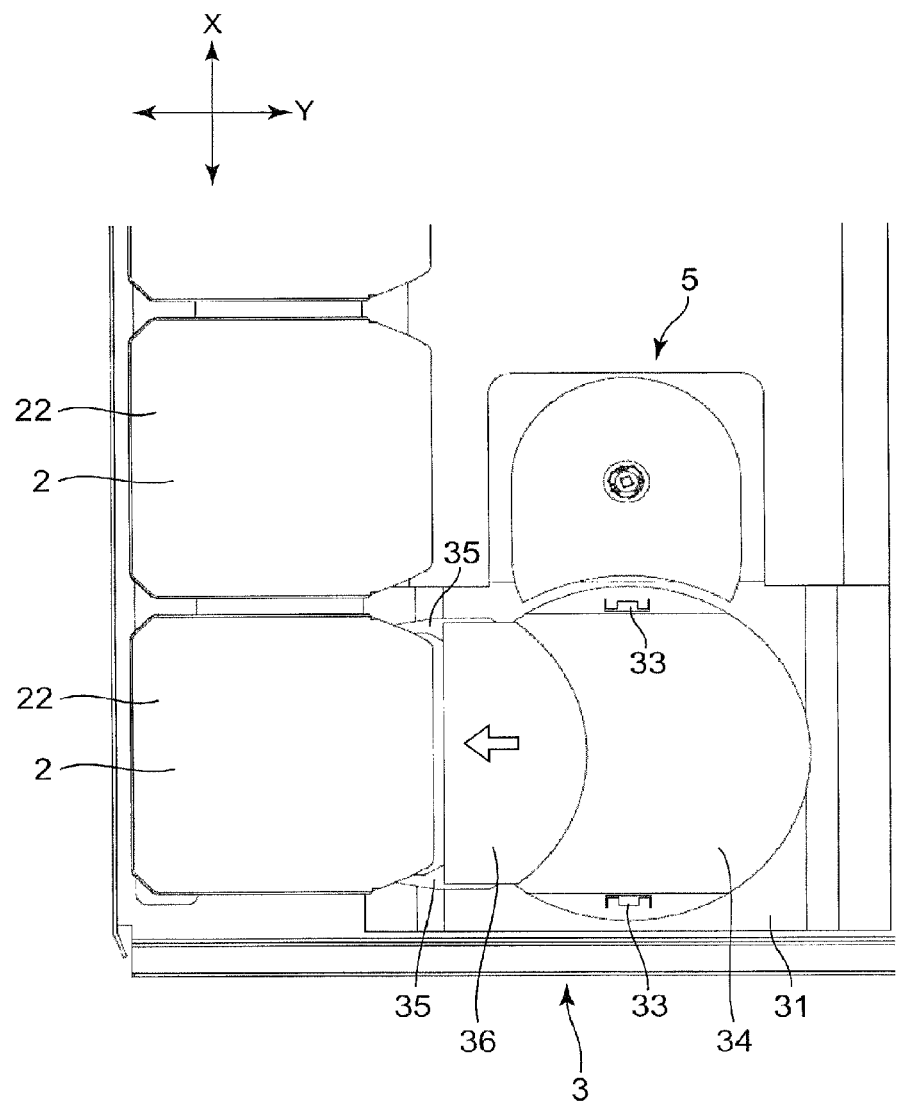
FIG. 7 is a plan view showing the manner of the picker drawing out a tray from the magazine.

Thereafter, as shown in FIG. 7, the chuck 36 advances toward the tray 21, to cause the pair of hooks 35 to engage with the engaging recess portions 21d of the tray 21. In this state, by the chuck 36 receding from the tray 21, the tray 21 is drawn out from the case 22.

Figure 8:
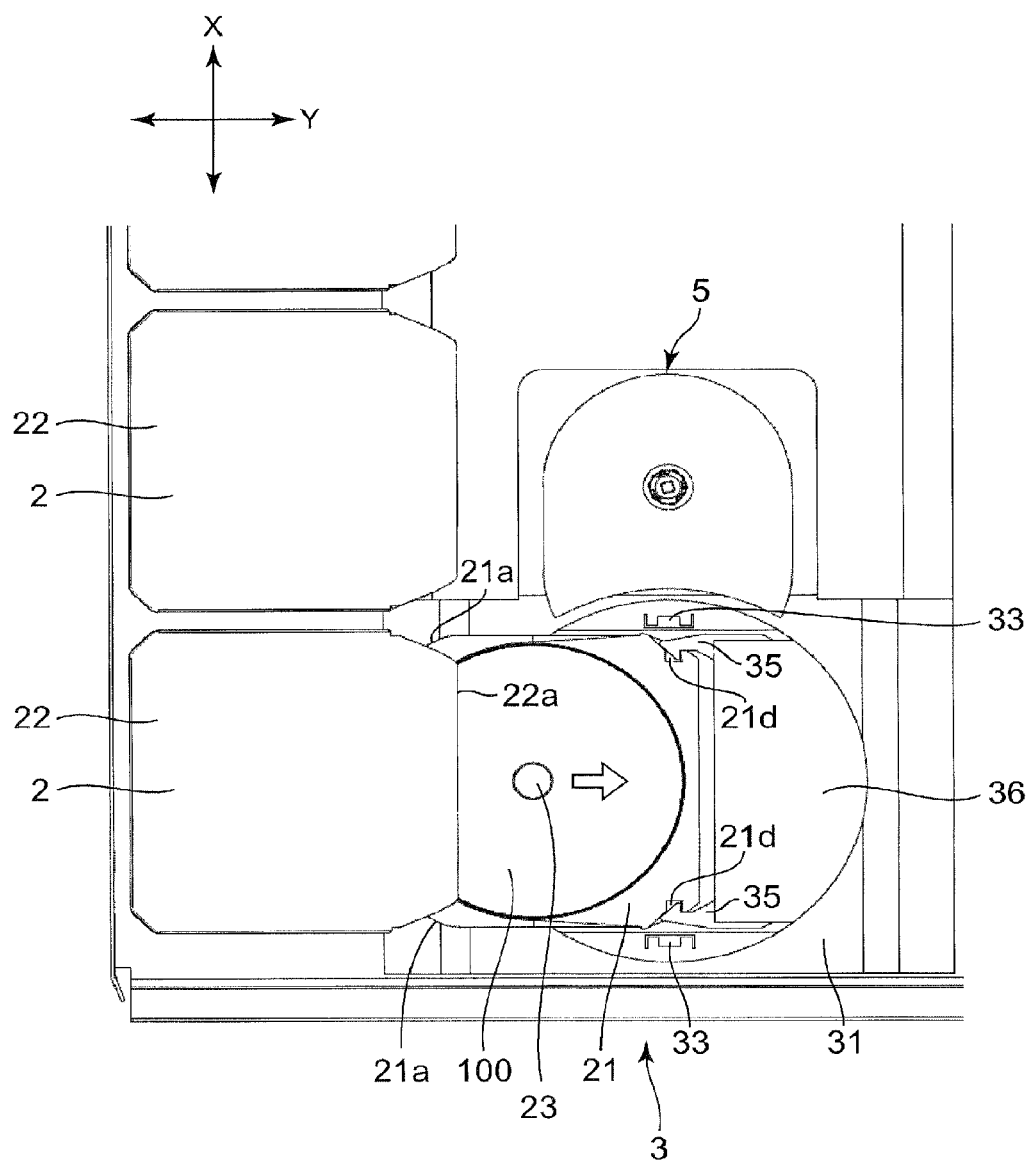
FIG. 8 is a plan view showing the manner of the picker drawing out the tray from the magazine.
Figure 9:
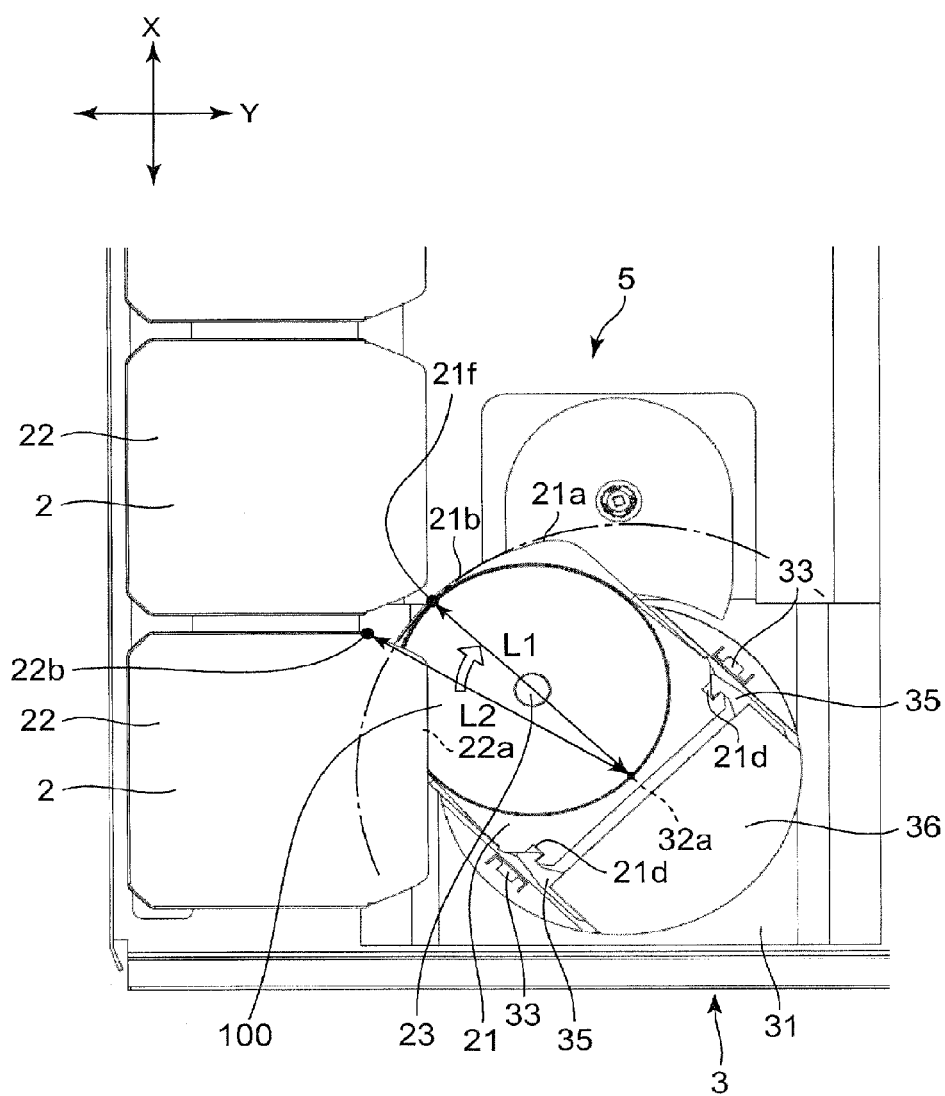
FIG. 9 is a plan view showing the manner of the picker drawing out the tray from the magazine.
Figure 10:
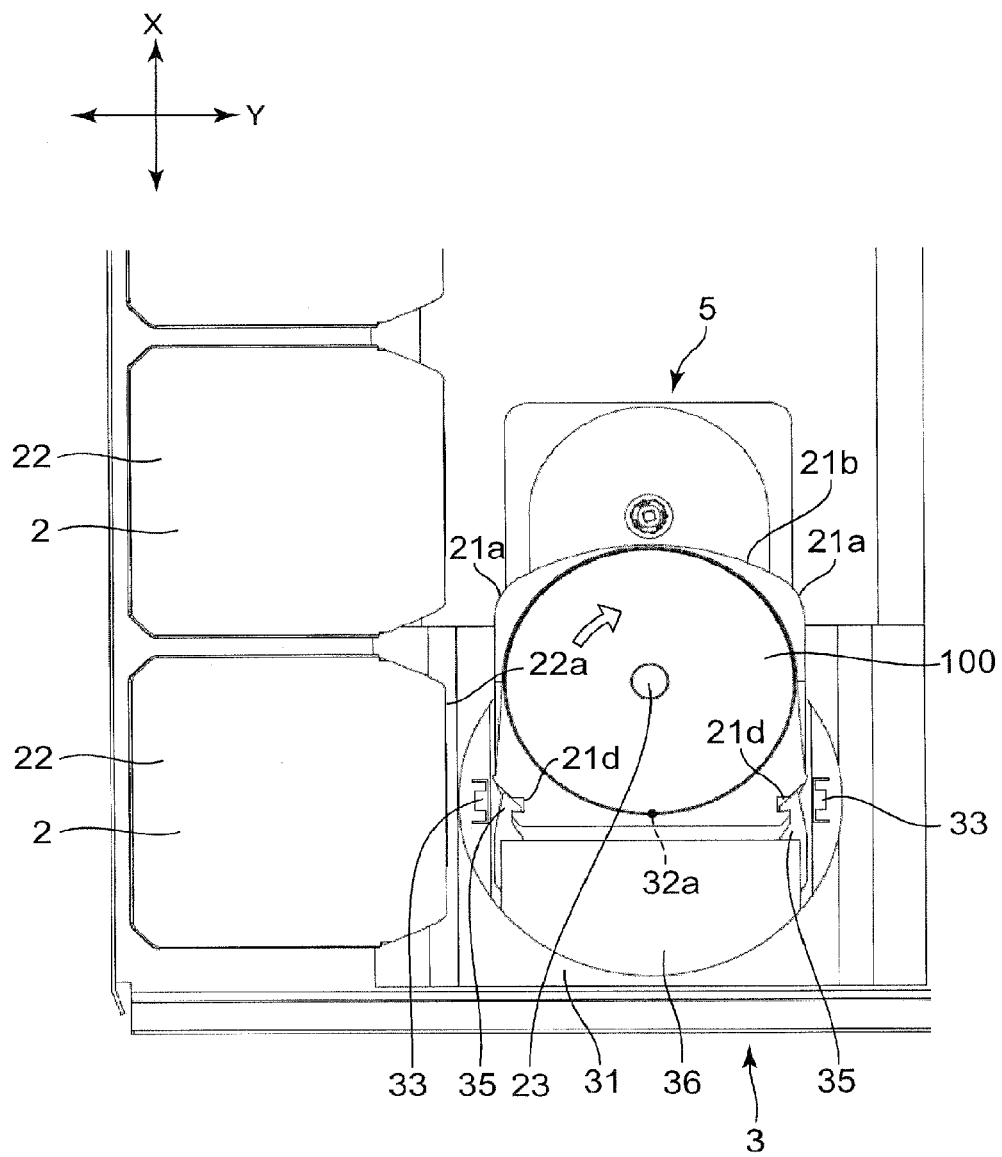
FIG. 10 is a plan view showing the state where the picker has drawn out the tray from the magazine.

As shown in FIG. 8, by the chuck 36 receding (i.e., shifting to the front of the magazine 2), when the cut portions 21a of the tray 21 pass through the opening 22a of the case 22, the rotary table 32 rotates clockwise substantially about the rotation axis 32a. In other words, as shown in FIG. 9, when the distance L1 between a vertex 21f (i.e., the position farthest from the rotation axis 32a) of the side face 21b of the tray 21 and the rotation axis 32a becomes smaller than the distance L2 between the front end portion 22b of the side face of the case 22 and the rotation axis 32a, the rotary table 32 rotates clockwise substantially about the rotation axis 32a. In accordance with the rotation of the rotary table 32, as shown in FIGS. 9 and 10, the tray 21 rotates substantially about the rotation axis 32a. As a result, as shown in FIGS. 10 and 11, the tray 21 is completely drawn out from the case 22.

In the present embodiment, in order to avoid contact between the tray 21 and the case 22 when the tray 21 rotates, the tray 21 is provided with the cut portions 21a. Thus, the tray 21 can rotate before the tray 21 is completely drawn out from the case 22. This makes it possible to reduce the shifting amount of the tray 21 from the position shown in FIG. 6 to the position shown in FIG. 8 (e.g., 95 mm for the tray length 123 mm), and to perform the shifting of the tray 21 in a short time (e.g., 0.75 sec for one sec to shift 123 mm). Further, since the distance traveled by the chuck 36 in the device width direction Y is small, the distance between the magazine stockers 1, 1 can be reduced.

Figure 9A:
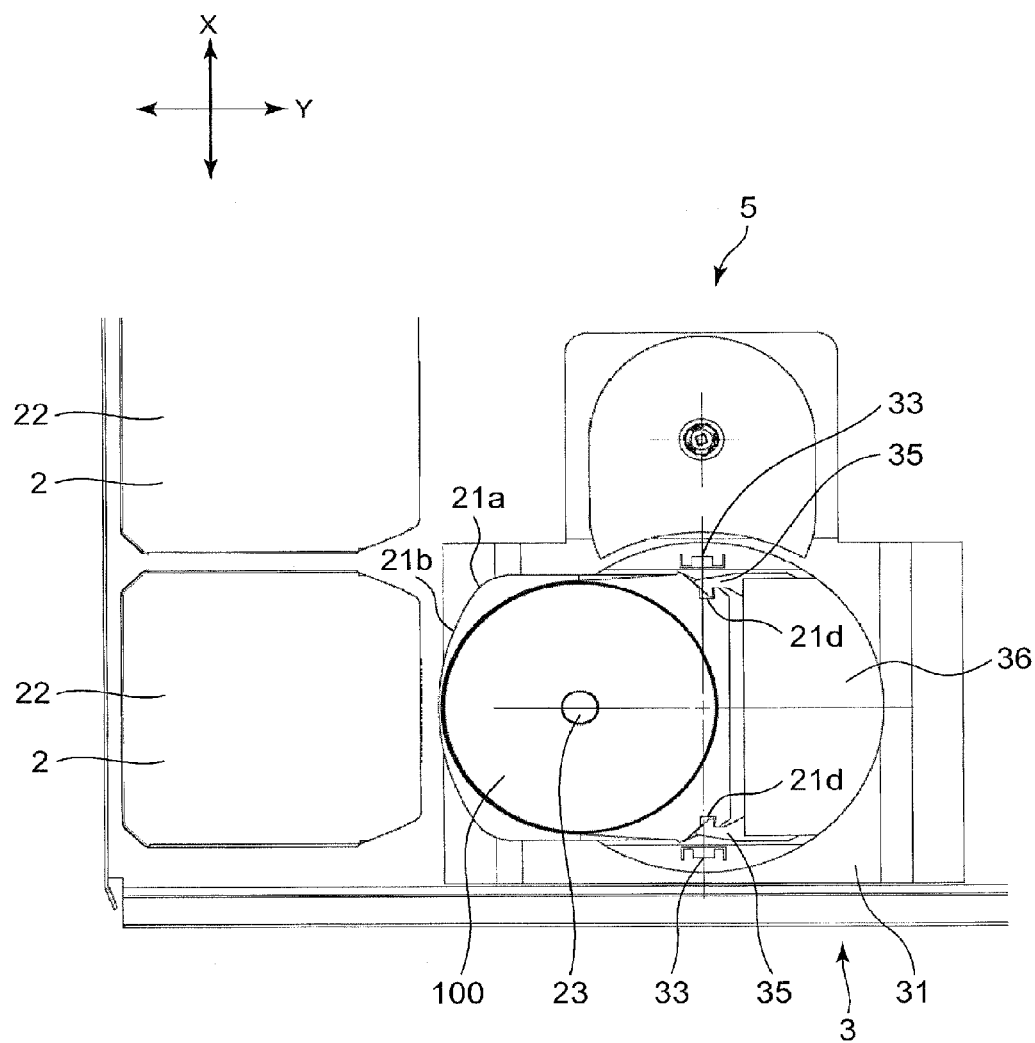
FIG. 9A is a plan view showing the manner of the picker completely drawing out the tray from the magazine without rotating the tray midway through the operation.

In contrast, in the case where the tray 21 is completely drawn out from the case 22 and the tray 21 is shifted to the position shown in FIG. 9A, the time required for the tray 21 to shift from the position shown in FIG. 6 to the position shown in FIG. 10 becomes long (e.g., 1.0 sec). Further, the distance traveled by the chuck 36 in the device width direction Y becomes great (e.g., 135 mm). Thus, the distance between the magazine stockers 1, 1 becomes great, which results in an increase in the size of the device.

It is to be noted that, since the dimension of each disc 100 stored in the magazine 2 is determined by the standard, a reduction in dimension of each magazine 2 and each magazine stocker 1 in the device width direction Y is limited. For example, when the standard diameter of the disc 100 is 120 mm, the dimension of each magazine 2 in the device width direction Y is required to be 135 mm or more, and the dimension of each magazine stocker 1 in the device width direction Y is required to be 141 mm or more. Accordingly, in the case where the device is to be stored in a so-called 19-inch rack, the distance between the magazine stockers 1, 1 should be set to 168 mm (=450 mm-141 mm×2) or less. Here, when the shape of each magazine 2 is 135 mm square in planar view, the diagonal length measures 191 mm. Accordingly, the entire magazine 2 cannot be drawn out from the tray 21 and rotated. In contrast, with the disc device according to the present embodiment, as described above, since the distance between the magazine stockers 1, 1 can be reduced, the disc device can be stored in a 19-inch rack.

Figure 12A:
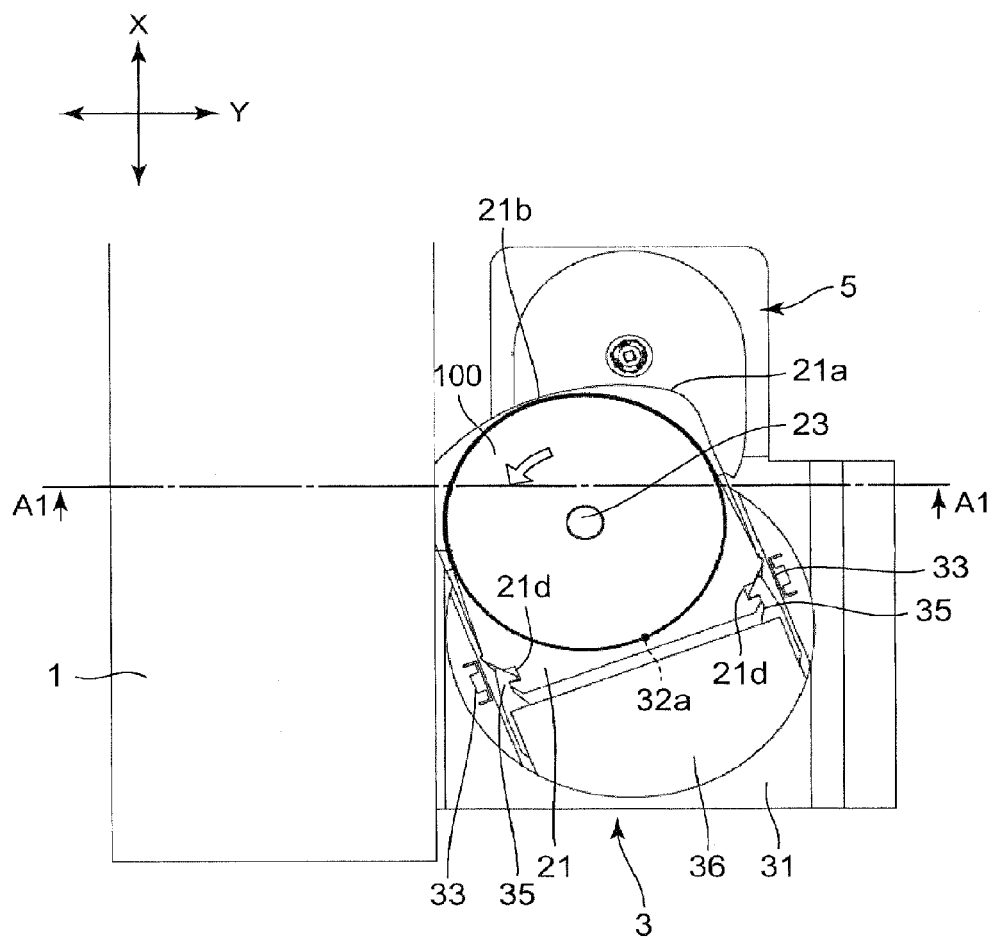
FIG. 12A is a plan view showing the manner of the picker inserting the tray into the case.
Figure 13A:
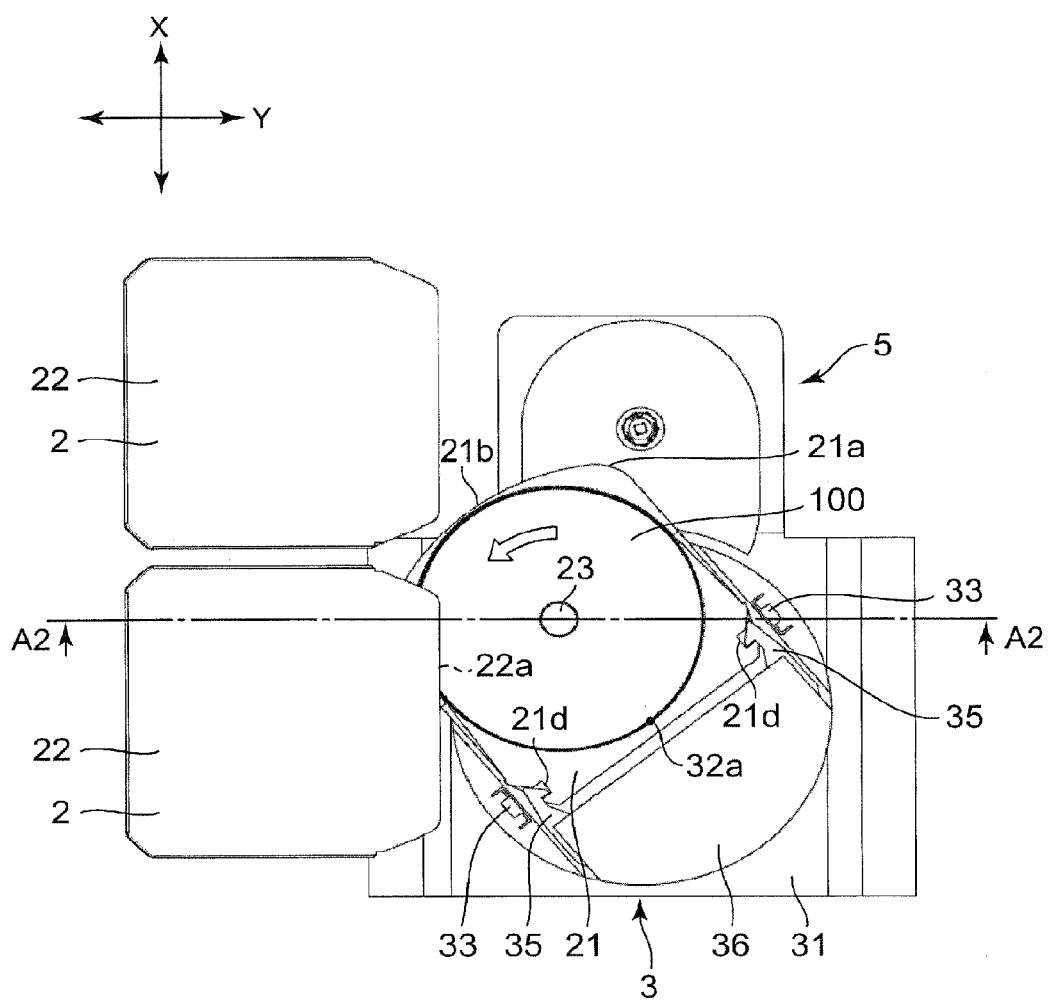
FIG. 13A is a plan view showing the manner of the picker inserting the tray into the case.
Figure 14:
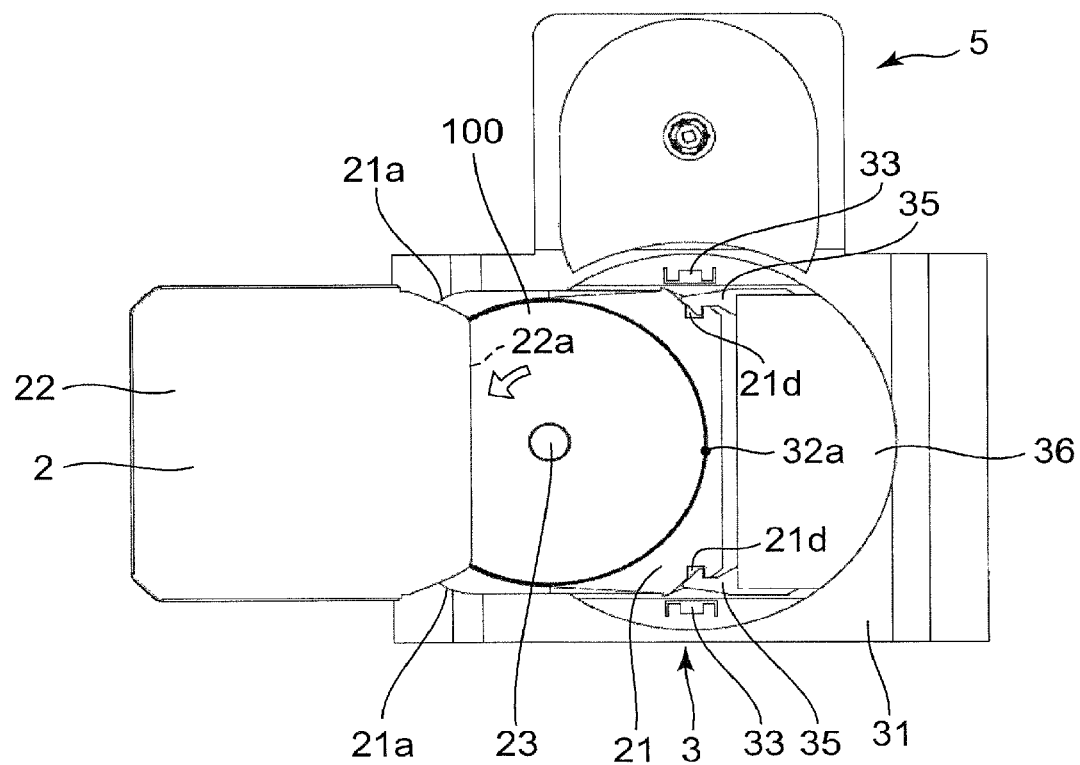
FIG. 14 is a plan view showing the manner of the picker inserting the tray into the case.
Figure 15:
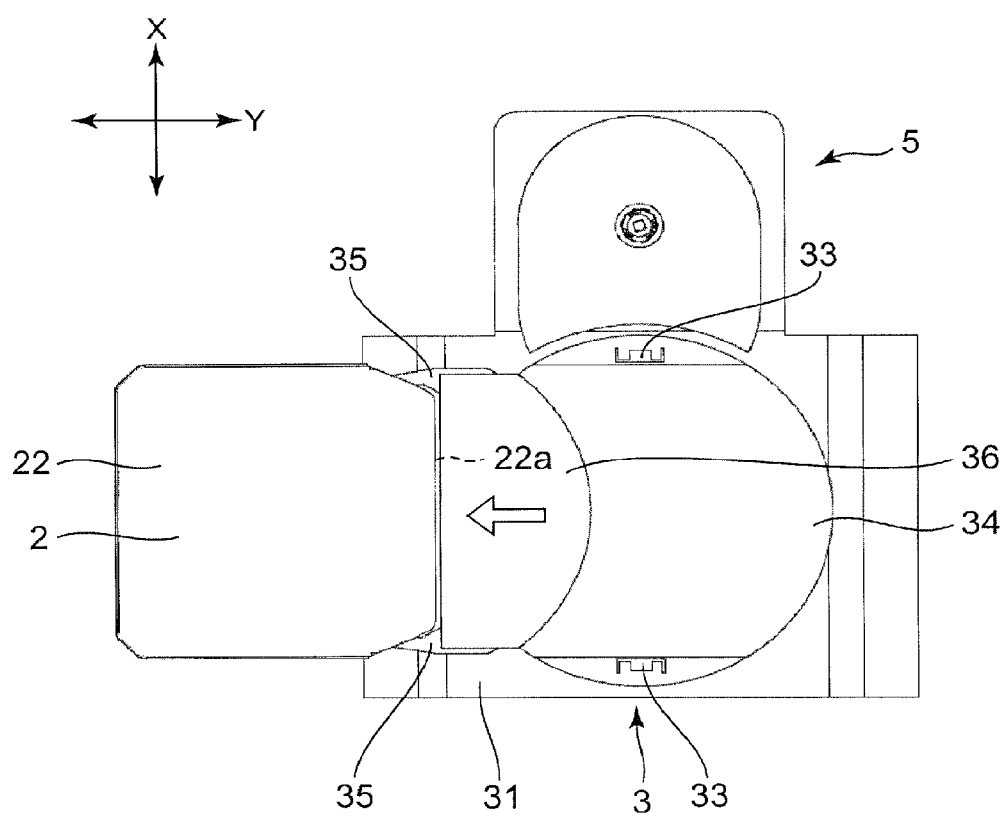
FIG. 15 is a plan view showing the manner of the picker inserting the tray into the case.

FIGS. 12A, 13A, 14, and 15 show the manner of the picker 3 inserting (storing) the tray 21 into the case 22. The insertion of the tray 21 into the case 22 is performed in the following manner: from the state shown in FIGS. 10 and 11, the rotary table 32 is rotated counterclockwise as shown in FIGS. 12A, 13A, and 14; and thereafter, the chuck 36 is advanced into the tray 21 as shown in FIG. 15. Insertion into the magazine stocker 1 on the right side is similarly performed by rotation of the rotary table 32 in the reverse direction.

Figure 12B:
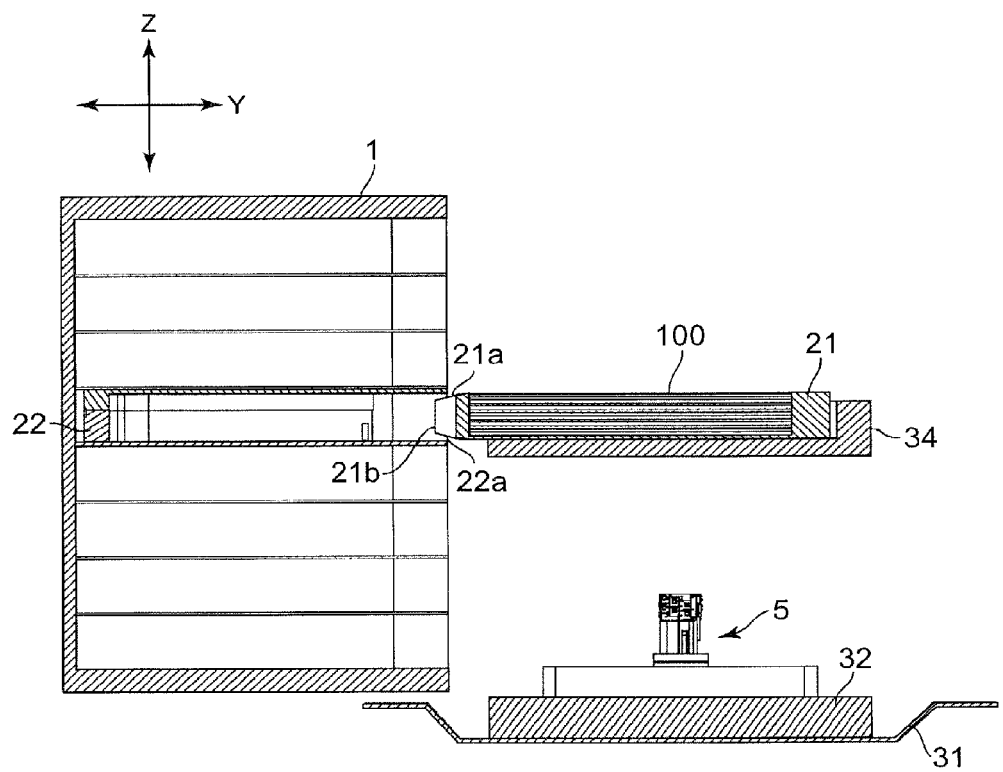
FIG. 12B is a cross-sectional view taken along line A1-A1 shown in FIG. 12A.
Figure 12C:
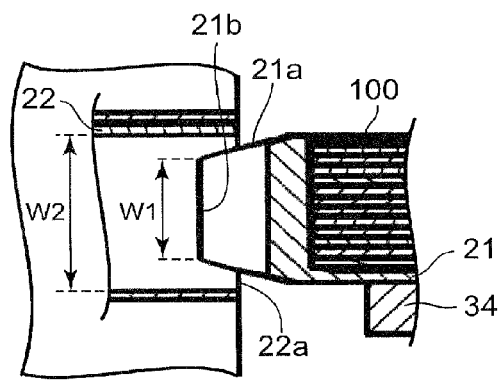
FIG. 12C is a partial enlarged view shown in FIG. 12B.

When the picker 3 inserts the tray 21 into the case 22 through the opening 22a, the picker 3 rotates the tray 21 substantially about the rotation axis 32a, and inserts the tray 21 into the case 22 from the cut portions 21a. FIG. 12B is a cross-sectional view taken along line A1-A1 shown in FIG. 12A, and FIG. 12C is a partial enlarged view of FIG. 12B. As shown in FIGS. 12B and 12C, each cut portion 21a is tapered such that a width W1 of the tip portion in the thickness direction firstly inserted into the case 22 becomes smaller than a width W2 of the case 22 in the thickness direction. Thus, the tray 21 can easily be inserted into the case 22.

Figure 13B:
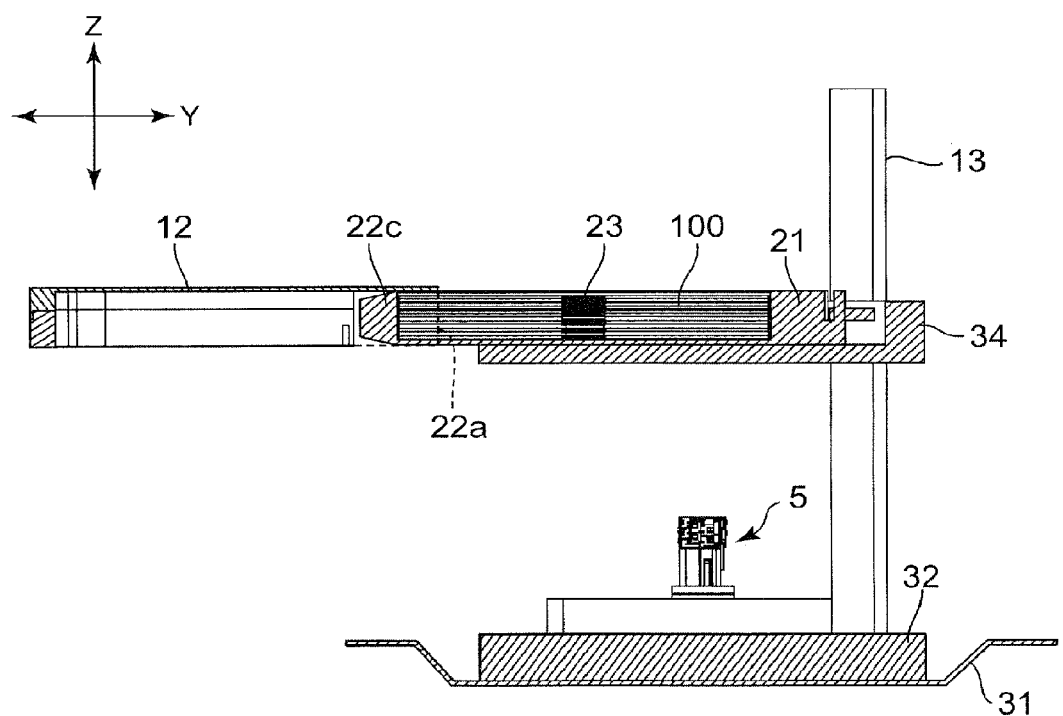
FIG. 13B is a cross-sectional view taken along line A2-A2 shown in FIG. 13A.
Figure 13C:
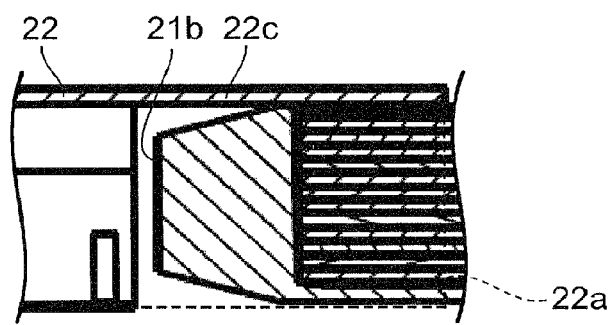
FIG. 13C is a partial enlarged view of FIG. 13B.
Figure 16A:
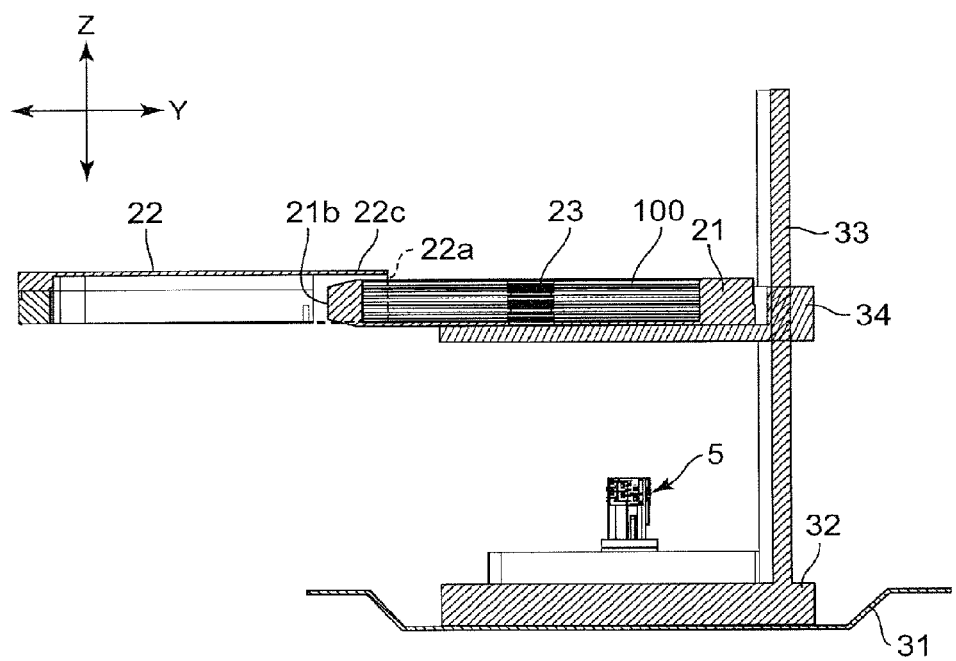
FIG. 16A is a cross-sectional view showing the manner of the picker inserting the tray into the case.
Figure 16B:
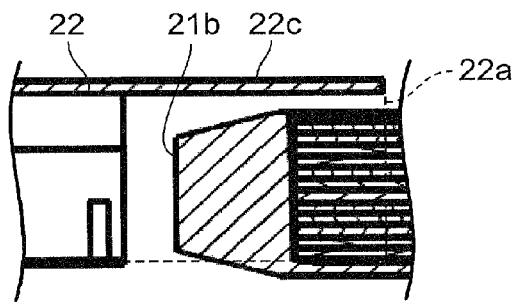
FIG. 16B is a partial enlarged view of FIG. 16A.

FIG. 13B is a cross-sectional view taken along line A2-A2 shown in FIG. 13A, and FIG. 13C is a partial enlarged view of FIG. 13B. As shown in FIGS. 13B and 13C, the bottom plate and the opposing side plates of the case 22 are provided so as to position on the inner side of the tray 21 than the opening 22a. At the top plate of the case 22, a collar portion 22c that guides shifting of the tray 21 is provided. The collar portion 22c is provided so as to cover the top portion of the disc 100. Thus, when the tray 21 is rotated counterclockwise in order for the tray 21 to be inserted into the case 22, contact between the tray 21 and the bottom plate and the opposing side plates of the case 22 can be prevented. As a result, as shown in FIGS. 16A and 16B, when the tray 21 is rotated counterclockwise, the position of the tray 21 can slightly be lowered so as not for the tray 21 to be brought into contact with the top plate of the case 22. Further, when the tray 21 is inserted into the case 22, as shown in FIGS. 13B and 13C, by causing the tray 21 to rise so as to be brought into contact with the collar portion 22c, and thereafter causing the tray 21 to shift along the collar portion 22c, the tray 21 can more surely be inserted into the case 22.

Figure 17:
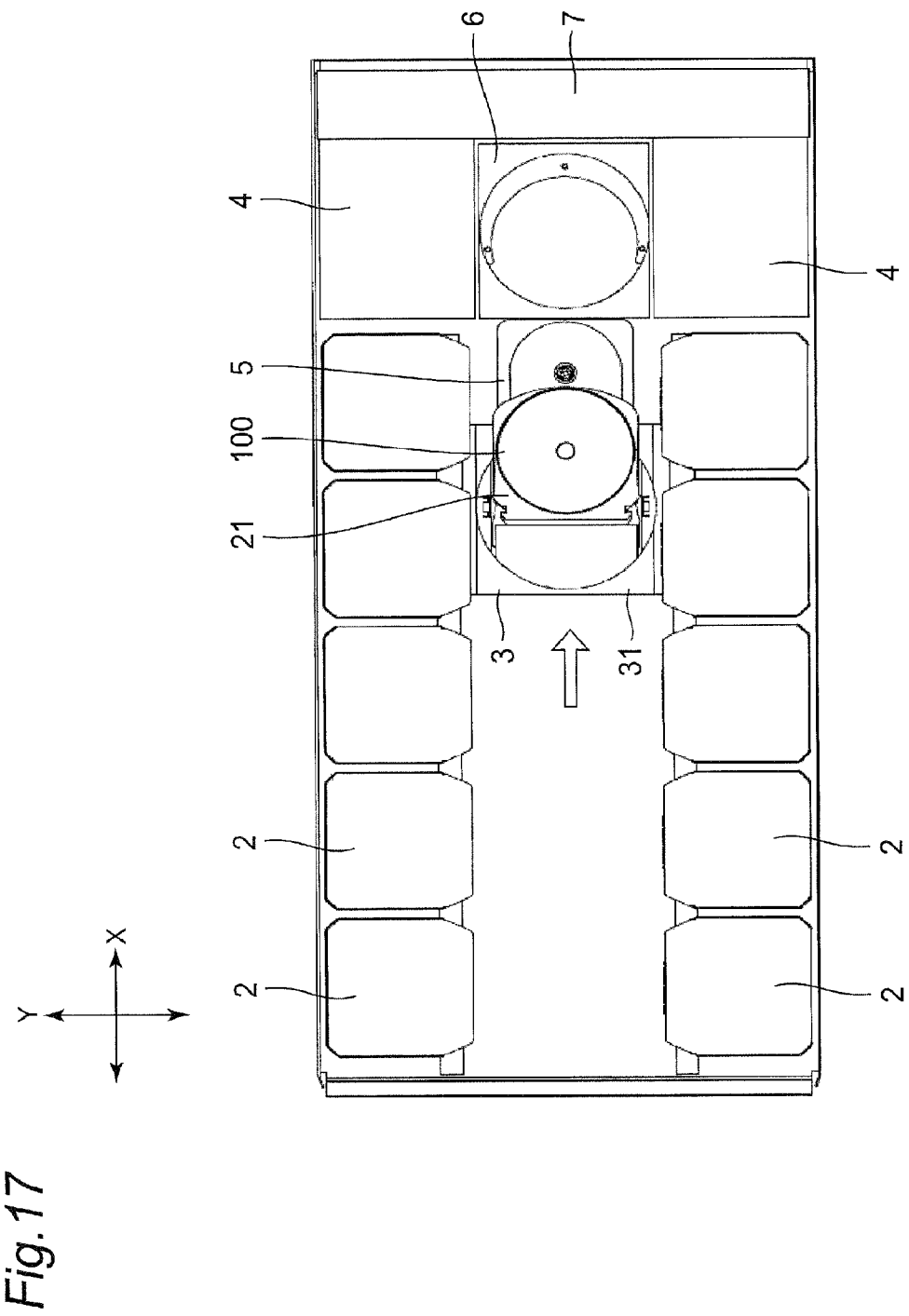
FIG. 17 is a plan view showing the state where the picker has conveyed the tray near the plurality of disc drives.

As shown in FIGS. 10 and 11, the tray 21 drawn out from the case 22 is conveyed to the position near the plurality of disc drives 4, by the run base 31 of the picker 3 running toward the device-rear side as shown in FIG. 17. Thereafter, the chuck 36 of the picker 3 advances, and the tray 3 is shifted above the separator 5.

The separator 5 includes an up-and-down table 51 that is shiftable in the device height direction Z and a shaft portion 52 that is inserted into the center hole 100a provided at each of the plurality of discs 100. Further, as shown in FIG. 4, the tray 21 is provided with a through hole 21e at the position corresponding to the center hole 100a.

Figure 18:
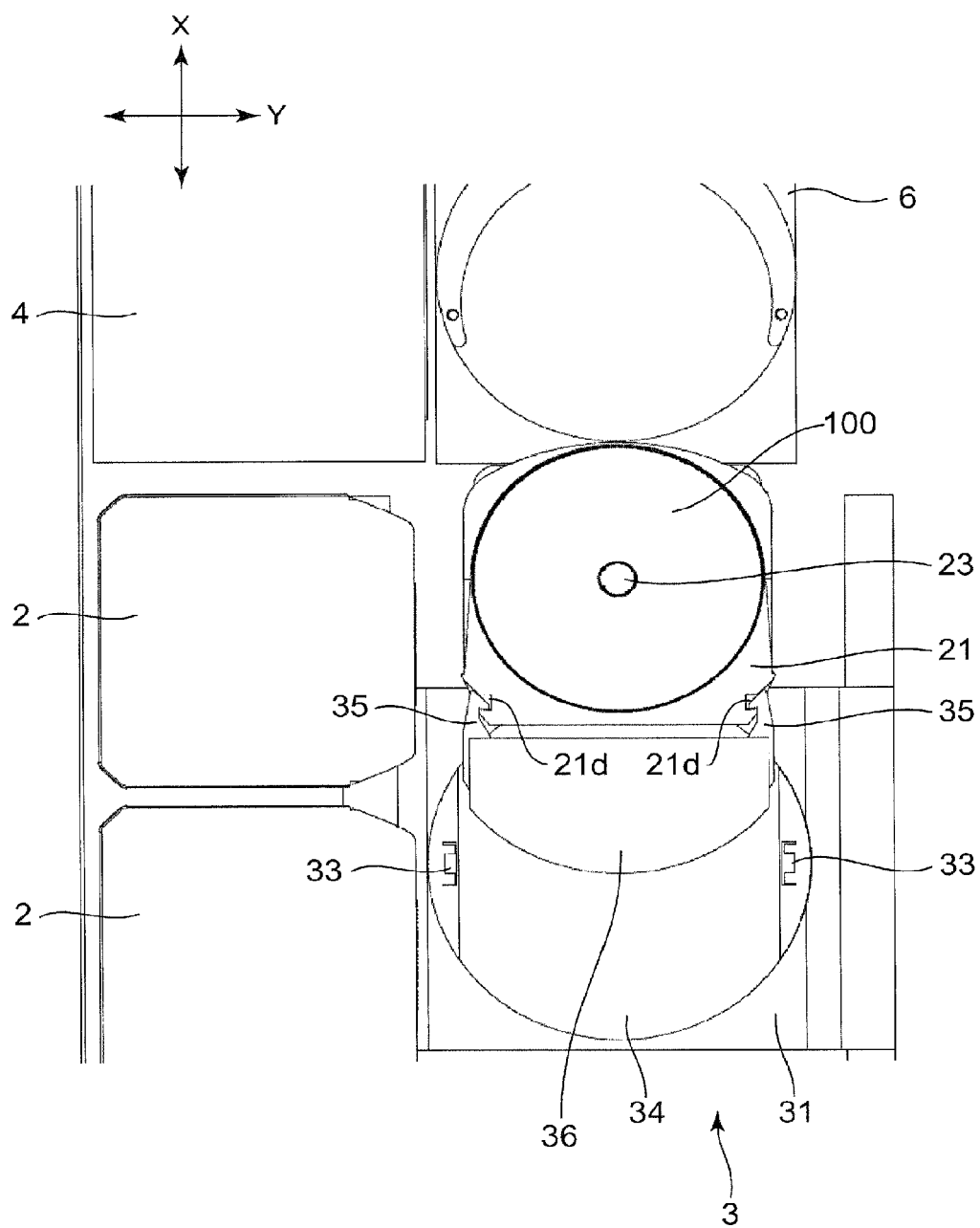
FIG. 18 is a plan view showing the state where the picker has shifted the tray above the separator.
Figure 19:
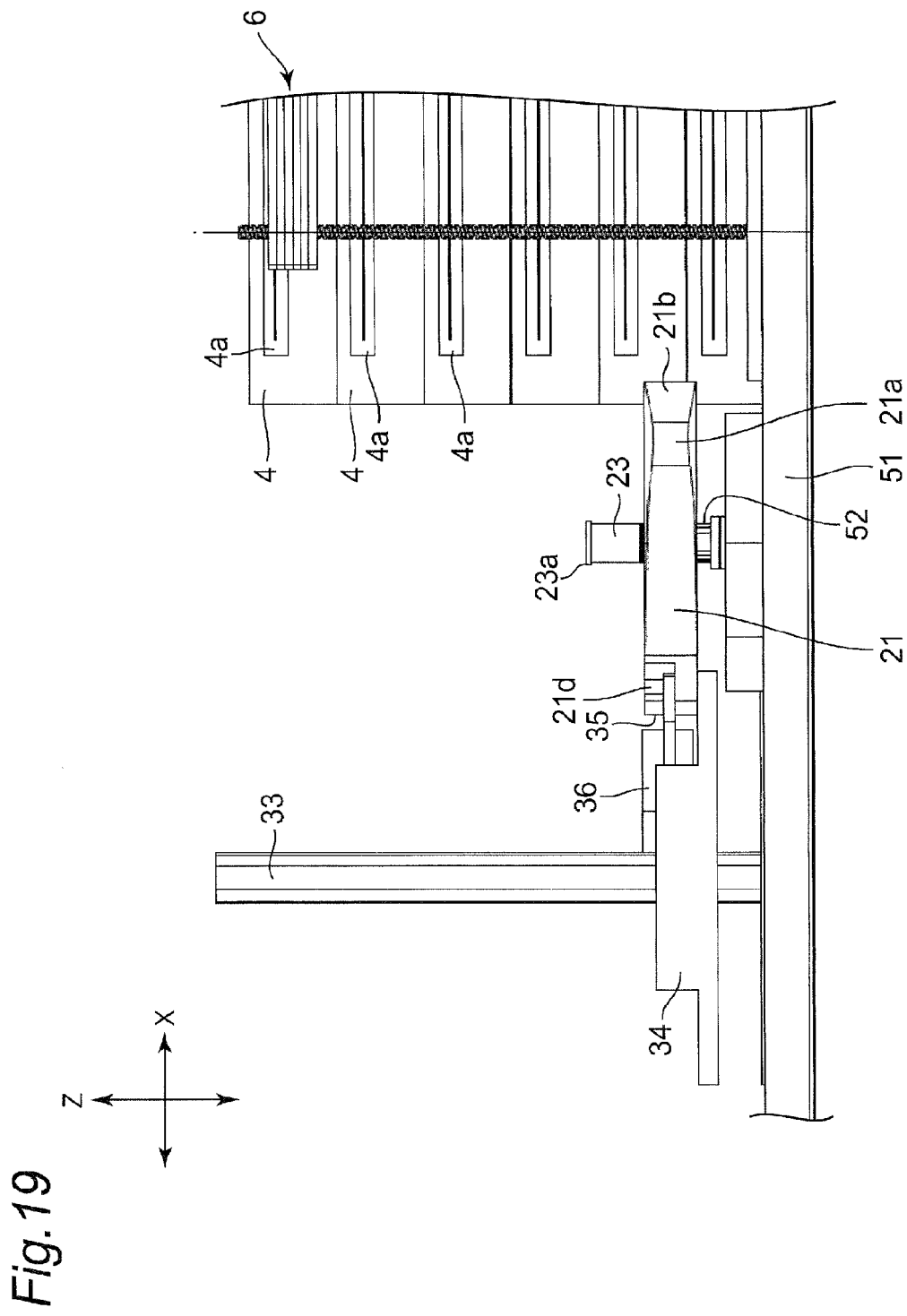
FIG. 19 is a side view showing the state where the picker has lowered the tray and the shaft portion of a separator is inserted into the center hole of the disc.

As shown in FIG. 18, when the chuck 36 of the picker 3 advances and the through hole 21e is positioned vertically above the shaft portion 52 of the separator 5, the up-and-down table 34 of the picker 3 is lowered. Thus, as shown in FIG. 19, the shaft portion 52 of the separator 5 is inserted into the center hole 100a of each of the discs 100 through the through hole 21e of the tray 21. At this time, the tip portion of the shaft portion 52 engages with the core rod 23, and the core rod 23 comes off from the center hole 100a of each of the discs 100.

Figure 20:
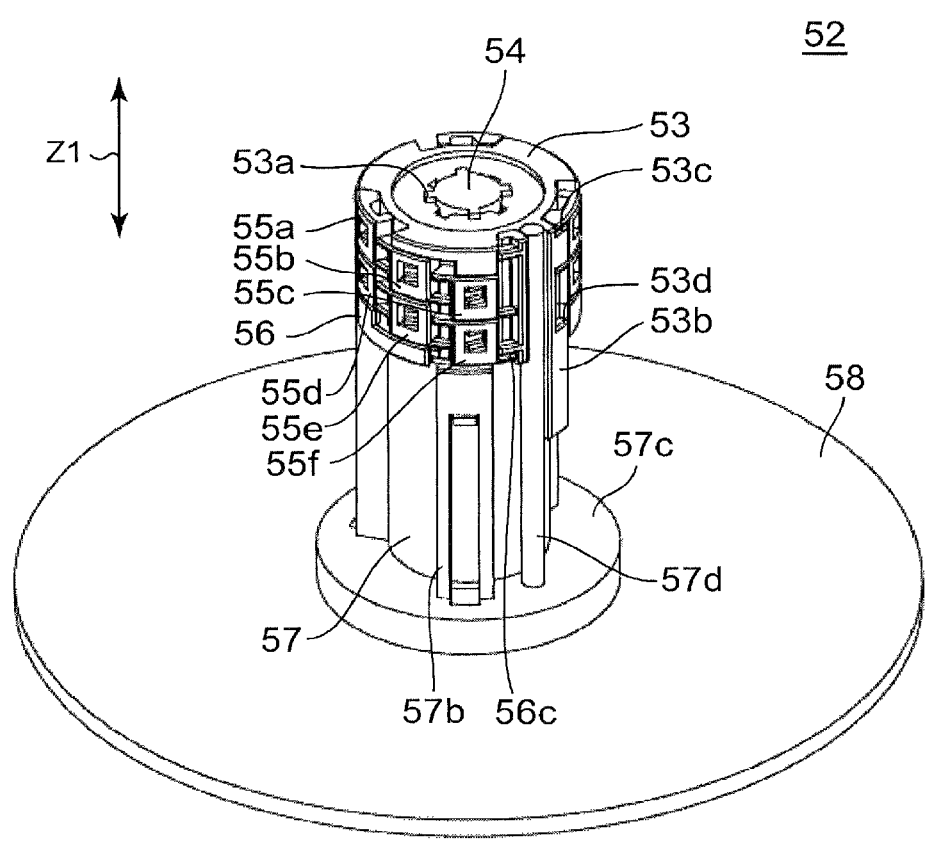
FIG. 20 is a perspective view showing the structure of the shaft portion of the separator.
Figure 21:
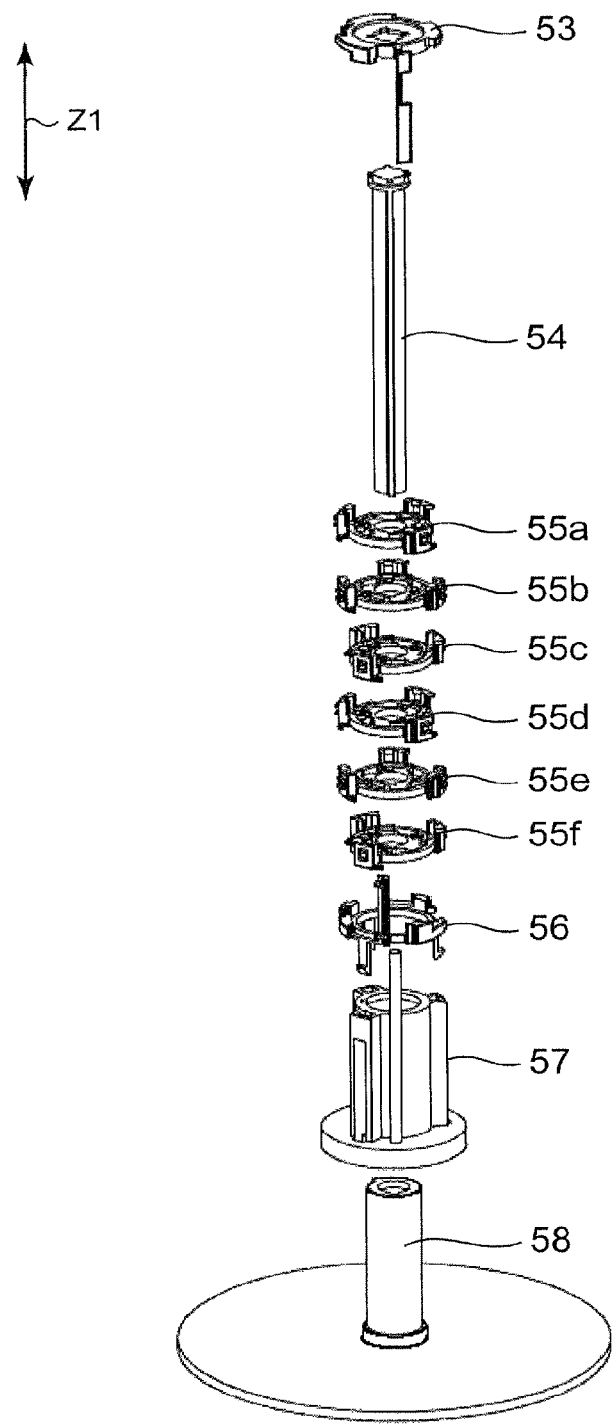
FIG. 21 is an exploded perspective view showing the structure of the shaft portion of the separator.

FIG. 20 is a perspective view showing the structure of the shaft portion 52 of the separator 5, and FIG. 21 is an exploded perspective view thereof. As shown in FIG. 21, the shaft portion 52 includes an upper piece 53, an up-and-down shaft 54, a plurality of disc chuck units 55a to 55f, a lower piece 56, a rotary base 57, and a base 58.

Figure 22:
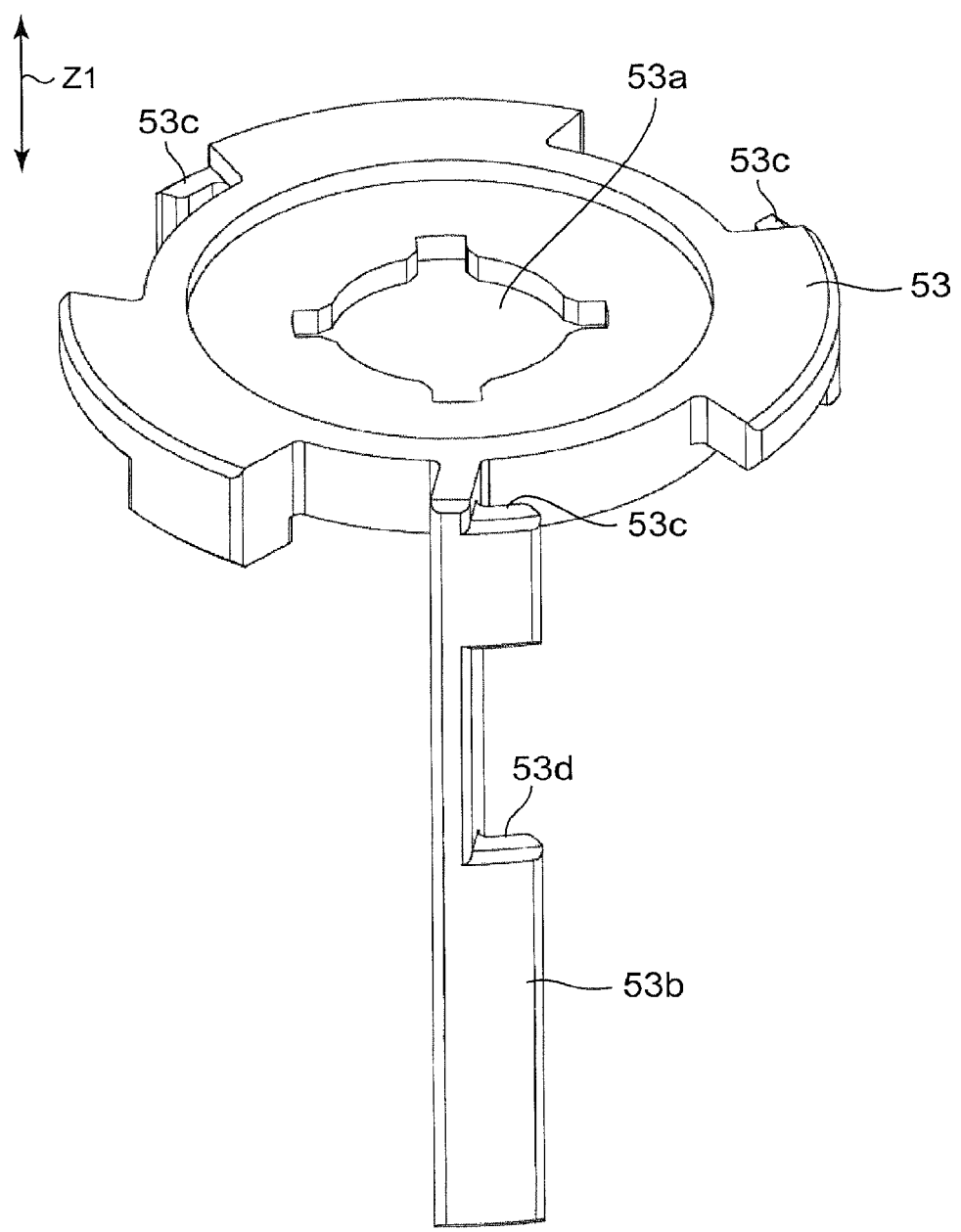
FIG. 22 is an enlarged perspective view of an upper piece included in the shaft portion of the separator shown in FIG. 20.
Figure 23:
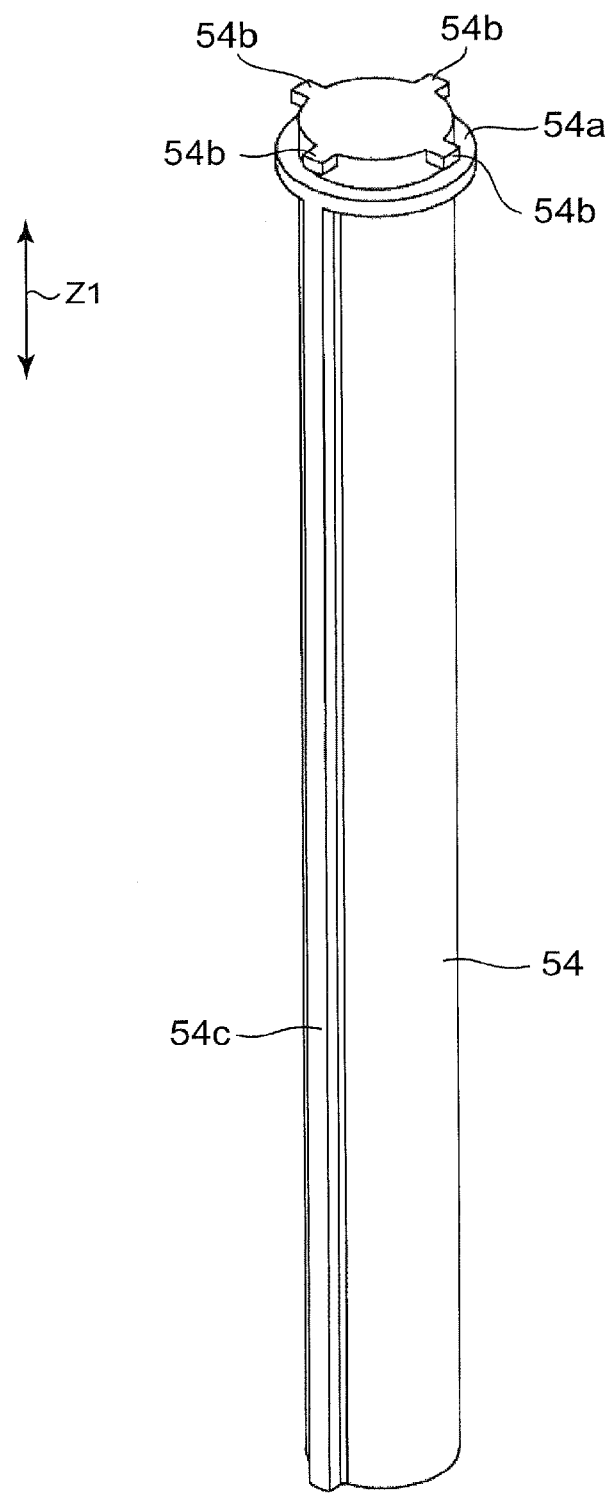
FIG. 23 is an enlarged perspective view of an up-and-down shaft included in the shaft portion of the separator shown in FIG. 20.

FIG. 22 is an enlarged perspective view of the upper piece 53. FIG. 23 is an enlarged perspective view of the up-and-down shaft 54. At the center portion of the upper piece 53, an up-and-down shaft insert hole 53a is provided. At the tip portion of the up-and-down shaft 54, a flange portion 54a and a plurality of upper piece holding nails 54b are provided. The up-and-down shaft 54 is inserted into the up-and-down shaft insert hole 53a such that the flange portion 54a is brought into contact with the bottom face of the upper piece 53. By the engagement of the plurality of upper piece holding nails 54b with the top face of the upper piece 53, the upper piece 53 can rotatably be held. Further, at the outer circumferential face of the up-and-down shaft 54, a convex rib 54c is provided so as to extend in the axial direction Z1 of the shaft portion 52.

Further, at the outer circumferential portion of the upper piece 53, a plurality of first stage-use lower stoppers 53c that engage with the first-stage disc chuck unit 55a are provided. Further, at the outer circumferential portion of the upper piece 53, a driver shaft 53b is provided so as to extend downward in the axial direction Z1. The driver shaft 53b is provided with the first stage-use lower stoppers 53c and a fourth stage-use lower stopper 53d that engages with the fourth-stage disc chuck unit 55d. The function of the stoppers 53c and 53d will be detailed later.

Figure 24:
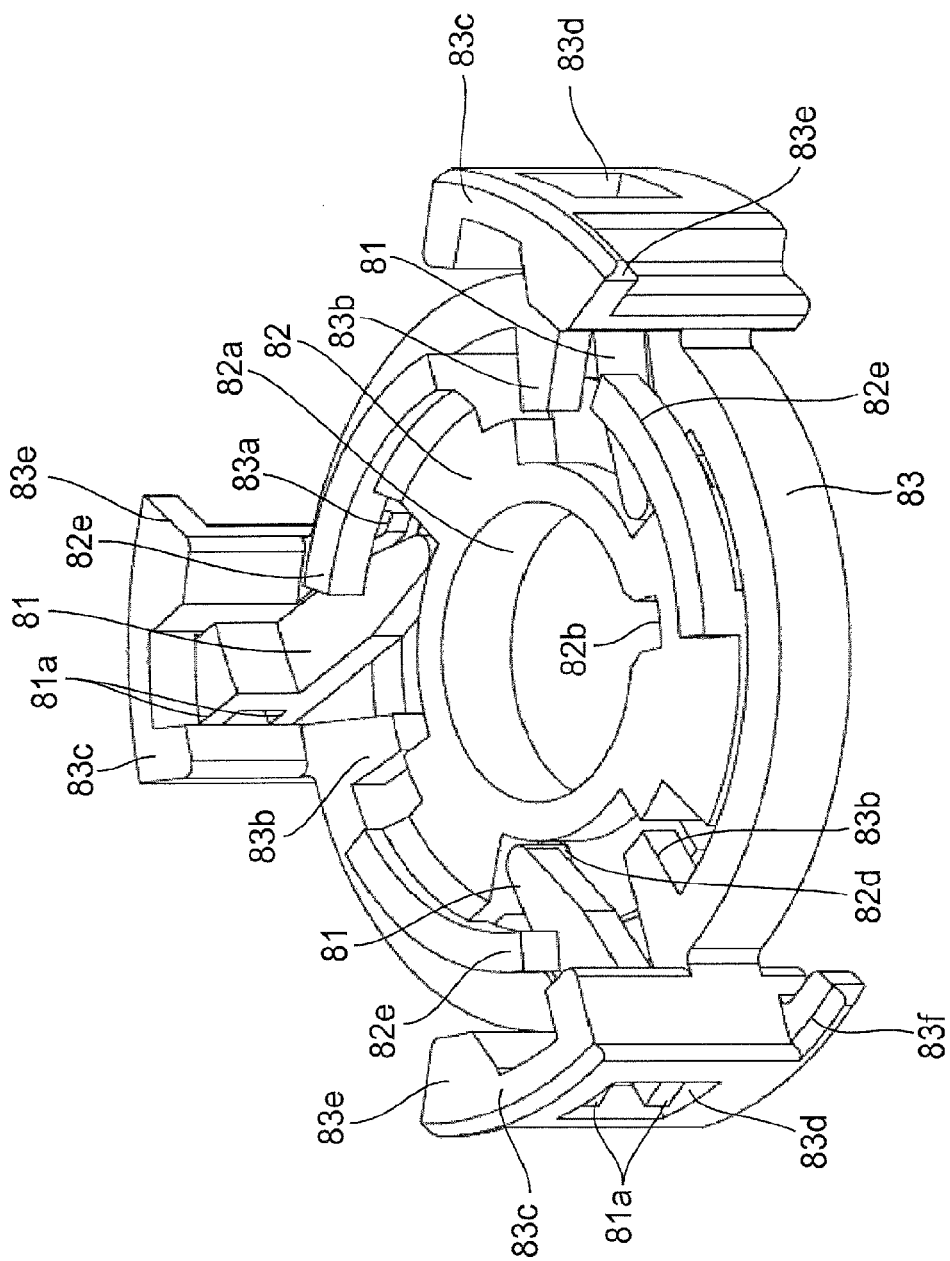
FIG. 24 is a perspective view of a disc chuck unit included in the shaft portion of the separator shown in FIG. 20, showing the state where a pair of chuck nails included in the unit is positioned at the receding position.
Figure 25:
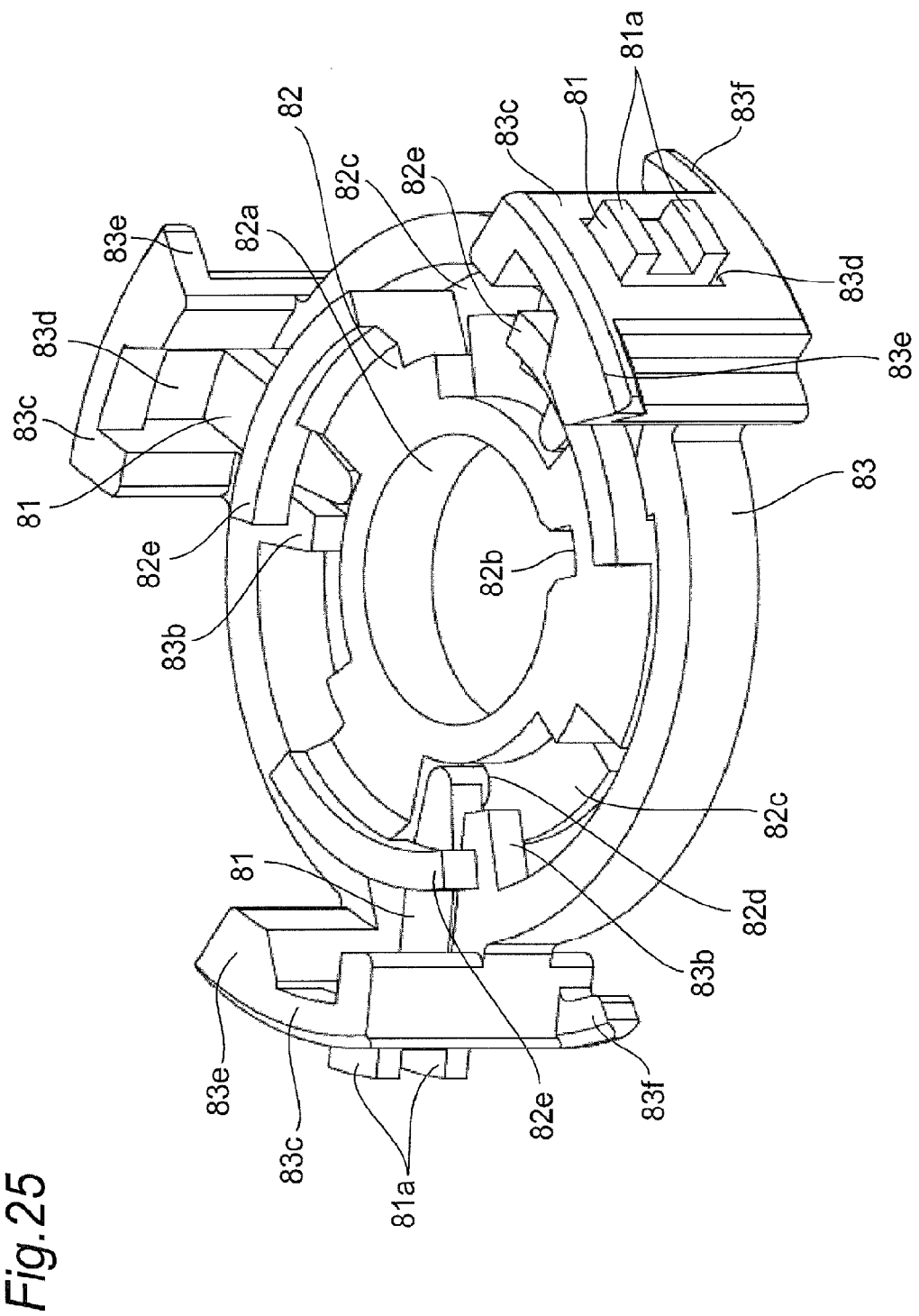
FIG. 25 is a perspective view of the disc chuck unit included in the shaft portion of the separator shown in FIG. 20, showing the state where the pair of chuck nails included in the unit is positioned at the holding position.
Figure 26:
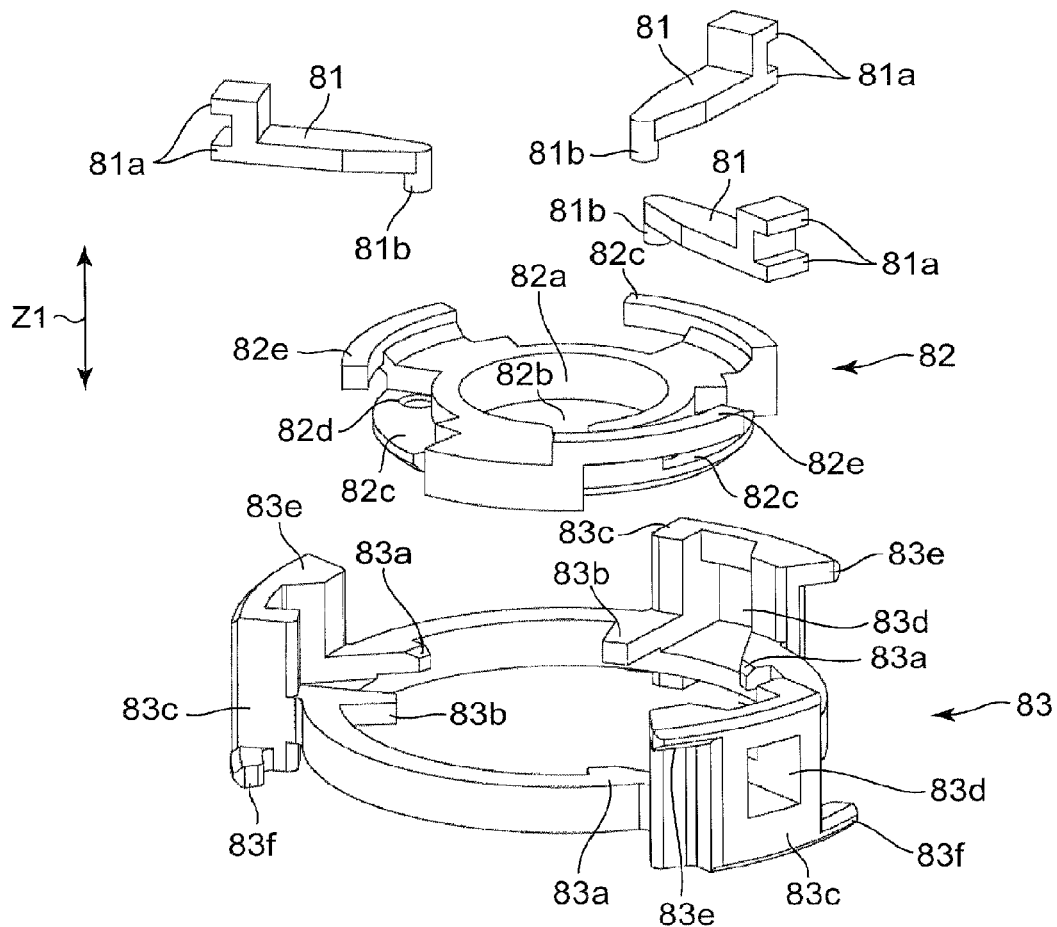
FIG. 26 is an exploded perspective view of the disc chuck unit included in the shaft portion of the separator shown in FIG. 20.

FIGS. 24 and 25 are each a perspective view showing the structure of the disc chuck units 55a to 55f, and FIG. 26 is an exploded perspective view thereof. The disc chuck units 55a to 55f each include a plurality of hooks 81 being one example of a plurality of disc holding portions, an inner circumferential base 82, and an outer circumferential base 83.

As shown in FIG. 25, at one end portion of each hook 81, a pair of chuck nails 81a being one example of chuck nail portions that can enter each recess portion 100b provided at the inner circumferential portion of the disc 100 to thereby clamp the inner circumferential portion of the disc 100. At the other end portion of the hook 81, a rotary shaft 81b is provided as shown in FIG. 26.

The inner circumferential base 82 is a substantially ring-like member. At the inner circumferential portion of the inner circumferential base 82, an up-and-down shaft insert hole 82a into which the up-and-down shaft 54 is slidably inserted is provided. The up-and-down shaft insert hole 82a is provided with a key groove 82b into which the convex rib 54c of the up-and-down shaft 54 is inserted is formed. By the convex rib 54c of the up-and-down shaft 54 being inserted into the key groove 82b, when the up-and-down shaft 54 rotates about its axis, the inner circumferential base 82 rotates with the up-and-down shaft 54 in the integrated manner.

The inner circumferential base 82 is provided with a plurality of hook sliding faces 82c. The hook sliding faces 82c are each provided with a rotary shaft hole 82d. By the rotary shaft 81b being inserted into the rotary shaft hole 82d, each hook 81 is attached so as to be rotatable at a certain angle along the hook sliding faces 82c. Further, the inner circumferential base 82 is provided with a plurality of hook holding nails 82e that restrict shifting of the hooks 81 toward the upper piece 53.

The outer circumferential base 83 is a substantially ring-like member. The inner circumferential portion of the outer circumferential base 83 is provided with a plurality of inner circumferential base receiving portions 83a that hold the hook holding nails 82e from below. Further, the inner circumferential portion of the outer circumferential base 83 is provided with a plurality of inner circumferential base holding nails 83b that are brought into contact with the hook sliding faces 82c from above so as to restrict shifting of the inner circumferential base 82 toward the upper piece 53. The outer circumferential base 83 rotatably holds the inner circumferential base 82 by the plurality of inner circumferential base receiving portions 83a and the plurality of inner circumferential base holding nails 83b.

Figure 27:
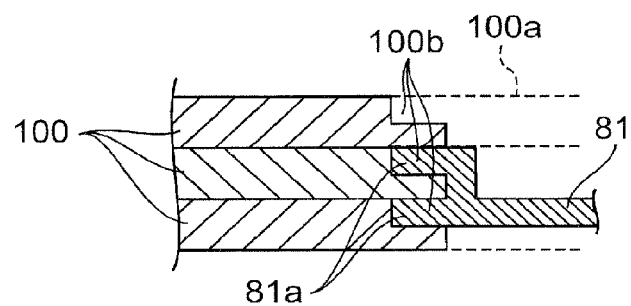
FIG. 27 is a cross-sectional view showing the state where the pair of chuck nails shown in FIG. 25 enter recess portions at the inner circumferential portion of the discs, and clamp the inner circumferential portion of the disc.
Figure 28:
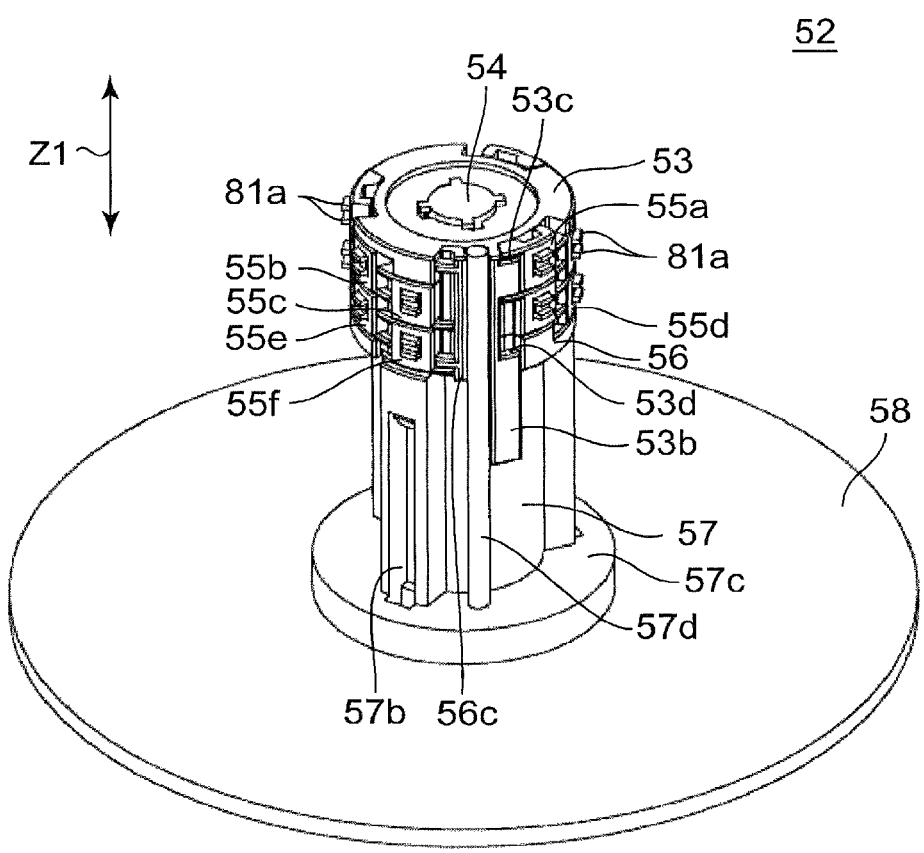
FIG. 28 is a perspective view showing the structure of the shaft portion of the separator, showing the state where a pair of chuck nails of each of the disc chuck units is positioned at the holding position.

The outer circumferential portion of the outer circumferential base 83 is provided with a plurality of outer circumferential walls 83c which are upright in the thickness direction of the outer circumferential base 83. The outer circumferential walls 83c are each provided with a hook enter/exit hole 83d. The hooks 81 are each inserted into the hook enter/exit hole 83d. By the inner circumferential base 82 being rotated in the state where the outer circumferential base 83 is fixed, the hooks 81 enter and exit the hook enter/exit holes 83d as shown in FIGS. 24 and 25. As shown in FIG. 25, when a pair of chuck nails 81a of each hook 81 protrudes from the hook enter/exit hole 83d, the pair of chuck nails 81a enters the recess portion 100b of the inner circumferential portion of the disc 100 as shown in FIG. 27, and clamps the inner circumferential portion of the disc 100. On the other hand, as shown in FIG. 24, when a pair of chuck nails 81a of each hook 81 positions in the hook enter/exit hole 83d, the pair of chuck nails 81a is away from the inner circumferential portion of the disc 100. In the following, the position at which a pair of chuck nails 81a clamps the inner circumferential portion of the disc 100 is referred to as the "holding position". Further, the position at which a pair of chuck nails 81a is away from the inner circumferential portion of the disc 100 is referred to as the "receding position". FIG. 28 shows the state where a pair of chuck nails 81a of each of the disc chuck units 55a to 55f is positioned at the holding position.

Figure 29:
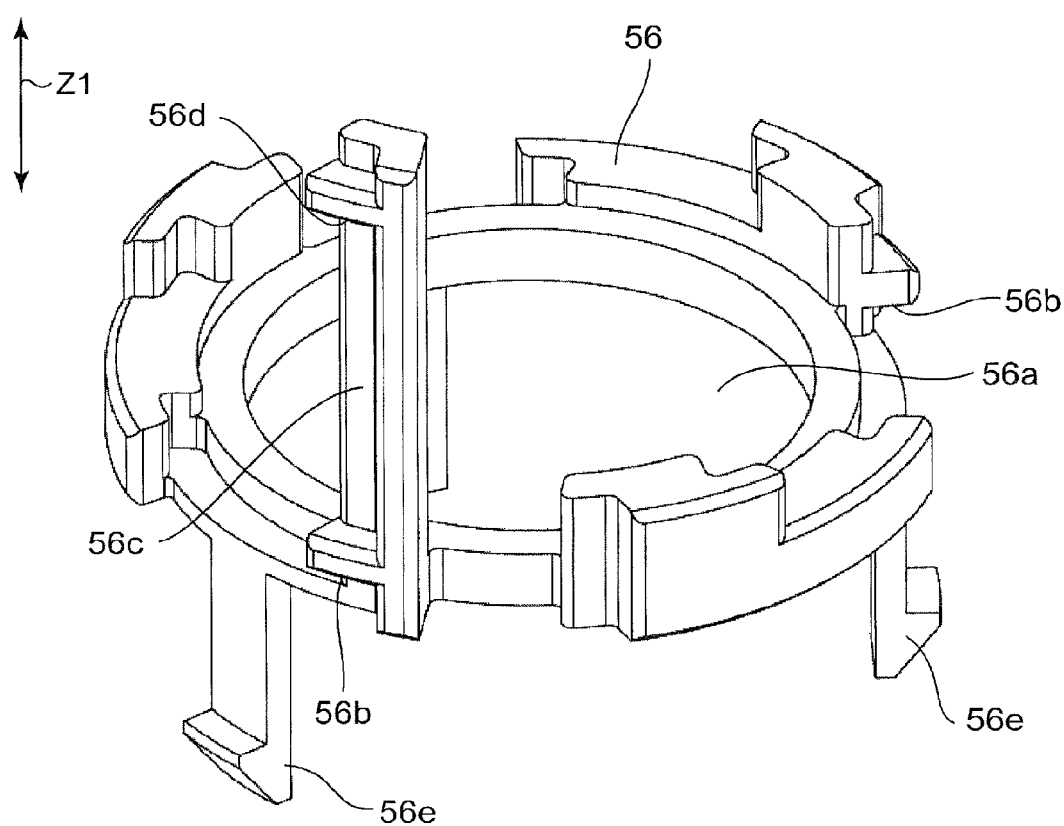
FIG. 29 is an enlarged perspective view of a lower piece included in the shaft portion of the separator shown in FIG. 20.

FIG. 29 is an enlarged perspective view of the lower piece 56. The lower piece 56 is a substantially ring-like member. At the center portion of the lower piece 56, an up-and-down shaft insert hole 56a into which the up-and-down shaft 54 is slidably inserted is provided. The outer circumferential portion of the lower piece 56 is provided with a plurality of sixth stage-use upper stoppers 56b that engage with the sixth-stage disc chuck unit 55f. Further, at the outer circumferential portion of the lower piece 56, a driver shaft 56c is provided so as to extend upward in the axial direction Z1. The driver shaft 56c is provided with the sixth stage-use upper stopper 56b and a third stage-use upper stopper 56d that engages with the third-stage disc chuck unit 55c. The function of the stoppers 56b and 56d will be detailed later. Further, at the outer circumferential portion of the lower piece 56, a plurality of rotary base fixing nails 56e are provided so as to extend downward in the axial direction Z1.

Figure 30:
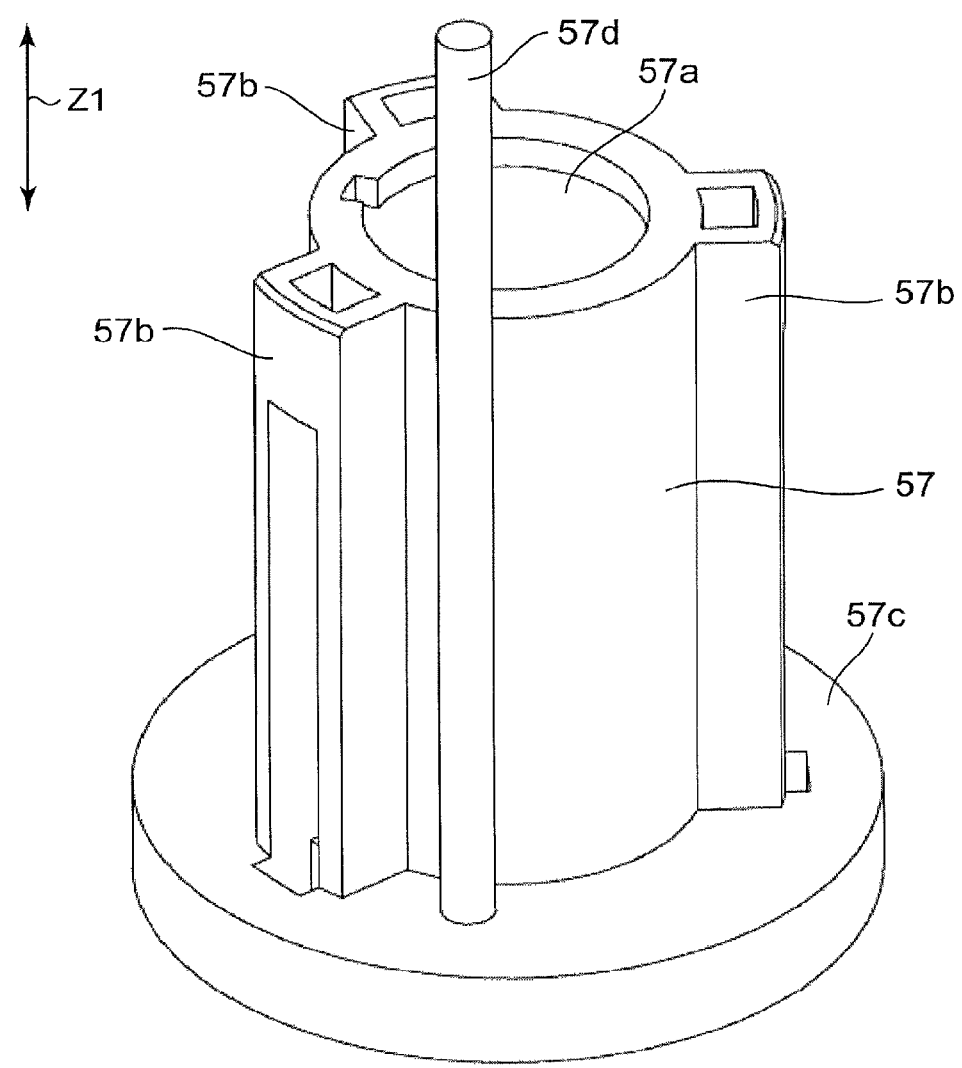
FIG. 30 is an enlarged perspective view of a rotary base included in the shaft portion of the separator shown in FIG. 20.

FIG. 30 is an enlarged perspective view of the rotary base 57. The rotary base 57 is a substantially cylindrical member. At the center portion of the rotary base 57, a rotary shaft insert hole 57a into which a rotary shaft 58a of the base 58, whose description will follow, is rotatably inserted is provided. At the outer circumferential portion of the rotary base 57, lower piece fixing nail hooking portions 57b that engage with the rotary base fixing nails 56e of the lower piece 56 are provided. The lower piece 56 is held at the rotary base 57 by the rotary base fixing nails 56e engaging with the lower piece fixing nail hooking portions 57b.

The bottom portion 57c of the rotary base 57 is formed to have a diameter that is greater than the center hole 100a of the disc 100 in order to hold the disc 100 at its top face, and that is smaller than the through hole 21e of the tray 2. At the bottom portion 57c of the rotary base 57, a driver shaft 57d is provided so as to extend upward in the axial direction Z1.

Figure 31:
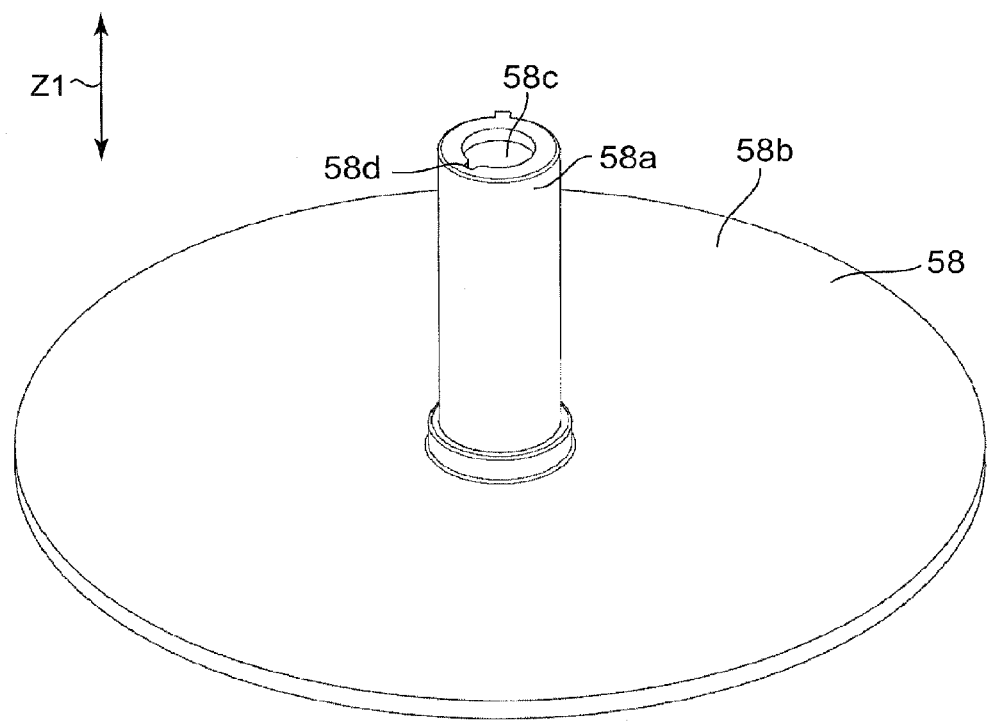
FIG. 31 is an enlarged perspective view of a base included in the shaft portion of the separator shown in FIG. 20.

FIG. 31 is an enlarged perspective view of the base 58. The base 58 includes a cylindrical rotary shaft 58a that is inserted into the rotary shaft insert hole 57a of the rotary base 57, and a circular plate 58b that is provided at the bottom portion of the rotary shaft 58a. The rotary shaft 58a and the circular plate 58b are provided with an up-and-down shaft insert hole 58c such that the up-and-down shaft insert hole 58c penetrates through their center portion in the axial direction Z1. At the up-and-down shaft insert hole 58c, a key groove 58d into which the convex rib 54c of the up-and-down shaft 54 is inserted is formed. By the convex rib 54c of the up-and-down shaft 54 being inserted into the key groove 58e, the base 58 rotates with the up-and-down shaft 54 in the integrated manner when the up-and-down shaft 54 rotates about its axis.

In the present embodiment, as shown in FIG. 26, the outer circumferential walls 83c of the disc chuck units 55a to 55f are provided three in number and at an interval of 108 degrees.

The height of each outer circumferential wall 83c is set to be as great as the thickness of three discs 100. The height of the body portion of the outer circumferential base 83 is set to be as great as the thickness of one disc 100. Further, at each of the outer circumferential walls 83, an upper stopper 83e is provided at the upper left portion in front view (as seen from the outer side), and a lower stopper 83f is provided at the lower right portion.

Figure 32:
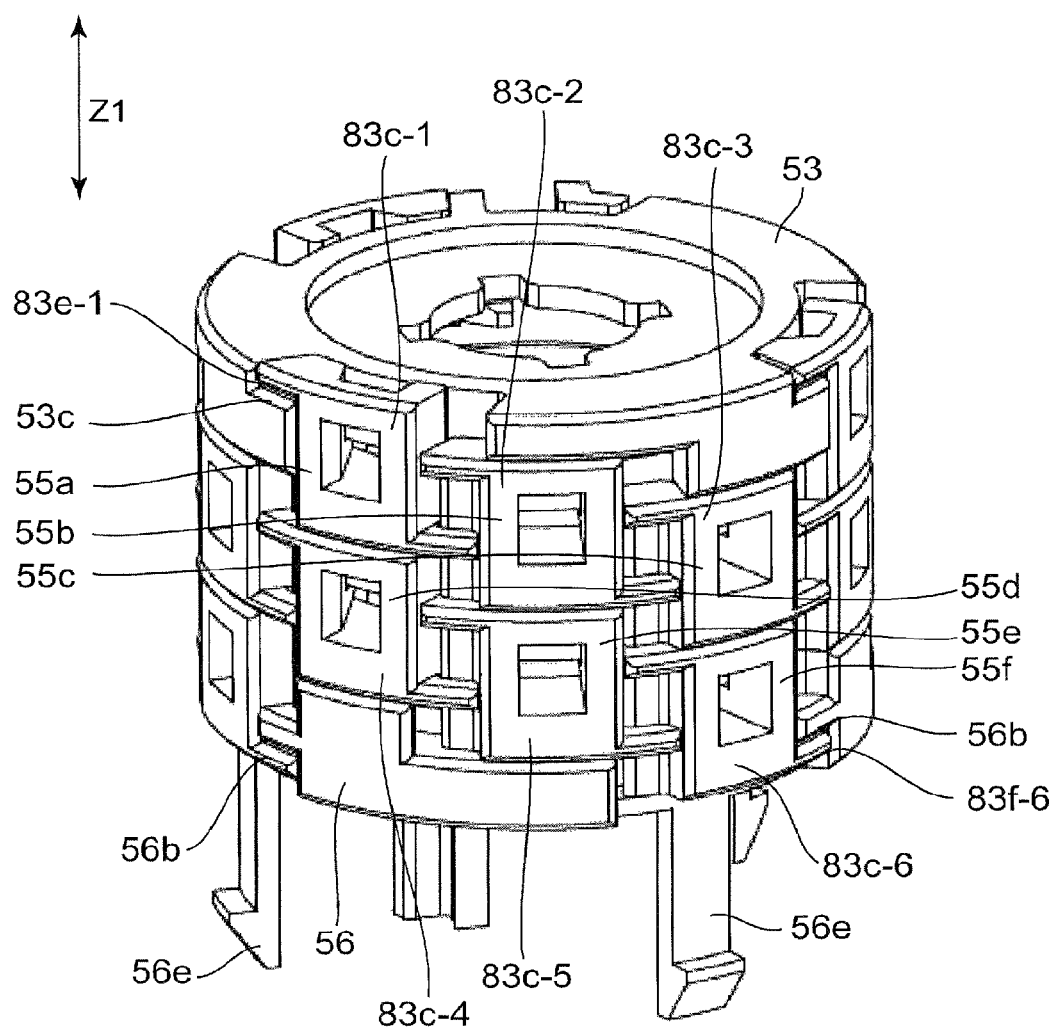
FIG. 32 is a perspective view showing the state where the upper piece, the plurality of disc chuck units, and the lower piece are assembled.
Figure 33:
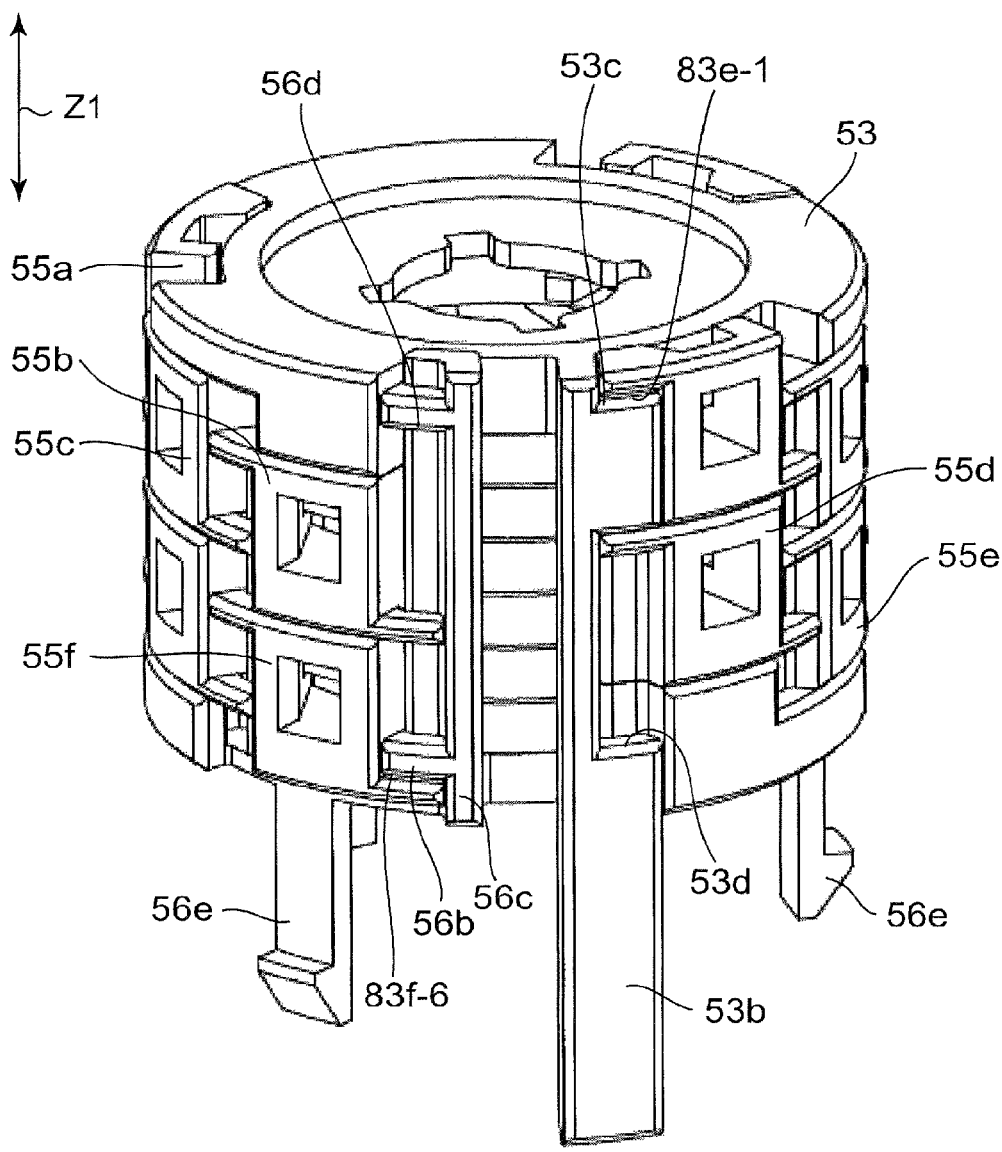
FIG. 33 is a perspective view showing the state where the upper piece, the plurality of disc chuck units, and the lower piece are assembled, as seen from an angle other than that in FIG. 32.

FIGS. 32 and 33 are each a perspective view showing the state where the upper piece 53, the disc chuck units 55a to 55f, and the lower piece 56 are assembled. As shown in FIGS. 32 and 33, the first- to third-stage disc chuck units 55a to 55c are stacked so as to be out of phase in the circumferential direction, such that their respective outer circumferential walls 83c-1 to 83c-3 are not brought into contact with one another. Similarly, the fourth- to sixth-stage disc chuck units 55d to 55f are stacked so as to be out of phase in the circumferential direction, such that their respective outer circumferential walls 83c-4 to 83c-6 are not brought into contact with one another.

The outer circumferential wall 83c-1 of the first-stage disc chuck unit 55a and the outer circumferential wall 83c-4 of the fourth-stage disc chuck unit 55d are adjacent to each other in the axial direction Z1. The outer circumferential wall 83c-2 of the second-stage disc chuck unit 55b and the outer circumferential wall 83c-5 of the fifth-stage disc chuck unit 55e are adjacent to each other in the axial direction Z1. The outer circumferential wall 83c-3 of the third-stage disc chuck unit 55c and the outer circumferential wall 83c-6 of the sixth-stage disc chuck unit 55f are adjacent to each other in the axial direction Z1.

Further, the upper stoppers 83e-1 of the first-stage disc chuck unit 55a engage with the first stage-use lower stoppers 53c of the upper piece 53. The lower stoppers 83f-6 of the sixth-stage disc chuck unit 55f engage with the sixth stage-use upper stoppers 56b of the lower piece 56. Further, as shown in FIG. 20, in the space where the driver shaft 53b of the upper piece 53 and the driver shaft 56c of the lower piece 56 oppose to each other, the driver shaft 57d of the rotary base 57 is arranged. This driver shaft 57d restricts the axial rotation of the upper piece 53, that of the outer circumferential base 83 of the disc chuck units 55a to 55f, and that of the lower piece 56.

When the up-and-down shaft 54 rises from the state shown in FIGS. 32 and 33, the upper piece 53 held by the tip portion of the up-and-down shaft 54 is raised. On the other hand, the lower piece 56 does not rise because it is held by the rotary base 57. Thus, the disc chuck units 55a to 55f shift to widen the intervals from one another, and enter the state shown in FIGS. 34 to 36.

Figure 35:
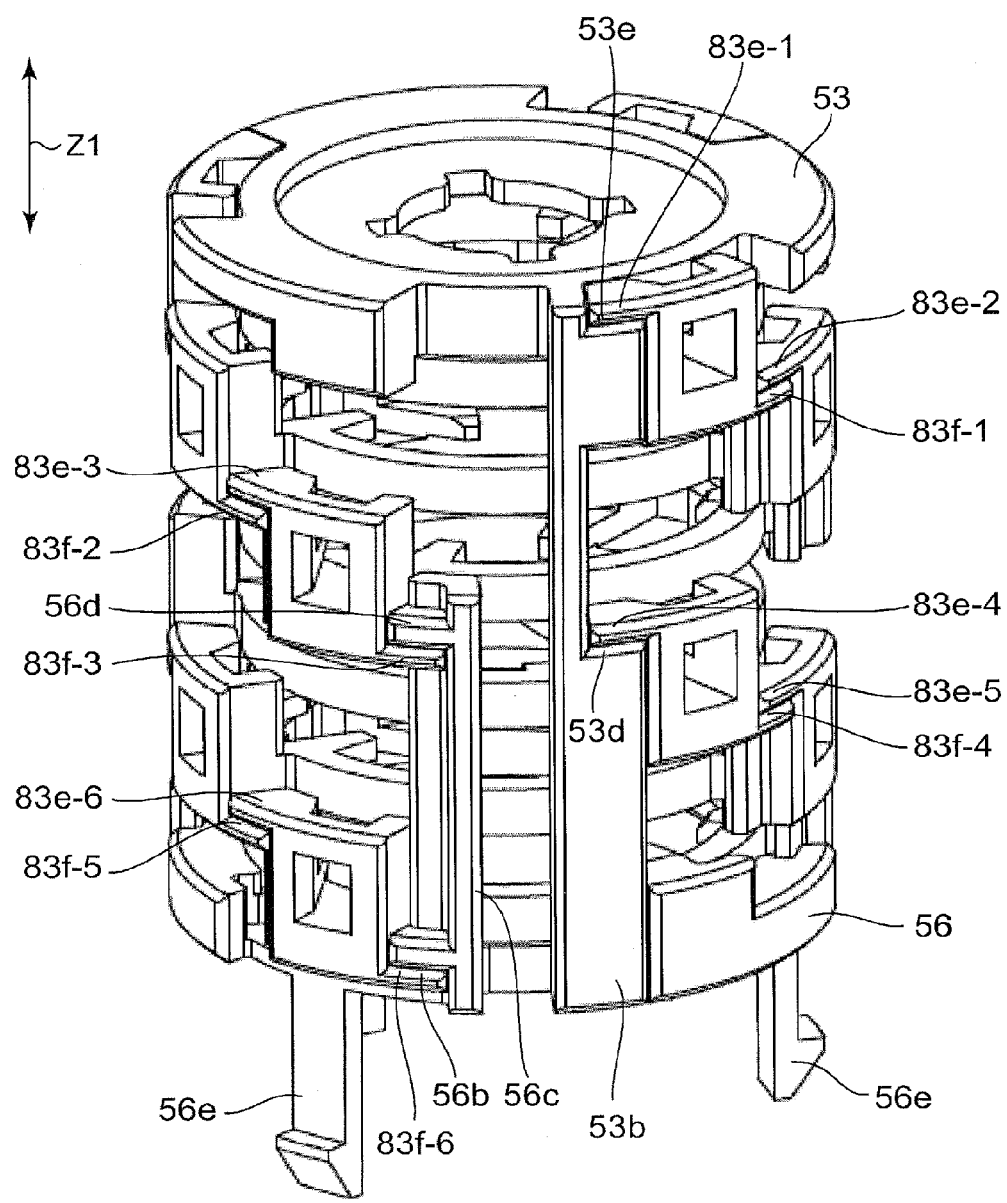
FIG. 35 is a perspective view showing the state where the intervals of the plurality of disc chuck units shown in FIG. 33 are widened in the axial direction, as seen from an angle other than that in FIG. 34.

Here, the lower stoppers 83f-1 of the first-stage disc chuck unit 55a engage with the upper stoppers 83e-2 of the second-stage disc chuck unit 55b. The lower stoppers 83f-2 of the second-stage disc chuck unit 55b engage with the upper stoppers 83e-3 of the third-stage disc chuck unit 55c. The lower stoppers 83f-3 of the third-stage disc chuck unit 55c engage with the upper stoppers 83e-4 of the fourth-stage disc chuck unit 55d, or with the third stage-use upper stopper 53d of the lower piece 56. Further, as shown in FIG. 35, the upper stoppers 83e-4 of the fourth-stage disc chuck unit 55d engage with the fourth stage-use lower stopper 53d of the upper piece 53. The lower stoppers 83f-4 of the fourth-stage disc chuck unit 55d engage with the upper stoppers 83e-5 of the fifth-stage disc chuck unit 55e. The lower stoppers 83f-5 of the fifth-stage disc chuck unit 55e engage with the upper stoppers 83e-6 of the sixth-stage disc chuck unit 55f.

Figure 34:
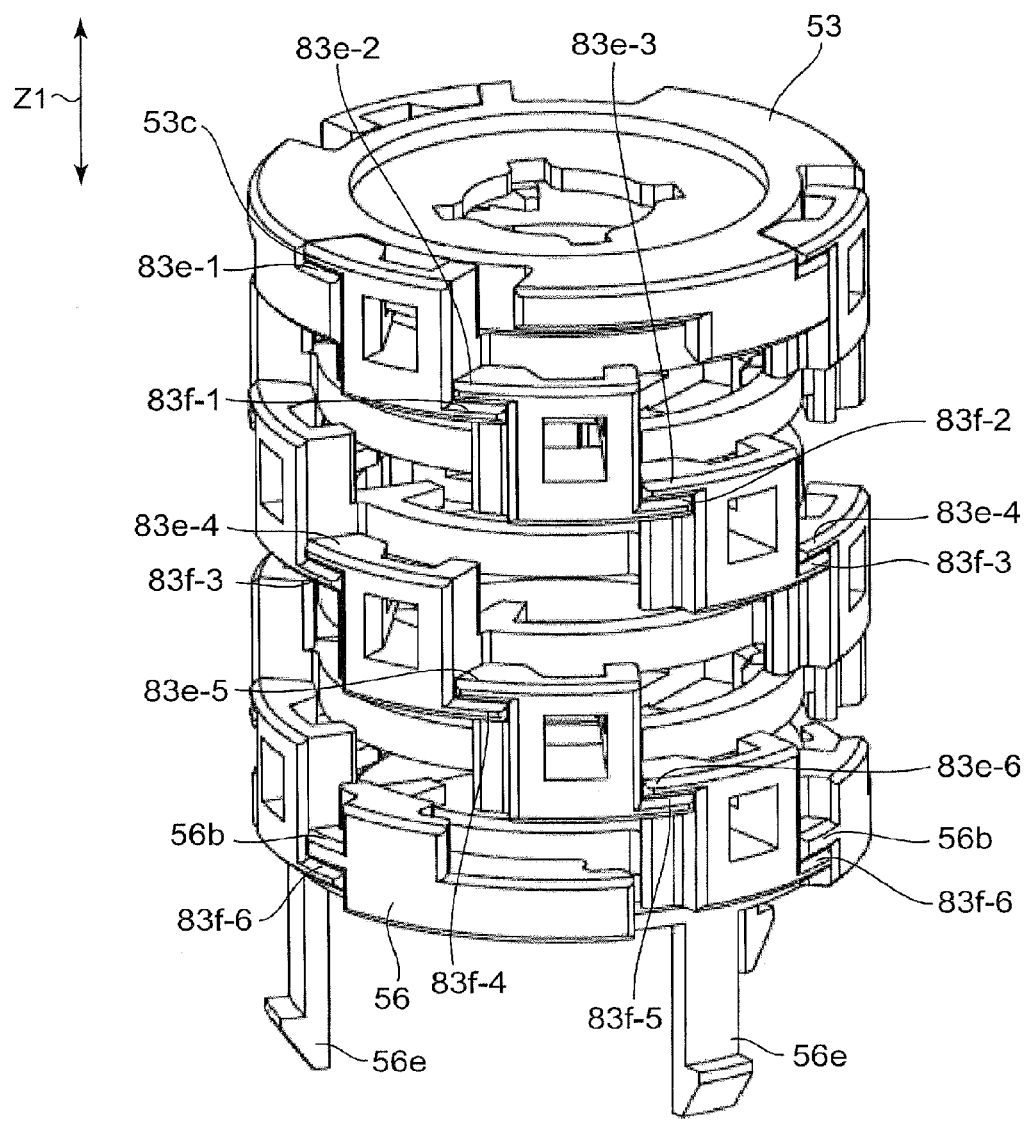
FIG. 34 is a perspective view showing the state where the intervals of the plurality of disc chuck units shown in FIG. 32 are widened in the axial direction.
Figure 36:
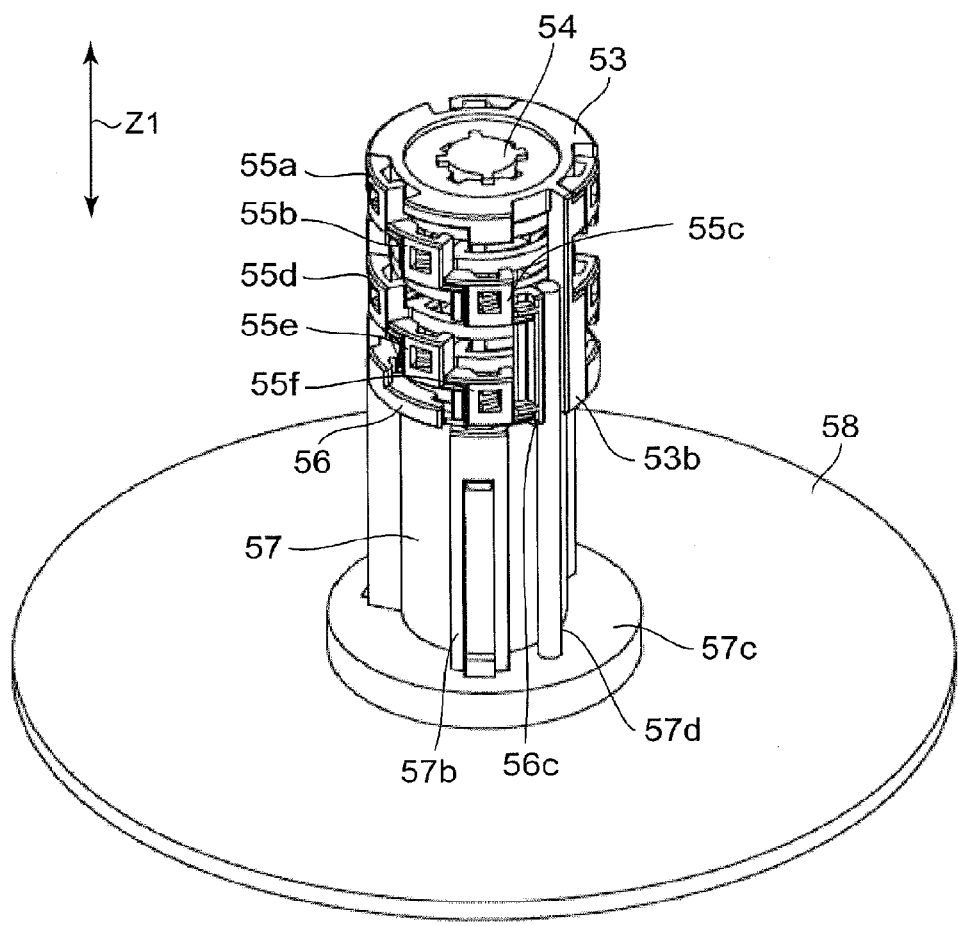
FIG. 36 is a perspective view showing the structure of the shaft portion of the separator, showing the state where the intervals of the plurality of disc chuck units are widened in the axial direction, and the pair of chuck nails of each of the disc chuck units is positioned at the receding position.
Figure 37:
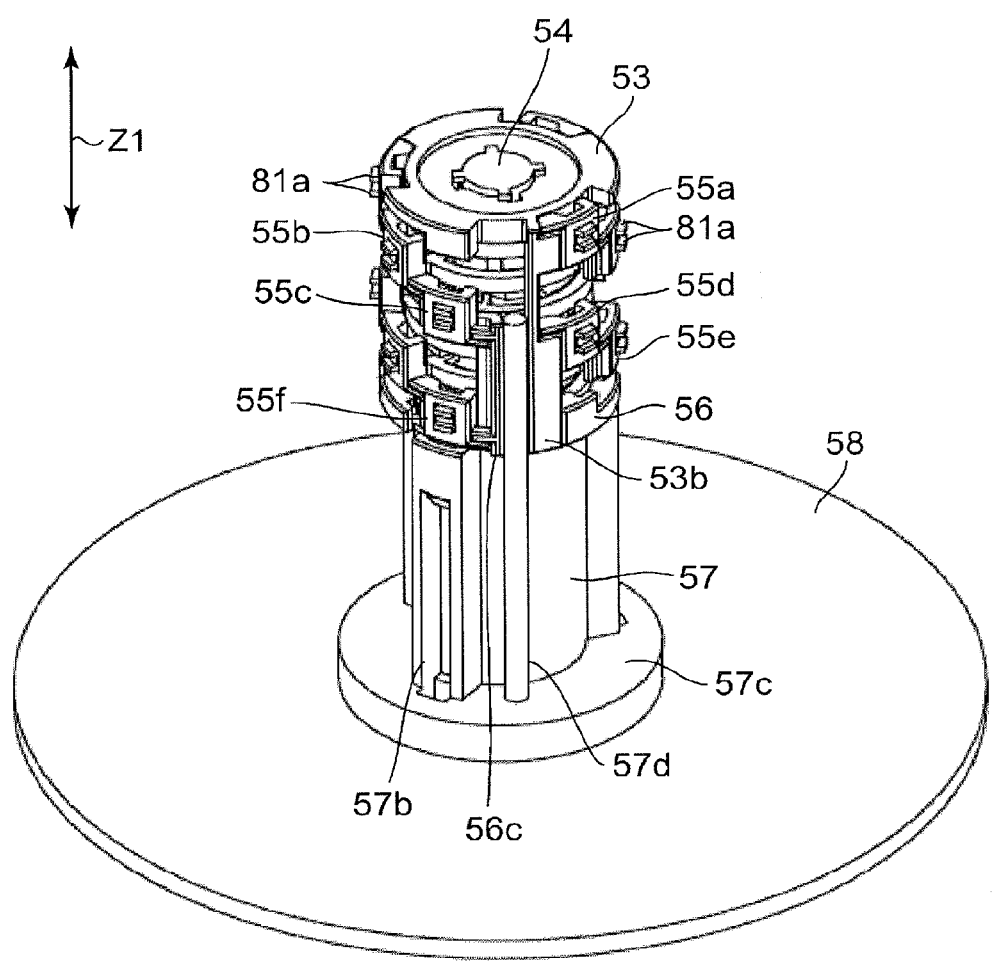
FIG. 37 is a perspective view showing the structure of the shaft portion of the separator, showing the state where the intervals of the plurality of disc chuck units are widened in the axial direction, and the pair of chuck nails of each of the disc chuck units is positioned at the holding position.

When the up-and-down shaft 54 is rotated about its axis in the state shown in FIGS. 34 to 36, as shown in FIG. 37, a pair of chuck nails 81a of each of the disc chuck units 55a to 55f shifts to the holding position. This is because the inner circumferential base 82 of the disc chuck units 55a to 55f axially rotates together with the up-and-down shaft 54, while the driver shaft 57d restricts the axial rotation of the outer circumferential base 83 of the disc chuck units 55a to 55f.

As shown in FIG. 19, when the shaft portion 52 of the separator 5 is inserted into the center hole 100a of each of the discs 100 through the through hole 21e of the tray 21, the shaft portion 52 is in the state shown in FIG. 20. By the up-and-down shaft 54 being axially rotated in this state, as shown in FIG. 28, a pair of chuck nails 81a of each of the disc chuck units 55a to 55f shifts to the holding position. Thus, as shown in FIG. 27, each pair of chuck nails 81a enters the recess portion 100b of each disc 100, to thereby clamp the inner circumferential portion of each disc 100. It is to be noted that, at this time, since the pairs of chuck nails 81a are provided so as to be out of phase in the circumferential direction, they are not brought into contact with one another. Accordingly, even when the plurality of discs 100 are stacked in close contact with one another, the inner circumferential portion of the discs 100 can be clamped.

Figure 38:
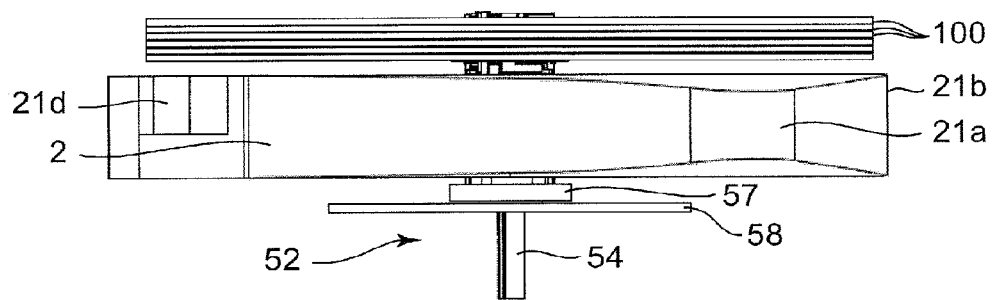
FIG. 38 is a side view showing the state where the shaft portion of the separator lifts a plurality of discs above the tray.
Figure 39:
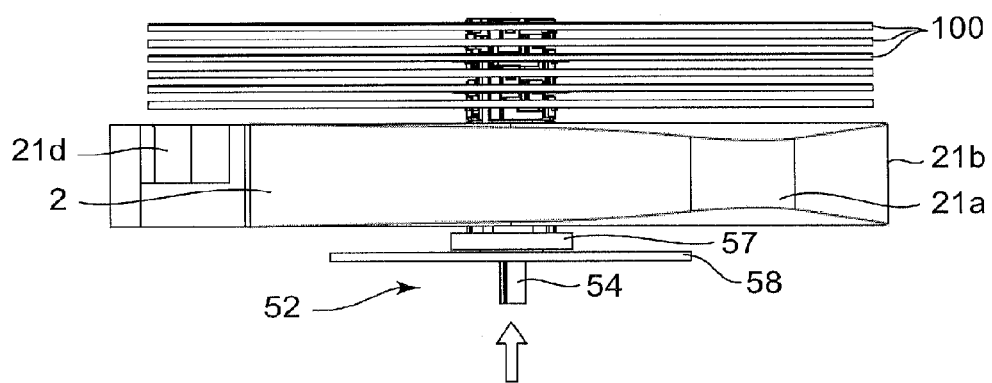
FIG. 39 is a side view showing the state where the shaft portion of the separator separates the plurality of discs from one another.
Figure 40:
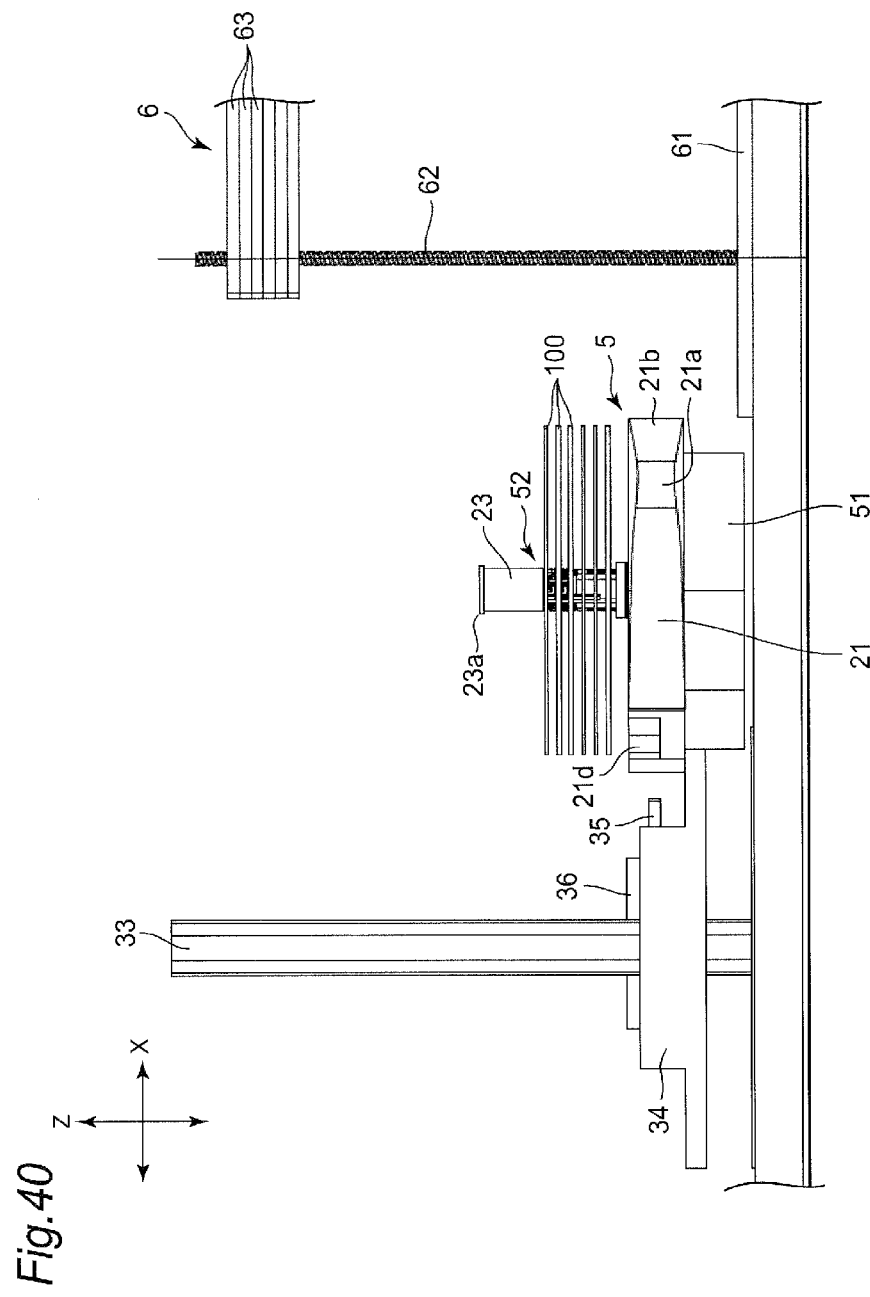
FIG. 40 is a side view showing the state where the shaft portion of the separator separates the plurality of discs from one another at the position at which the tray is lowered by the picker shown in FIG. 6.

When each pair of chuck nails 81a enters the recess portion 100b of the disc 100 to thereby clamp the inner circumferential portion of the disc 100, the up-and-down table 51 rises. Thus, as shown in FIG. 38, the plurality of discs 100 are lifted above the tray 2. In this state, when the up-and-down shaft 54 rises, as shown in FIG. 37, the pairs of chuck nails 81a of the respective disc chuck units 55a to 55f shift so as to widen the interval from one another. Thus, as shown in FIGS. 39 and 40, the plurality of discs 100 are separated from one another.

Figure 41:
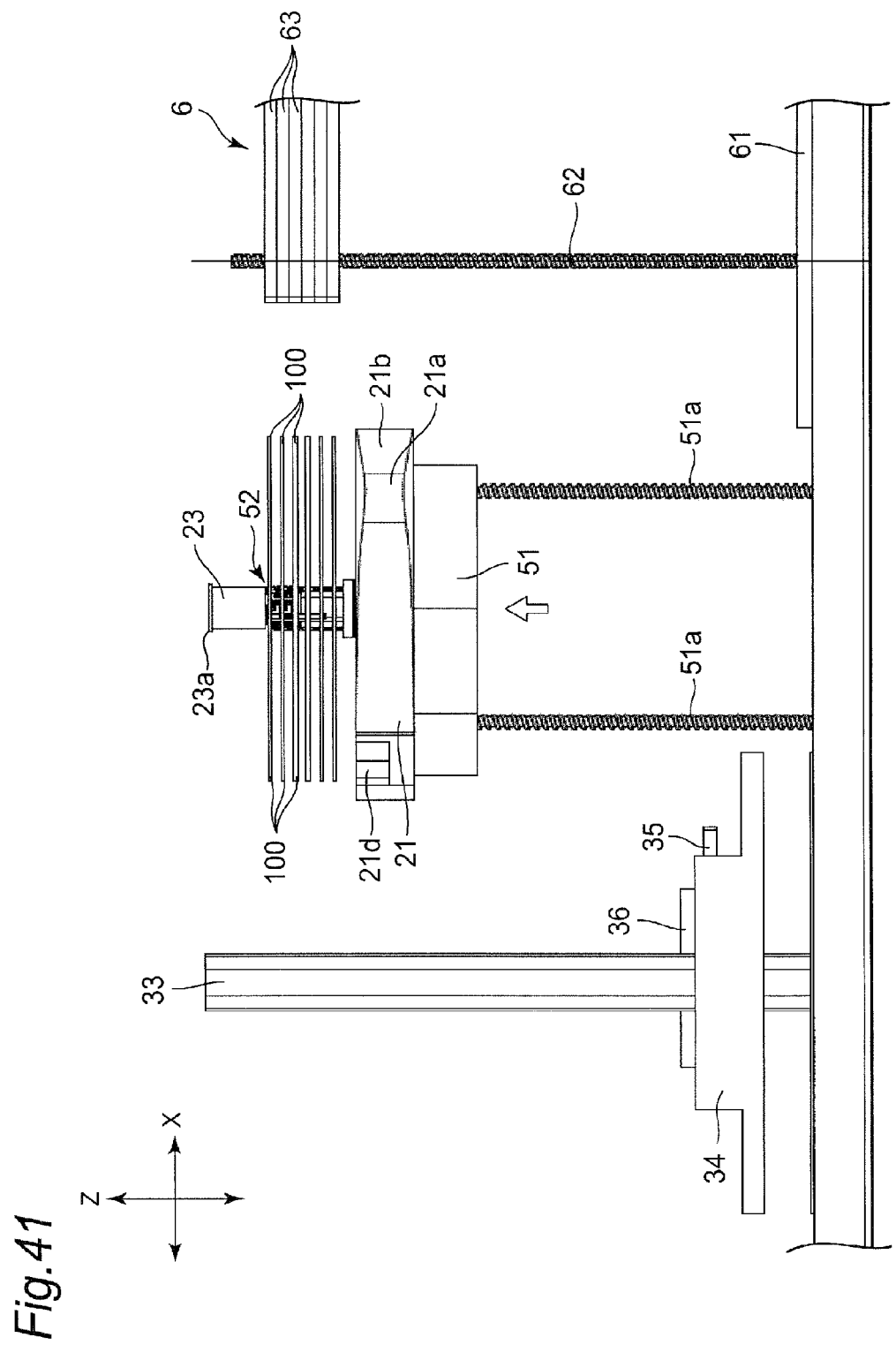
FIG. 41 is a side view showing the state where the separator rises from the state shown in FIG. 40.

Thereafter, as shown in FIG. 41, the up-and-down table 51 rises. The up-and-down table 51 is provided with a plurality of lead screws 51a extending in the device height direction Z. The up-and-down table 51 is structured to rise and lower by the axial rotation of the lead screws 51a.

When the up-and-down table 51 rises to the position shown in FIG. 41, the run base 31 of the picker 3 further runs toward the device-rear side. Thus, as shown in FIGS. 42A to 43B, the plurality of discs 100 are passed to the carrier 6 as being separated from one another.

As shown in FIG. 1, the carrier 6 includes a rotary table 61. The rotary table 61 is provided so as to be rotatable substantially about a rotation axis 61a extending in the device height direction Z. The rotary table 61 is provided with three lead screws 62 that extend in the device height direction Z. To the lead screws 62, a plurality of substantially C-shaped disc outer circumference holding members 63 are attached so as to be in parallel with one another. A plurality of discs 100 have their respective outer circumferential portions held by the plurality of disc outer circumference holding members 63.

Figure 42A:
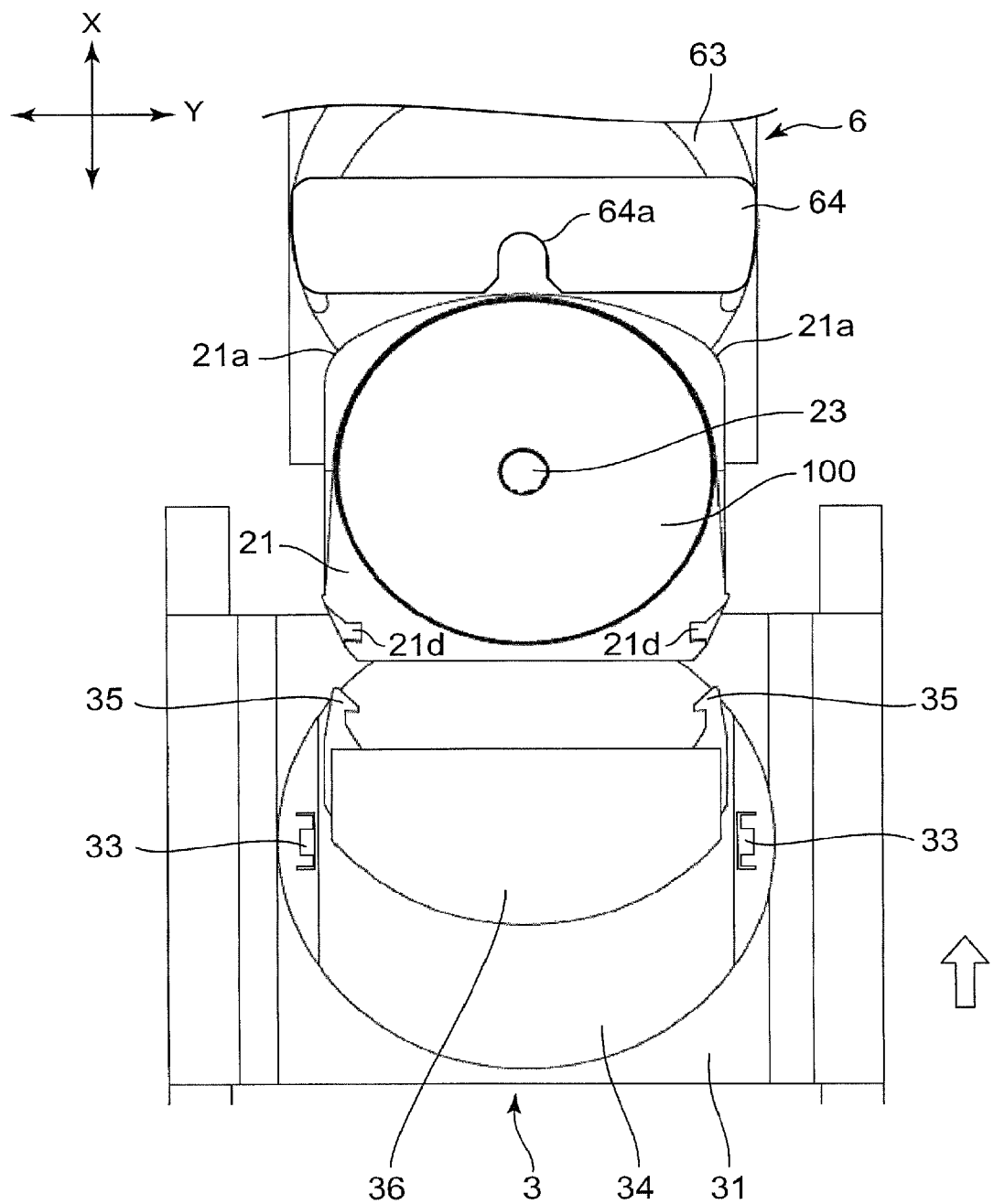
FIG. 42A is a plan view showing the state where the picker is conveyed to the device-rear side from the state shown in FIG. 41.
Figure 42B:
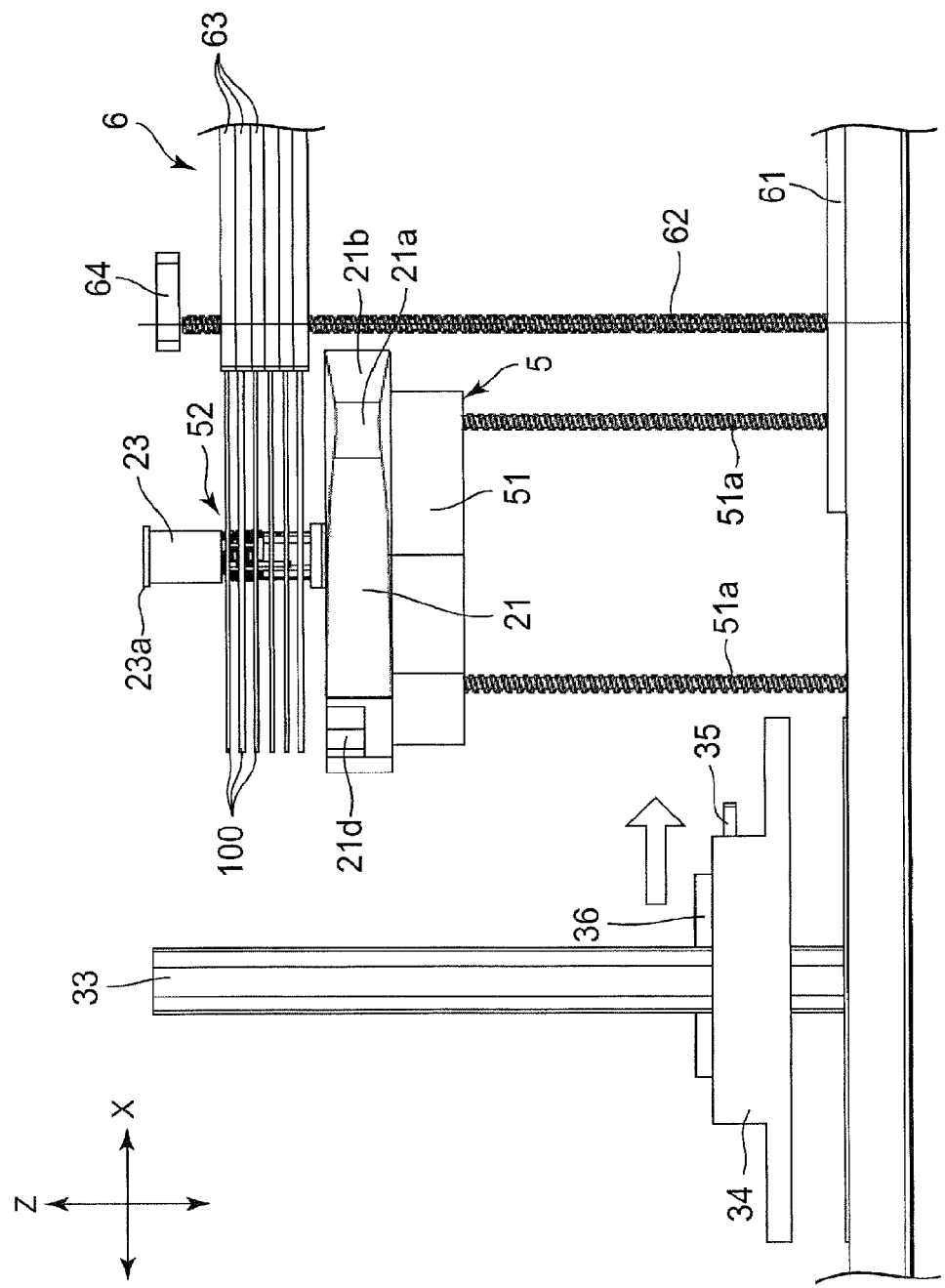
FIG. 42B is a side view showing the state where the picker is conveyed to the device-rear side from the state shown in FIG. 41.
Figure 43A:
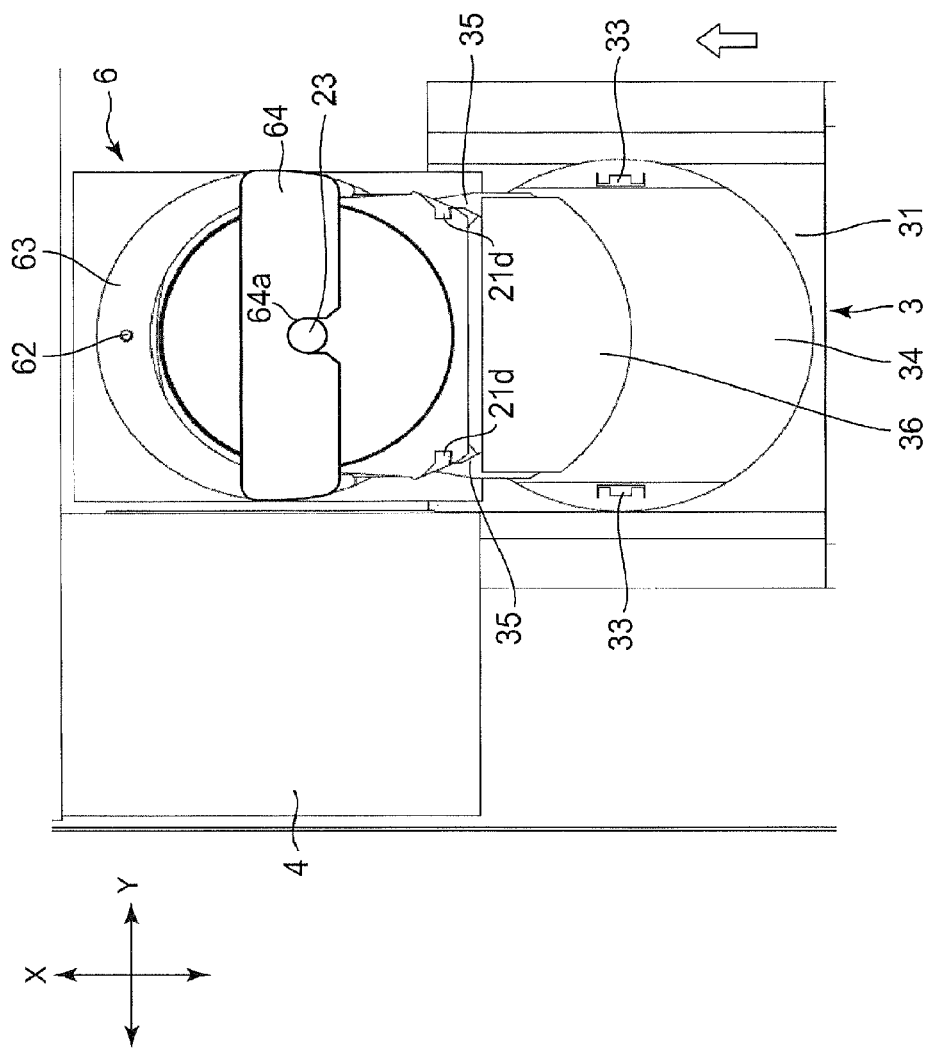
FIG. 43A is a plan view showing the state where the picker is further conveyed to the device-rear side from the state shown in FIG. 42A, and the discs are held by the disc outer circumference holding member of the carrier.
Figure 43B:
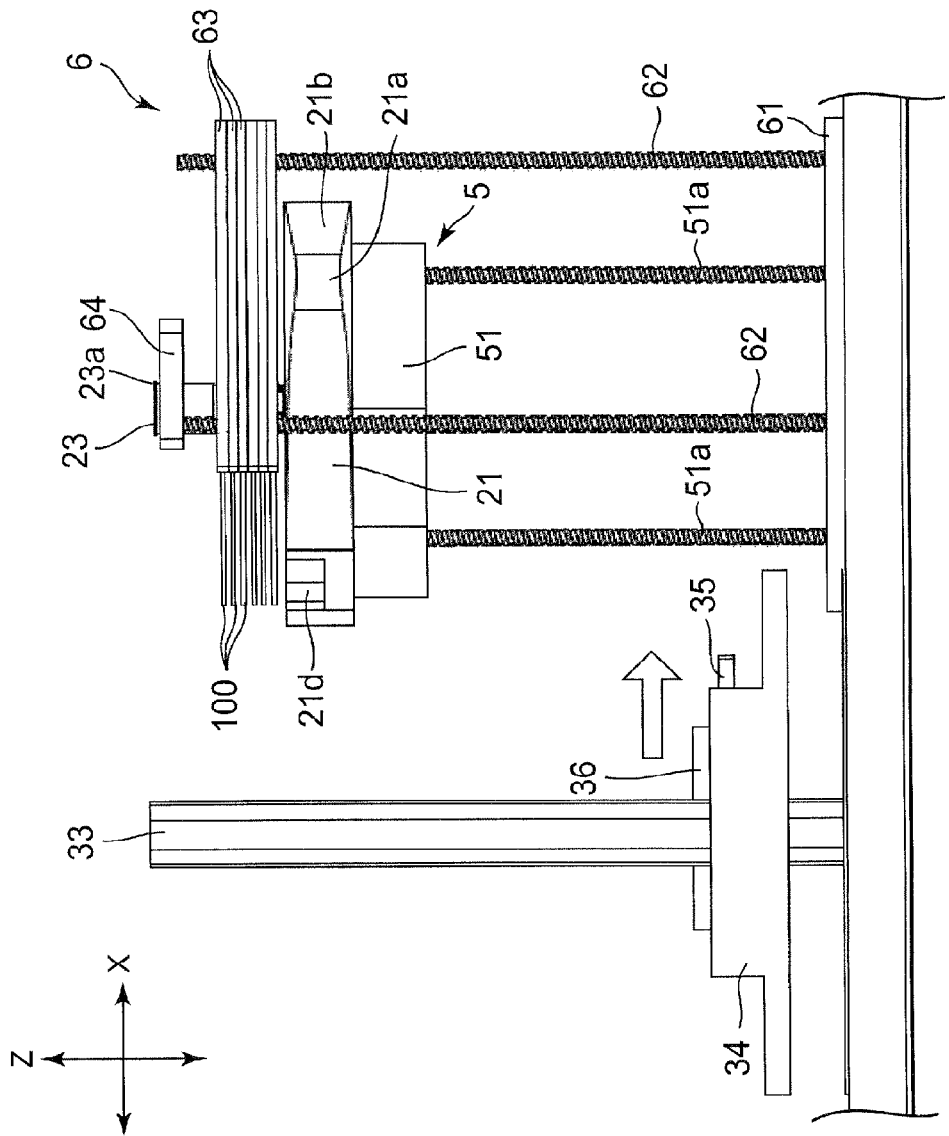
FIG. 43B is a side view showing the state where the picker is further conveyed to the device-rear side from the state shown in FIG. 42B, and the discs are held by the disc outer circumference holding member of the carrier.

Further, at the tip portion of each of two lead screws 62, 62, as shown in FIGS. 42A and 43B, a core rod holding portion 64 is provided. The core rod holding portion 64 is provided with a recess portion 64a that receives the core rod 23.

Figure 44:
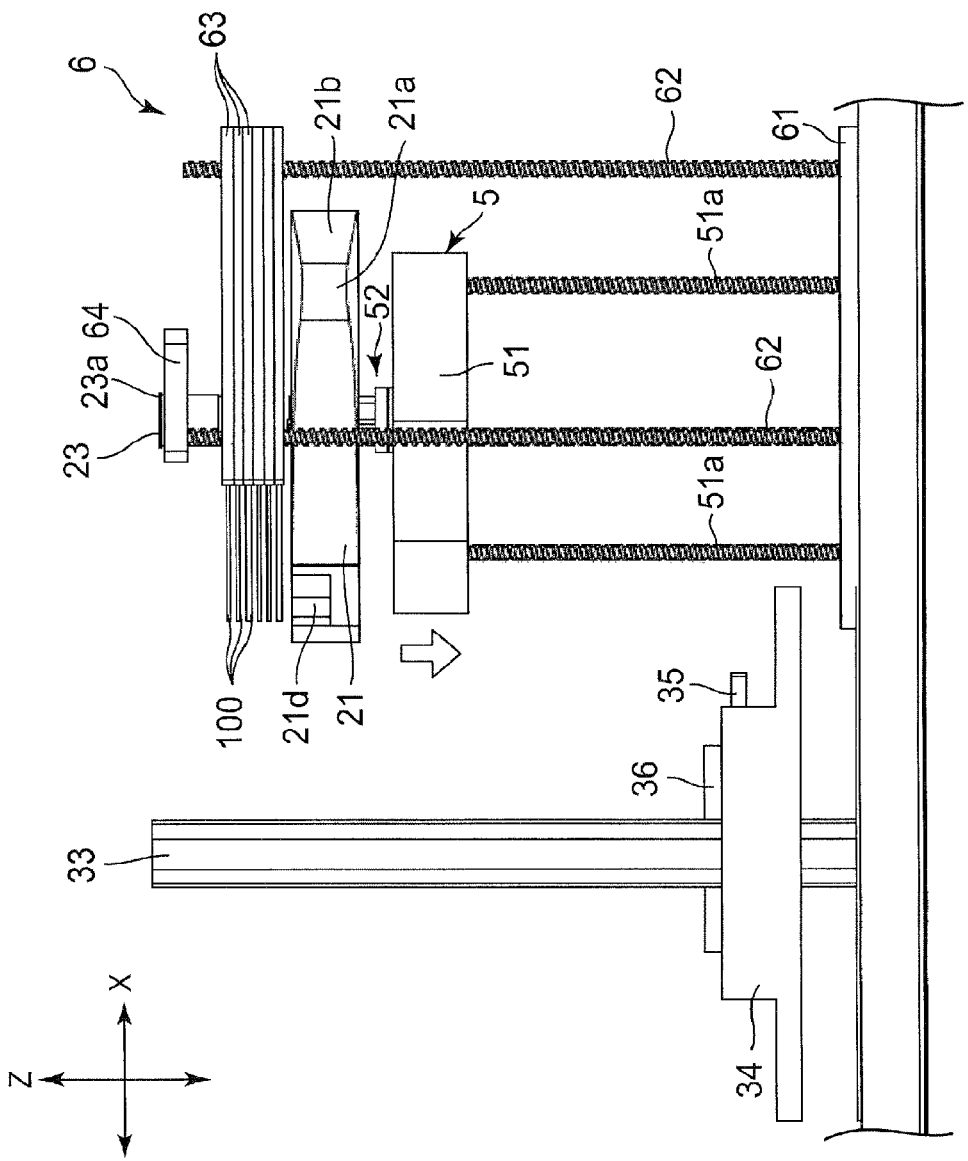
FIG. 44 is a side view showing the state where the separator lowers from the state shown in FIG. 43B.

As shown in FIGS. 43A and 43B, when the discs 100 are held by the disc outer circumference holding members 63 and the core rod 23 is inserted into the recess portion 64a, as shown in FIG. 36, each pair of chuck nails 81a shifts to the receding position. Thereafter, as shown in FIG. 44, the up-and-down table 51 is lowered. At this time, the core rod 23 is disengaged from the shaft portion 51 and the flange portion 23a formed at the top face outer circumferential portion is brought into contact with the top face of the core rod holding portion 64, whereby the core rod 23 is held by the core rod holding portion 64.

Figure 45A:
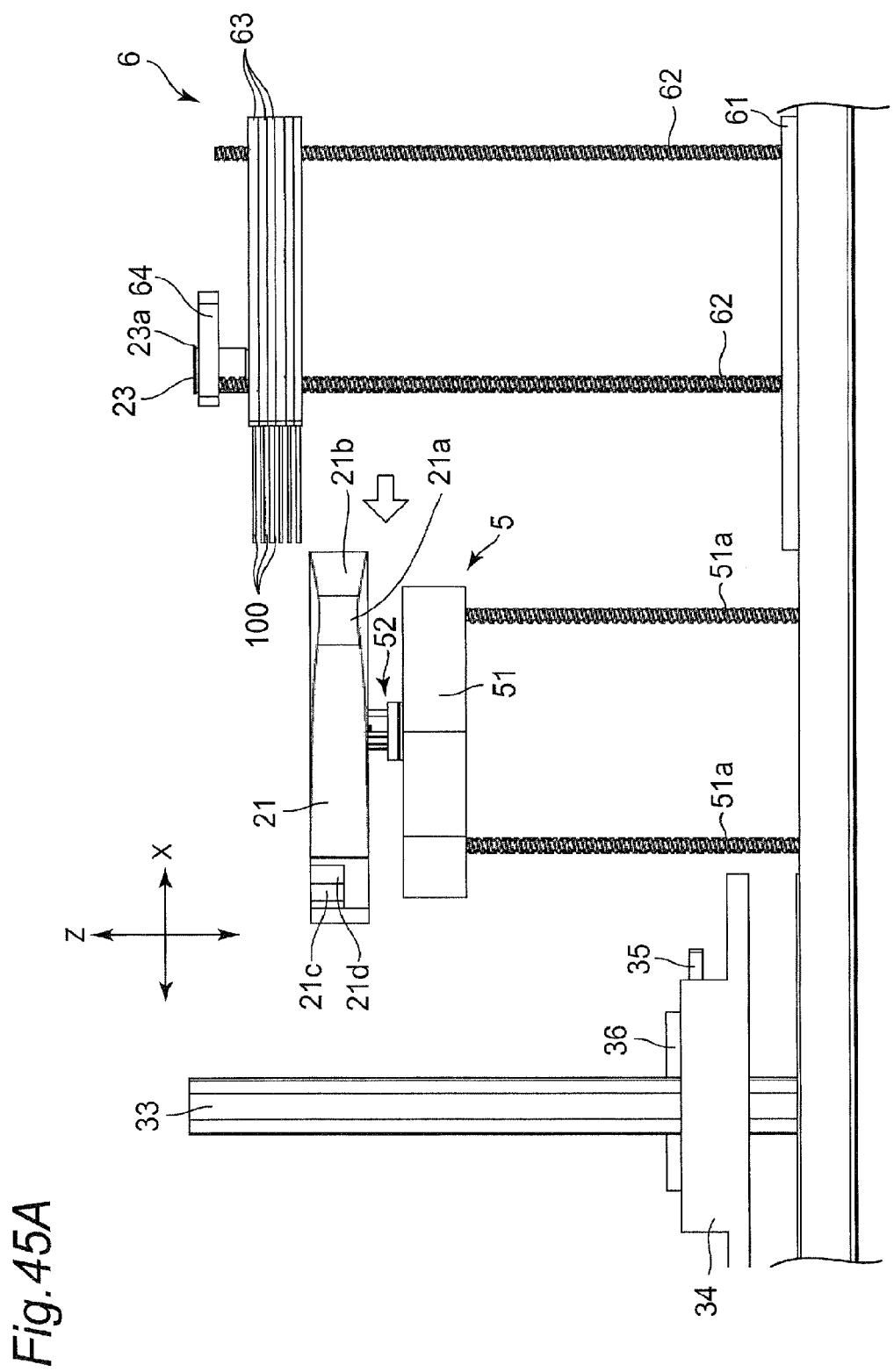
FIG. 45A is a side view showing the state where the separator has shifted from the state shown in FIG. 44 to the device-front side.
Figure 45B:
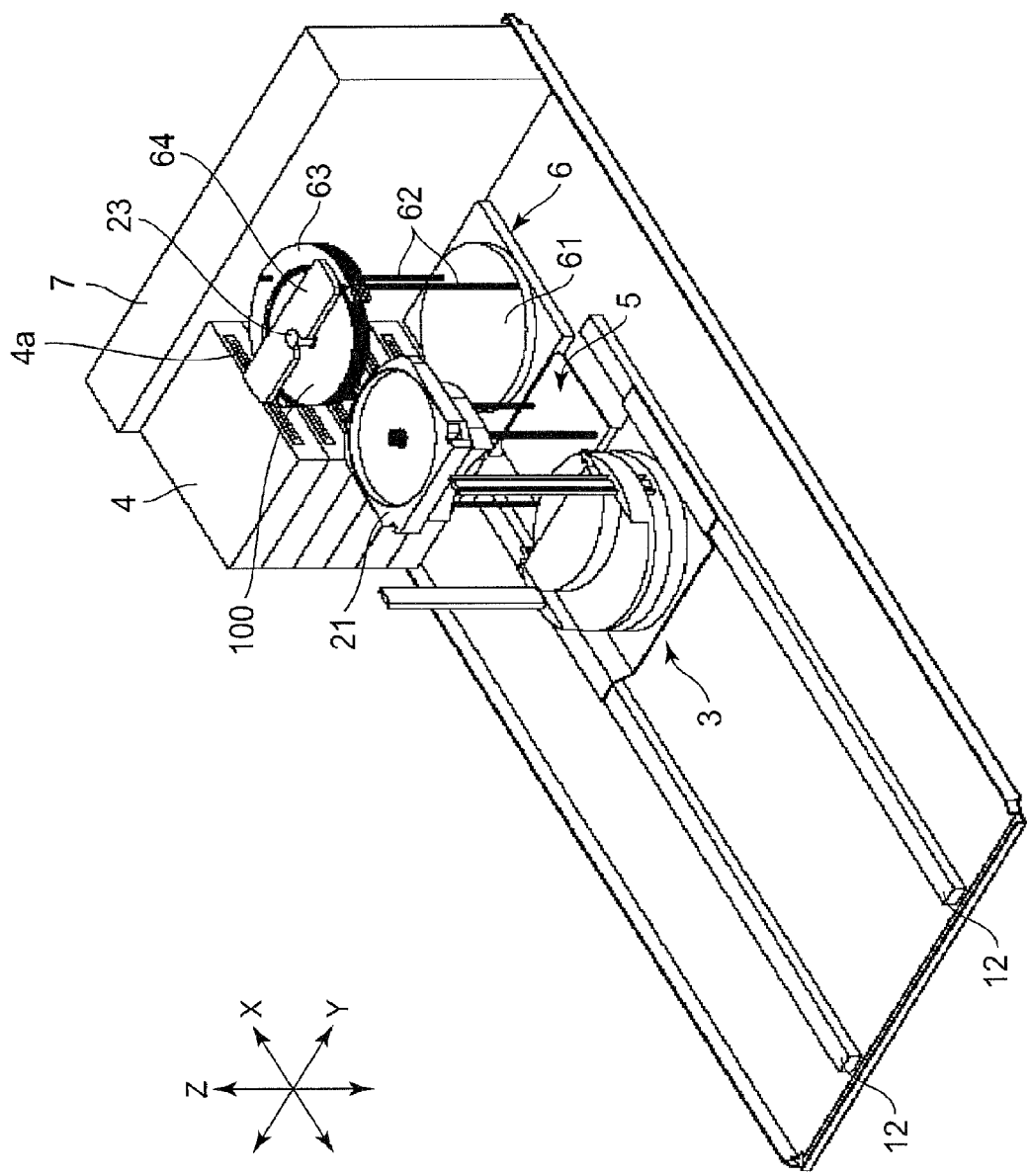
FIG. 45B is a perspective view showing the state where the separator has shifted from the state shown in FIG. 44 to the device-front side.

When the up-and-down table 51 lowers until the shaft portion 52 comes off from the center hole 100a of each of the discs 100, the run base 31 of the picker 3 runs toward the device-front side. Thus, as shown in FIGS. 45A and 45B, the separator 5 recedes from below the disc outer circumference holding members 63.

Figure 46A:
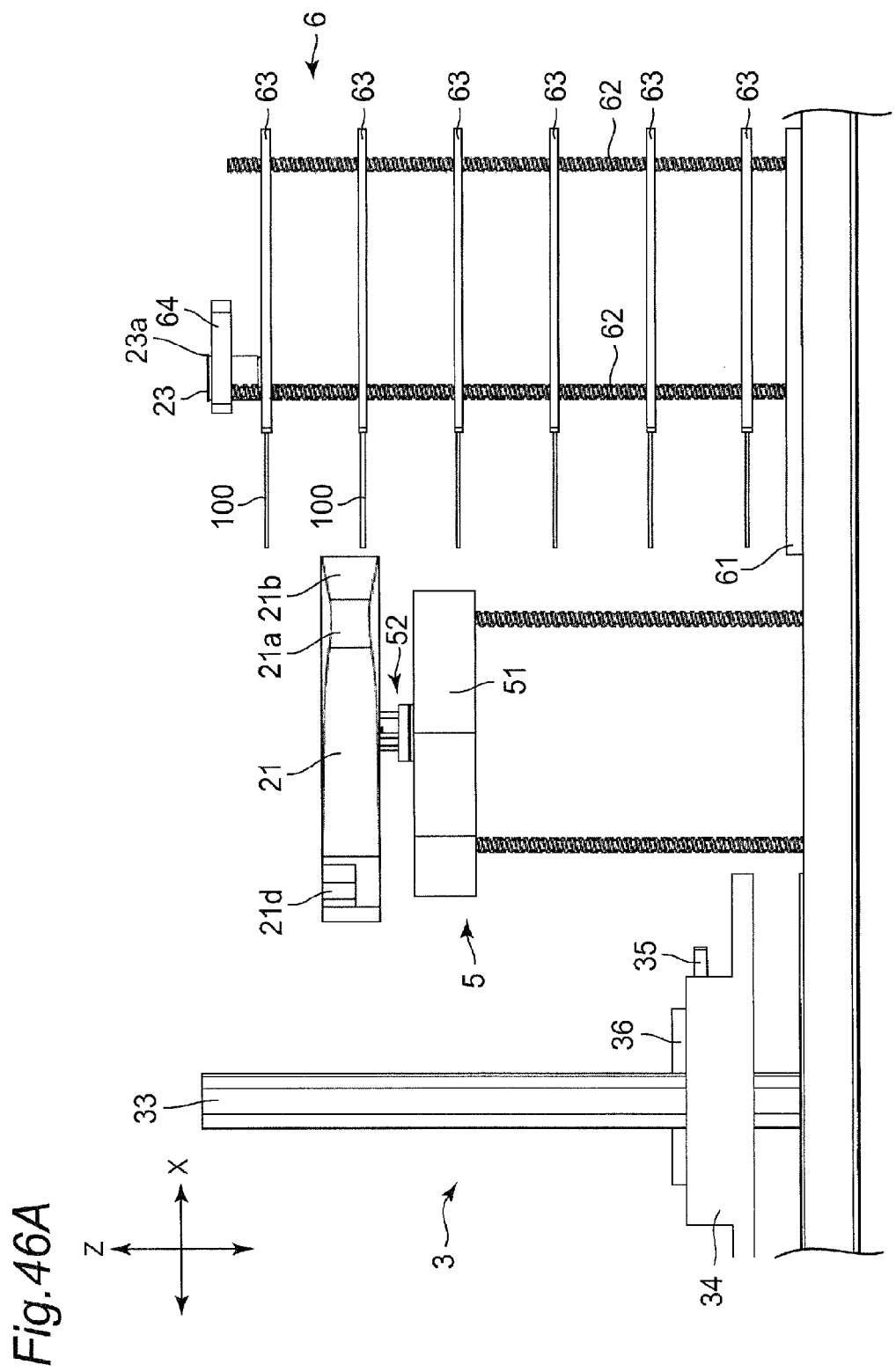
FIG. 46A is a side view showing the state where the disc outer circumference holding members have shifted from the state shown in FIG. 45A so as to widen the intervals from one another.
Figure 46B:
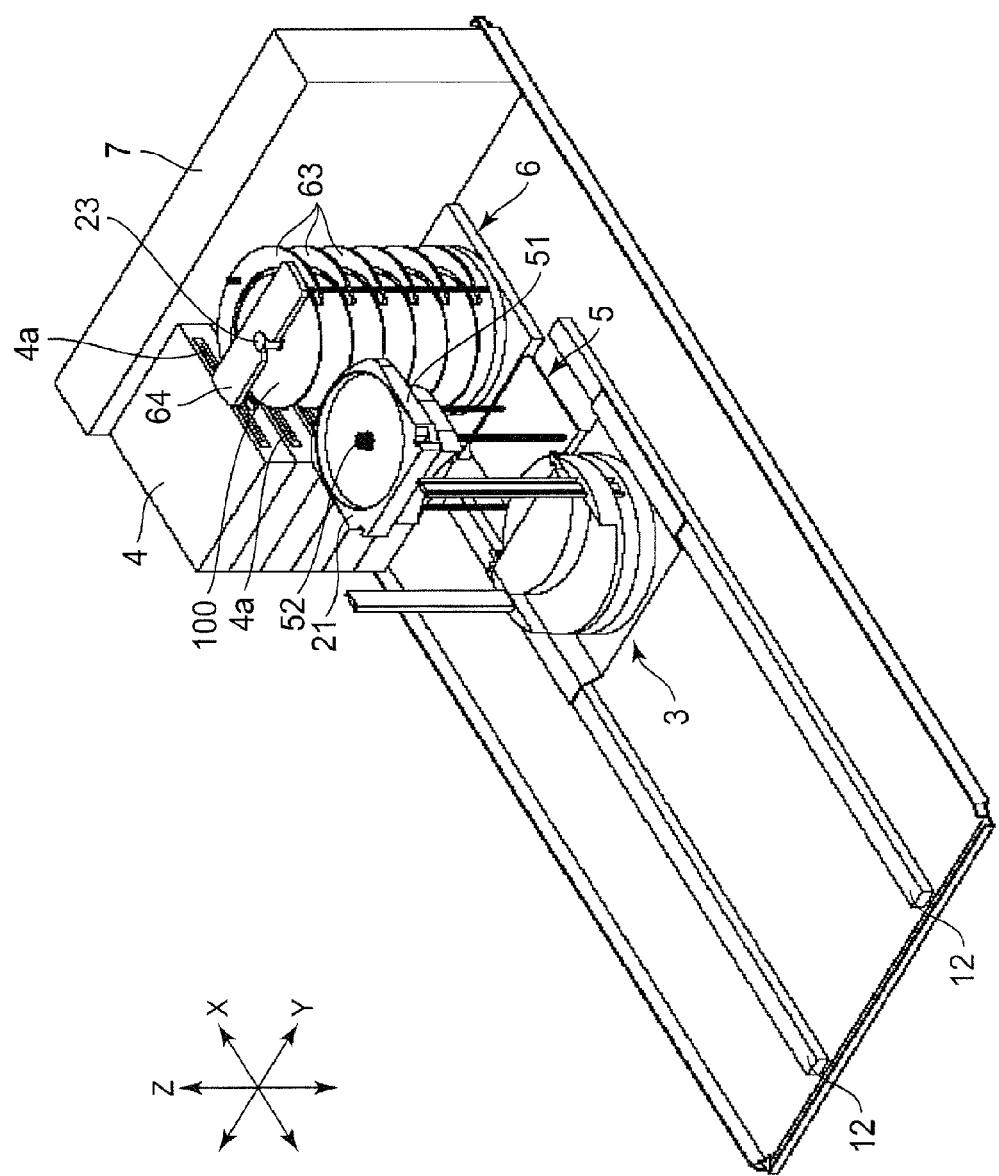
FIG. 46B is a perspective view showing the state where the disc outer circumference holding members have shifted from the state shown in FIG. 45B so as to widen the intervals from one another.

Thereafter, by the lead screws 62 being rotated about their respective axes, as shown in FIG. 46A, each clearance between adjacent ones of the plurality of discs 100 is widened, so as to correspond to the arrangement interval of the disc insertion opening 4a formed at each of the plurality of disc drives 4.

Figure 47A:
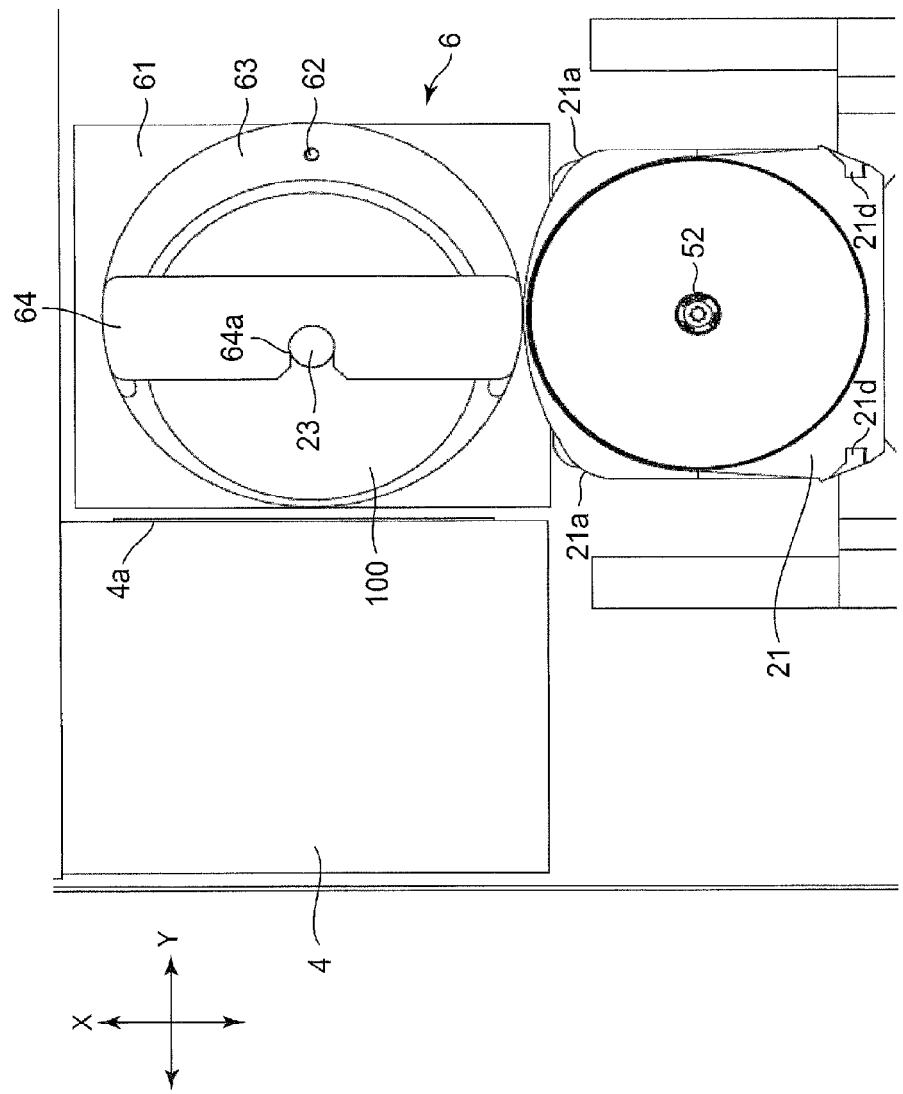
FIG. 47A is a plan view showing the state where the rotary table of the carrier is rotated so that, from the state shown in FIG. 46A, the portion of the disc not directly held by the disc outer circumference holding member is positioned near the disc insertion opening.
Figure 47B:
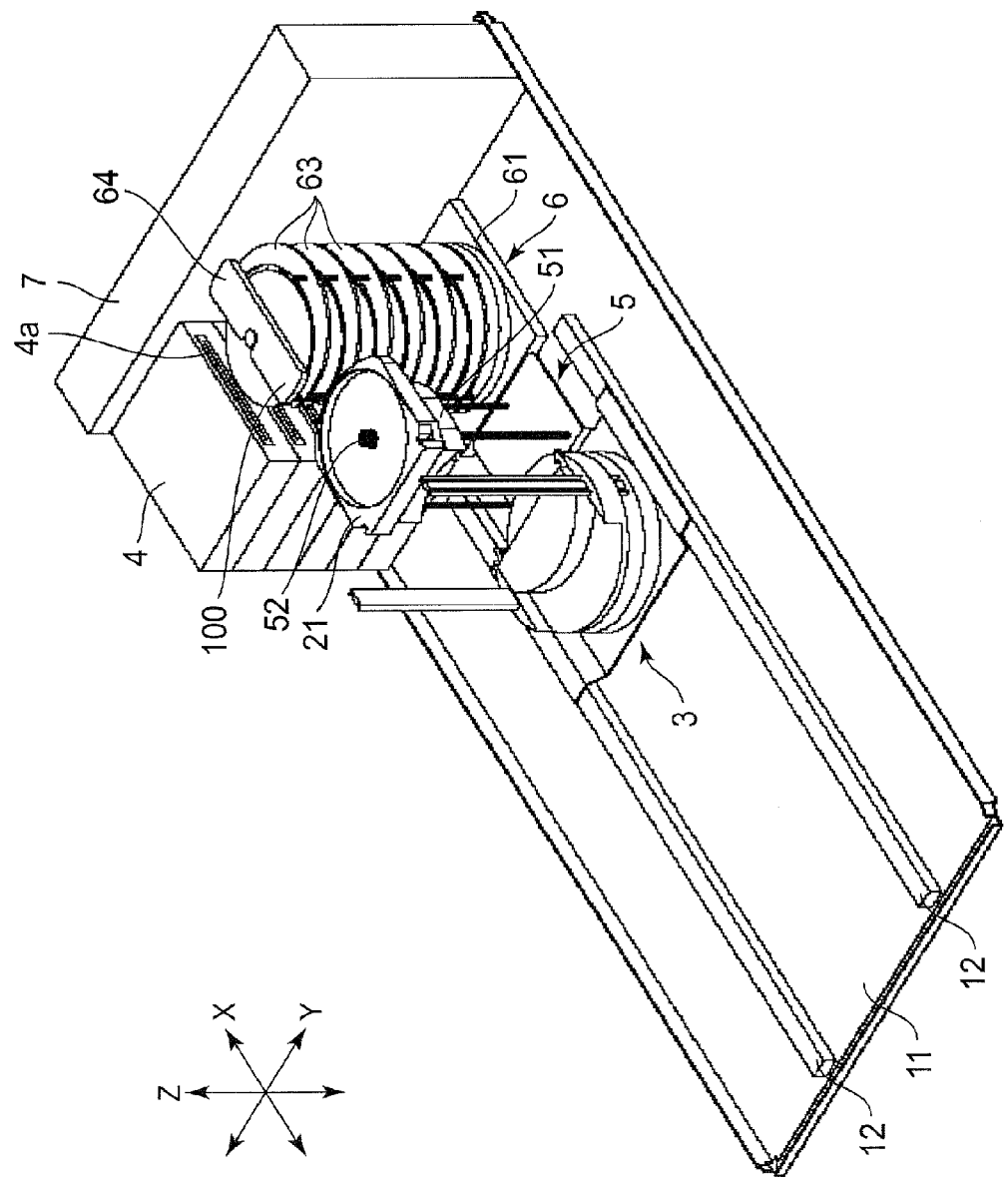
FIG. 47B is a perspective view showing the state where the rotary table of the carrier is rotated so that, from the state shown in FIG. 46B, the portion of the disc not directly held by the disc outer circumference holding member is positioned near the disc insertion opening.

Thereafter, as shown in FIGS. 47A and 47B, the rotary table 61 is rotated such that the portions not directly held by the disc outer circumference holding members 63 of a plurality of discs 100 are positioned near the disc insertion openings 4a.

Figure 48A:
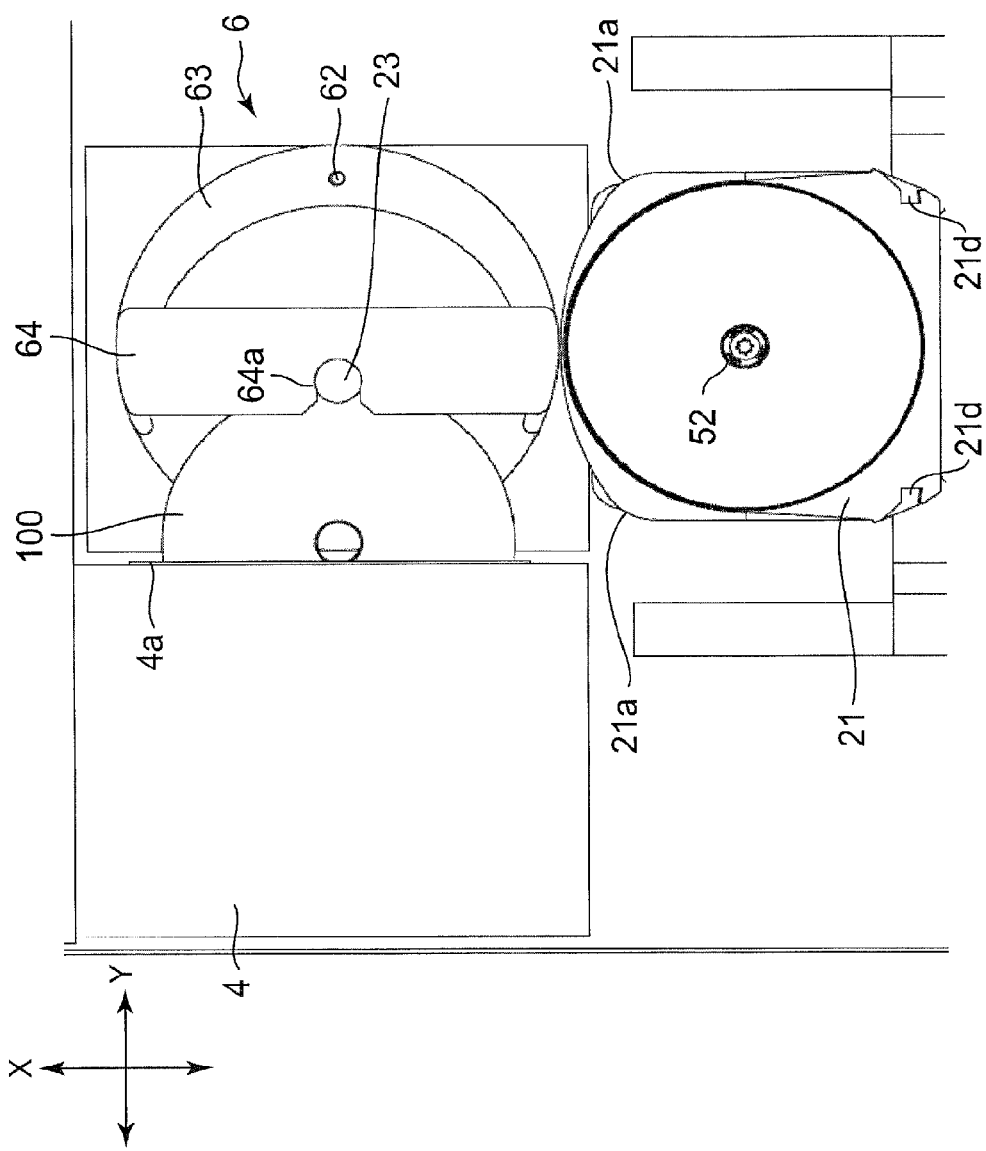
FIG. 48A is a plan view showing the state where a plurality of discs are inserted into the disc insertion openings of corresponding disc drives.
Figure 48B:
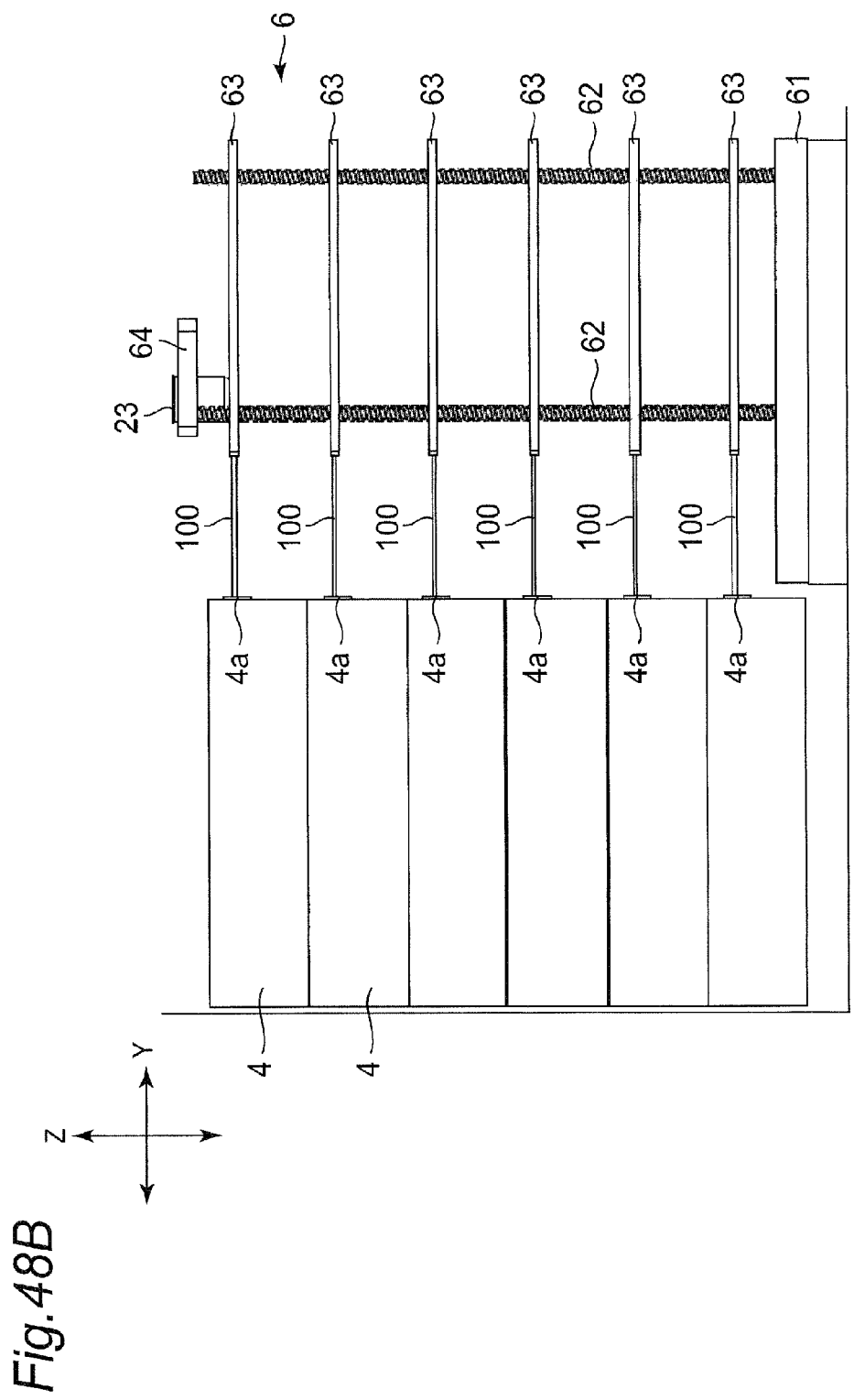
FIG. 48B is a side view showing the state where the plurality of discs are inserted into the disc insertion openings of corresponding disc drives.
Figure 48C:
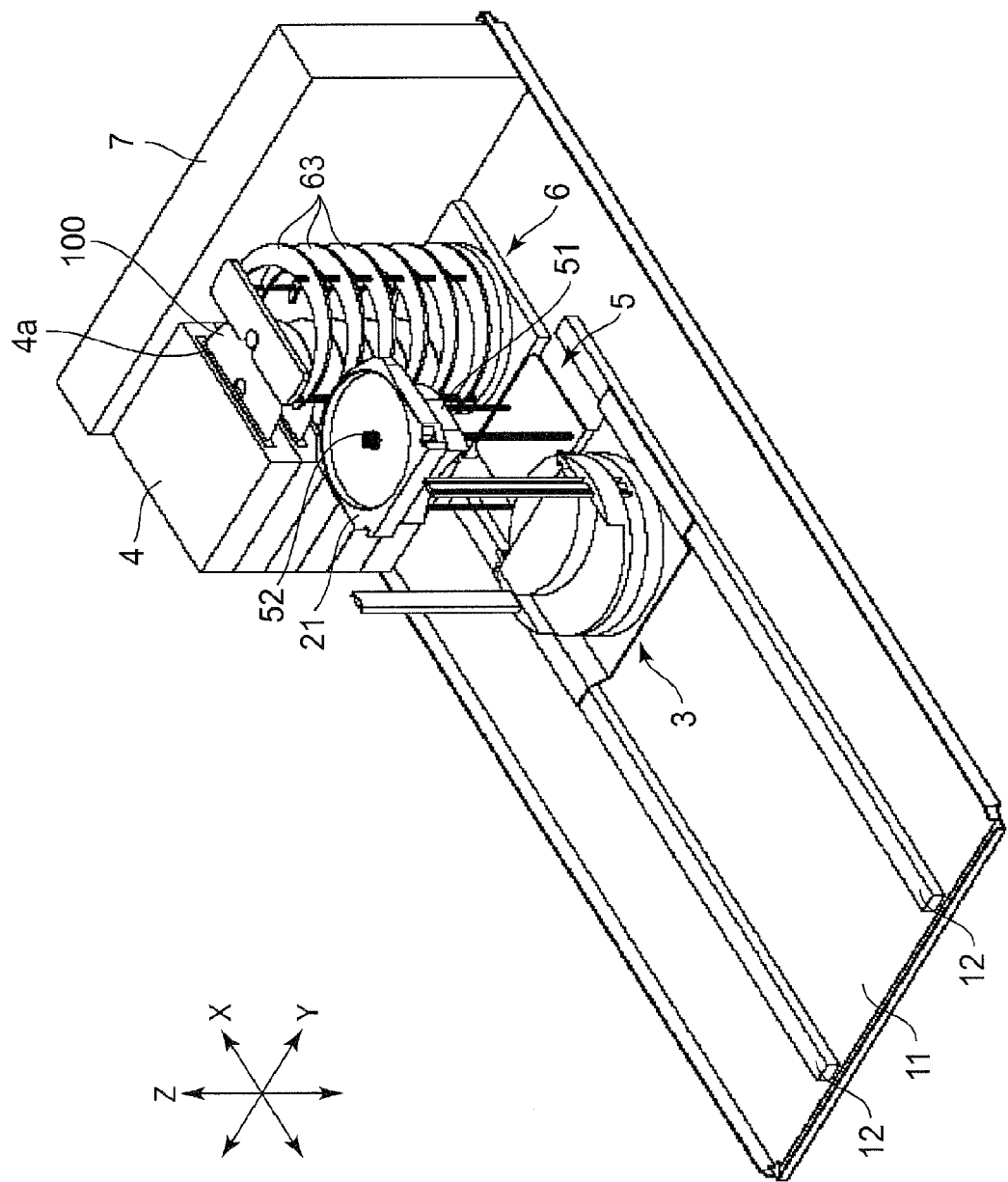
FIG. 48C is a perspective view showing the state where the plurality of discs are inserted into the disc insertion openings of corresponding disc drives.

Thereafter, by a not-shown disc push-out mechanism, as shown in FIGS. 48A to 48C, the discs 100 are inserted into corresponding disc insertion openings 4a of their respective disc drives 4. Thus, the discs 100 are respectively conveyed to the plurality of disc drives 4.

With the disc device according to the present embodiment, the trays 21 each storing a plurality of discs 100 are each conveyed to the position near the disc drives 4. That is, a plurality of discs 100 are simultaneously conveyed to the position near the disc drives 4. Thus, as compared to the conventional disc device in which the discs 100 are conveyed from the magazines 2 to the disc drives 4 one by one, the time required for conveying the discs 100 to each of the disc drives 4 can drastically be reduced.

Further, with the disc device according to the embodiment, a plurality of discs 100 stored in each tray 21 are separated by the separator 5 so as not to be brought into contact with one another, and are passed to the carrier 6 in the separated state. Thus, it becomes possible to prevent any scratch that may otherwise occur to the discs 100 by the adjacent ones of the discs 100 being brought into contact with one another.

Still further, with the disc device according to the embodiment, a plurality of disc drives 4 are arranged as being stacked in the device height direction (the thickness direction). Still further, the carrier 6 is structured to be capable of widening each clearance between adjacent ones of the plurality of discs so as to correspond to the arrangement interval of the disc insertion opening 4a formed at each of the plurality of disc drives 4. Thus, the discs 100 can respectively and simultaneously be inserted into the plurality of disc drives 4. Therefore, it becomes possible to drastically suppress the time required for conveying the discs 100 to the plurality of disc drives 4.

Still further, with the disc device according to the present embodiment, since the separator 5 and the picker 3 are integrated, they require only a single drive source to operate.

Still further, the disc device according to the present embodiment includes the core rod 23 that is inserted into the center hole 100a of each of the discs 100 until the plurality of discs 100 are separated by the separator 5, to thereby restrict shifting of the plurality of discs 100 in the plane direction. Thus, it becomes possible to further prevent occurrence of any scratch to the discs 100 that may otherwise be caused by contact between adjacent ones of the discs 100.

Still further, with the disc device according to the present embodiment, the tray 21 is provided with the cut portions 21a, to avoid contact between the tray 21 and the case 22, and for the tray 21 to be rotated before the tray 21 is completely drawn out from the case 22. Thus, the shifting time of the tray 21 from the position shown in FIG. 6 to the position shown in FIG. 10 can be reduced, and the shifting amount of the tray 21 can be reduced. As a result, both the conveying time of the discs 100 and the distance between the magazine stockers 1 can be reduced. Thus, an increase in size of the device can be suppressed.

Still further, with the disc device according to the present embodiment, since the side face 21b of the tray 21 is formed to be arc-like, the draw-out amount of the tray 21 can be reduced for avoiding contact between the tray 21 and the case 22. Thus, a reduction in the conveying time of the discs 100 and suppression of an increase in size of the device can further be achieved. It is to be noted that, it is further preferable that the side face 21b is formed to be arc-like whose center is substantially the rotation axis 32a of the tray 21 when the tray 21 is rotated by the picker 3. Thus, a further reduction in the draw-out amount of the tray 21 can be achieved.

Still further, the disc device according to the present embodiment is structured such that, when the tray 21 is inserted into the case 22 through the opening 22a, the picker 3 rotates the tray 21 and inserts the tray 21 into the case 22 from the cut portion 21a. Still further, the cut portion 21a is tapered such that the width W1 in the thickness direction of the tip portion firstly inserted into the case 22 becomes smaller than the width in the thickness direction W2 of the case 22. Thus, the tray 21 can easily be inserted into the case 22.

It is to be noted that, in connection with the portion of the side face 21b that is positioned on the back most side of the case 22 when the tray 21 is stored in the case 22, the portion cannot be tapered as the cut portions 21a because of the short distance from the disc 100. Accordingly, in the case where the tray 21 is inserted straight into the case 22 from such a portion of the side face 21b, the tray 21 may be incapable of being inserted into the case 22 because of the contact between the tray 21 and the case 22.

Further, with the disc device according to the present embodiment, since the entire side face 21b of the tray 21 is formed to be arc-like, the area of the tapered portion can fully be secured.

Still further, with the disc device according to the present embodiment, the bottom plate and the opposing side plates of the case 22 are provided so as to position on the inner side of the tray 21 than the opening 22a, and the collar portion 22c that guides shifting of the tray 21 is provided at the top plate of the case 22. Thus, as described above, the tray 21 can more surely be inserted into the case 22.

Still further, with the disc device according to the present embodiment, the tray 21 is provided with the cutout portions 21c. On the inner side of the cutout portion 21c in the width direction of the tray 21, the engaging recess portions 21d with which the hooks 35 of the picker 3 engage are provided. Thus, when the hooks 35 engage with the engaging recess portions 21d, the portion of each hook 35 that protrudes in the width direction with reference to the tray 21 can be reduced or eliminated. Thus, a reduction in both the distance between the up-and-down rails 33, 33 and the diameter of the rotary table 32 can be achieved. Further, by the cutout portions 21c, the wall of front side portion of the case 22 is cut off, and therefore it does not hinder the tray 21 from being drawn out. As a result, it becomes possible to prevent the hooks 35 from being brought into contact with a tray 21 adjacent to the relevant tray 21. This makes it possible to arrange adjacent ones of the trays 21 in close contact with each other. Thus, a reduction in size of the device can be achieved.

Further, the disc device according to the present embodiment includes a plurality of hooks 81 each having a pair of chuck nails 81a that can clamp the inner circumferential portion of the disc 100. Thus, a plurality of discs 100 can tightly be clamped by a pair of chuck nails 81a, 81a. Further, since a plurality of hooks 81 are provided in the circumferential direction of the shaft portion 52 so as to be out of phase, it becomes possible to avoid contact among the pairs of chuck nails 81a. Thus, even in the state where the plurality of discs 100 are stacked in close contact with one another, the discs 100 can surely be clamped by the pairs of chuck nails 81a. Further, since the interval between adjacent ones of the plurality of hooks 81 in the axial direction can be widened, the discs 100 clamped by the pairs of chuck nails 81a can simultaneously be separated. Accordingly, the time required for separating a plurality of discs 100 can drastically be suppressed as compared to the device disclosed in Japanese Unexamined Patent Publication No. 2011-204311.

Further, in the foregoing, as one method for avoiding contact among the pairs of chuck nails 81a, 81a, a plurality of hooks 81 are provided in the circumferential direction of the shaft portion 52 so as to be out of phase, the present invention is not limited thereto. A plurality of hooks 81 are only required to be arranged so as to be capable of avoiding contact among the pairs of chuck nails 81a, 81a.

Further, with the disc device according to the present embodiment, the recess portion 100b is provided at the inner circumferential portion of the disc 100, and the inner circumferential portion of the disc 100 is clamped by the pairs of chuck nails 81a. Thus, a clearance for inserting the chuck nails 81a between adjacent ones of the discs 100 can be eliminated. As a result, the plurality of discs 100 can be more closely arranged, and the number of pieces of the discs 100 stored in one magazine 2 can be increased.

It is to be noted that the present invention is not limited to the embodiment described above, and can be practiced in other various modes. For example, in the foregoing, the entire side face 21b of the tray 21 is formed to be arc-like. However, the present invention is not limited thereto. For example, the side face 21b of the tray 21 may be formed to be partially arc-like. In this case also, similar effect can be achieved.

Further, in the foregoing, though the cut portions 21a are formed to be arc-like (radius chamfered) in planar view, the present invention is not limited thereto. For example, the cut portions 21a may be formed to be linear (chamfered) in planar view. In such a case also, similar effect can be achieved.

Still further, in the foregoing, as shown in FIG. 9, when the distance L1 between the vertex 21f of the side face 21b of the tray 21 and the rotation axis 32a becomes smaller than the distance L2 between the front end portion 22b of the side face of the case 22 and the rotation axis 32a, the rotary table 32 is rotated clockwise substantially about the rotation axis 32a. However, the present invention is not limited thereto. It is only required that, when the distance between the position farthest from the rotation axis 32a in the side face 21b (including the cut portions 21a, 21a) of the tray 21 and the rotation axis 32a becomes smaller than the distance L2, the rotary table 32 should rotate clockwise substantially about the rotation axis 32a. In this case also, similar effect can be achieved.

Still further, the shape of the case 22 is not limited to the shape shown in FIG. 3, and may be in a rectangular parallelepiped shape or in the shape in which the side face on the back side is formed to be arc-like. That is, the shape of the case 22 may macroscopically and substantially be a rectangular parallelepiped shape.

Still further, in the foregoing, though a pair of chuck nails 81a, 81a is noted as one example of the chuck nail portion that holds the inner circumferential portion of the disc 100, the present invention is not limited thereto. The chuck nail portion may be in any mode so long as it can hold the inner circumferential portion of the disc 100.

Figure 49B:
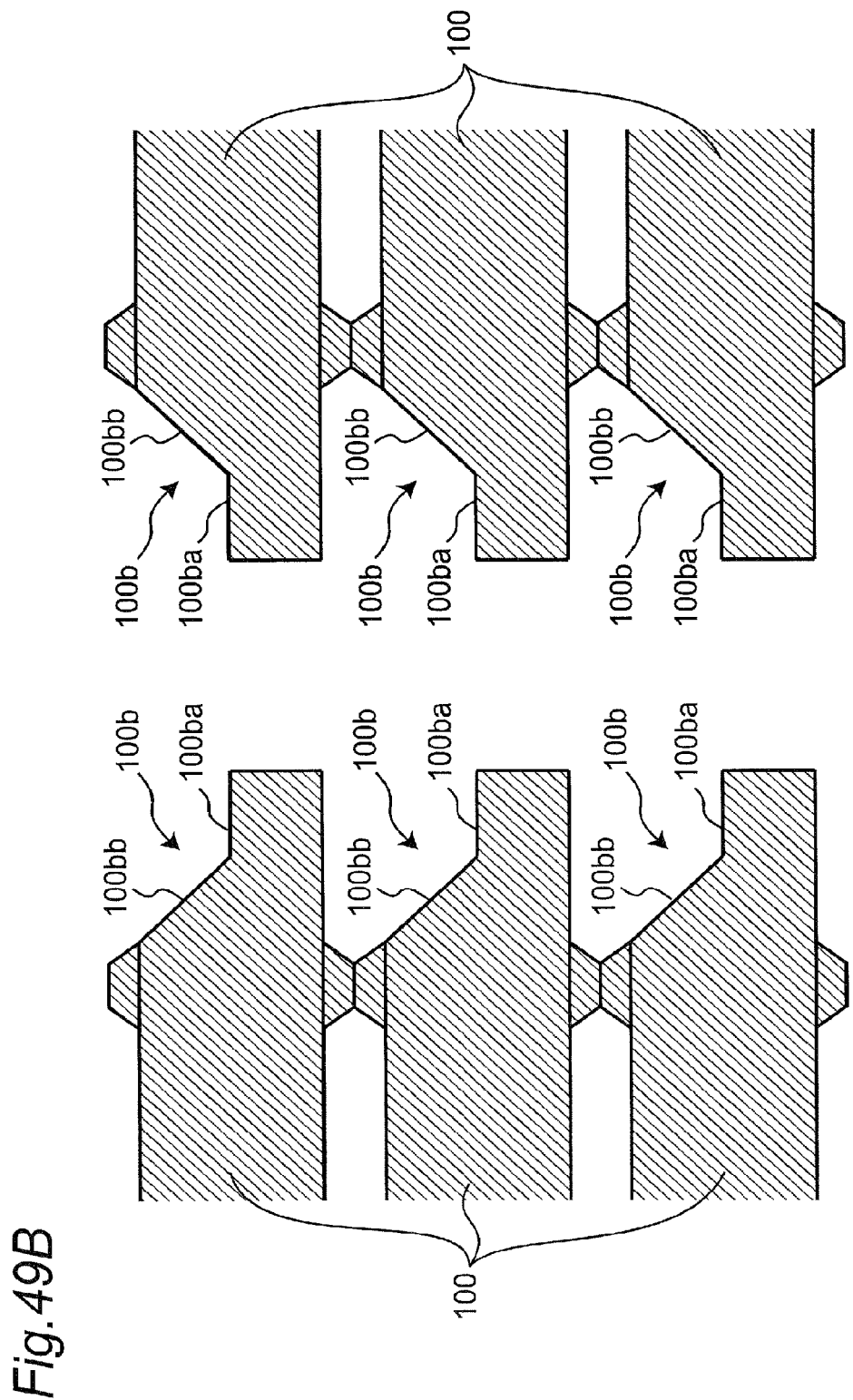
FIG. 49B is a cross-sectional view showing a second variation of the shape of a recess portion provided at the inner circumferential portion of each disc.
Figure 50A:
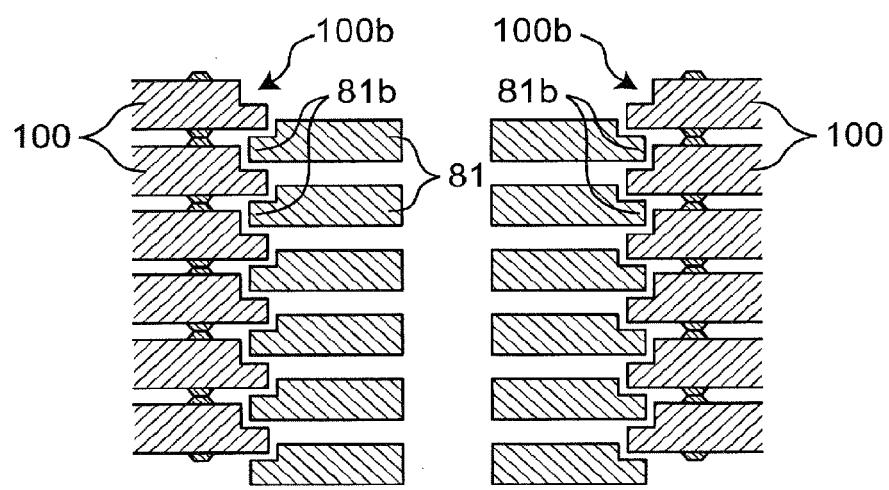
FIG. 50A is a cross-sectional view showing a variation of the chuck nail portions of the disc chuck units, showing the state where the chuck nail portions enter recess portions provided at the inner circumferential portion of the discs.
Figure 50B:
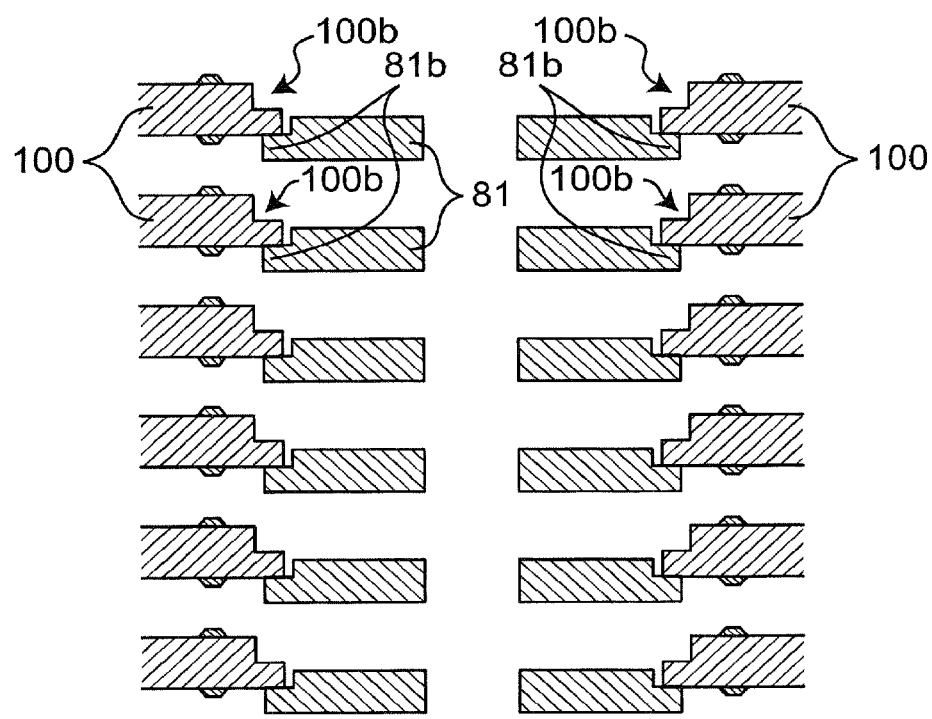
FIG. 50B is a cross-sectional view showing the state where the chuck nail portions shown in FIG. 50A separate the plurality of discs from one another.

Still further, in the foregoing, though the recess portion 100*b* of the disc 100 is formed at the upper corner portion of the inner circumferential portion of the disc 100 being cut off in a rectangular manner as shown in FIG. 27, the present invention is not limited thereto. For example, the recess portion 100*b* of the disc 100 may formed to be in a shape in which the upper corner portion of the inner circumferential portion of the disc 100 is diagonally cut off as shown in FIG. 49A. Further, as shown in FIG. 49B, the recess portion 100*b* of the disc 100 may be shaped such that the upper corner portion of the inner circumferential portion of the disc 100 is cut off such that it has a plane 100*ba* and a slope 100*bb*.

The disc device of the present invention can suppress an increase both in size of the device and in disc conveying time. Therefore, it is particularly useful for a disc device that conveys a plurality of discs to a plurality of disc drives.

The disclosure of Japanese Patent Application No. 2012-073444 filed on Mar. 28, 2012 including specification, drawing and claims are incorporated herein by reference in its entirety.

What is claimed is:

1. A magazine used for a disc device which takes out a disc stored in the magazine and which conveys the disc to a disc drive, the magazine comprising:

a tray which stores a plurality of the discs; and a case which has a substantially rectangular parallelepiped shape, the case storing the tray, wherein the case has an opening at front face of the case, a tray is inserted into and is taken out from the case through the opening, the tray has an outer shape being substantially rectangular in planar view, the tray being provided with a cut portion formed at a corner portion positioned on a back side of the case in a state where the tray is stored in the case, and the tray is rotatable without contacting with the case when the tray is drawn out from the case and is rotated while the cut portion passes through the opening.

2. The magazine according to claim 1, wherein the cut portion is formed in one of a linear manner and an arc-like manner in planar view.

3. The magazine according to claim 1, wherein the tray has a side face positioned on the back side of the case, the entire side face being formed to be arc-like in planar view.

4. The magazine according to claim 3, wherein the tray has the side face formed to be arc-like substantially about a rotation axis when the tray is rotated.

5. The magazine according to claim 1, wherein the cut portion is tapered such that a width in a thickness direction of a tip portion firstly inserted into the case when the tray is rotated and is inserted into the case from the cut portion, is smaller than a width of the case in the thickness direction.

6. The magazine according to claim 1, wherein a bottom plate and opposing side plates of the case are provided so as to position on an inner side of the tray than the opening, and a top plate of the case is provided with a collar portion which guides shifting of the tray.

7. The magazine according to claim 1, wherein the tray is provided with a cutout portion at a corner portion positioned on a front side of the case in the state where the tray is stored in the case, the cutout portion being provided with an engaging recess portion on an inner side in a width direction of the tray.

\* \* \* \* \*